United States Patent
Thyagarajan et al.

(10) Patent No.: US 12,302,247 B2
(45) Date of Patent: May 13, 2025

(54) CDRX WAKEUP SIGNAL FOR UNLICENSED SPECTRUM

(71) Applicant: Qualcomm Incorporated, San Diego, CA (US)

(72) Inventors: Ananta Narayanan Thyagarajan, Bangalore (IN); Sreekanth Dama, Bangalore (IN); Tanumay Datta, Bangalore (IN); Kapil Bhattad, Bangalore (IN); Xiaoxia Zhang, San Diego, CA (US); Jing Sun, San Diego, CA (US); Ozcan Ozturk, San Diego, CA (US); Shashidhar Vummintala, Bangalore (IN); Gowrisankar Somichetty, Bangalore (IN); Pravjyot Singh Deogun, Bengaluru (IN); Ahmed Zaki, Bengaluru (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/769,129

(22) PCT Filed: Nov. 4, 2020

(86) PCT No.: PCT/US2020/058881
§ 371 (c)(1),
(2) Date: Apr. 14, 2022

(87) PCT Pub. No.: WO2021/092014
PCT Pub. Date: May 14, 2021

(65) Prior Publication Data
US 2024/0147362 A1    May 2, 2024

(30) Foreign Application Priority Data

Nov. 7, 2019    (IN) .............................. 201941045296

(51) Int. Cl.
H04W 52/02    (2009.01)
H04W 16/14    (2009.01)
H04W 76/28    (2018.01)

(52) U.S. Cl.
CPC ....... H04W 52/0229 (2013.01); H04W 16/14 (2013.01); H04W 76/28 (2018.02)

(58) Field of Classification Search
CPC .. H04W 52/0229; H04W 76/28; H04W 16/14
(Continued)

(56) References Cited

U.S. PATENT DOCUMENTS

2015/0381830 A1* 12/2015 Wu .................. H04N 21/43637
                                                                348/207.1
2016/0286603 A1    9/2016 Vajapeyam et al.
(Continued)

FOREIGN PATENT DOCUMENTS

CN    104812032 A    7/2015

OTHER PUBLICATIONS

Huawei., et al: "Power Saving Signal/Channel/Procedure for Triggering Adaptation", 3GPP Draft; R1-1900041, 3rd Generation Partnership Project (3GPP), Mobile Competence Centre; 650, Route Des Lucioles; F-06921 Sophia-Antipolis Cedex; France vol. RAN WG1, No. Taipei; Jan. 21, 2019-Jan. 25, 2019 Jan. 20, 2019 (Jan. 20, 2019), XP051592967, 7 Pages, Retrieved from the Internet: URL: http://www.3gpp.org/ftp/Meetings%5F3GPP%5FSYNC/RAN1/Docs/R1%2D1900041%2Ezip [retrieved on Jan. 20, 2019] figures 1-3, 5 sections: 3.1.1-3.1.3; p. 2-p. 4 section 3.2; p. 4-p. 5.
(Continued)

*Primary Examiner* — Mark G. Pannell
(74) *Attorney, Agent, or Firm* — QUALCOMM Incorporated

(57) ABSTRACT

Methods, systems, and devices for wireless communications are described. Generally, the described techniques provide
(Continued)

for improving communications between a user equipment (UE) and a base station in a shared radio frequency spectrum while the UE is operating in a discontinuous reception (DRX) mode. In particular, the UE may be configured to adapt operation in a DRX mode based on whether a base station has access to a shared radio frequency spectrum. For example, the UE may adjust a length of an on-duration for monitoring for a data transmission from the base station, adjust a periodicity for monitoring for control information from the base station, determine whether to keep monitoring for wake-up signaling from the base station, etc. based on whether the base station has access to the shared radio frequency spectrum. Further techniques for improving operation in a DRX mode are also described.

32 Claims, 22 Drawing Sheets

(58) Field of Classification Search
USPC .......................................................... 370/311
See application file for complete search history.

(56) References Cited

U.S. PATENT DOCUMENTS

| | | | |
|---|---|---|---|
| 2018/0097598 A1 | 4/2018 | Ang et al. | |
| 2019/0159280 A1 | 5/2019 | Chakraborty et al. | |
| 2019/0254110 A1* | 8/2019 | He | H04L 41/0896 |
| 2019/0297577 A1* | 9/2019 | Lin | H04W 52/0229 |
| 2019/0327679 A1* | 10/2019 | Gupta | H04W 52/0225 |
| 2020/0100197 A1* | 3/2020 | Pan | H04W 72/0446 |
| 2020/0100212 A1* | 3/2020 | Lee | H04W 68/08 |
| 2020/0137685 A1* | 4/2020 | Kim | H04W 52/0245 |
| 2020/0214078 A1* | 7/2020 | Jiang | H04W 52/0216 |
| 2020/0229093 A1* | 7/2020 | Ahmad | H04W 52/0209 |
| 2020/0313833 A1* | 10/2020 | Yi | H04L 5/001 |
| 2020/0337110 A1* | 10/2020 | Kim | H04W 76/28 |
| 2021/0051590 A1* | 2/2021 | Hakola | H04W 76/27 |
| 2021/0204214 A1* | 7/2021 | Chang | H04W 72/1263 |
| 2021/0235380 A1* | 7/2021 | Wang | H04W 52/0216 |
| 2021/0259044 A1* | 8/2021 | Islam | H04W 52/0229 |
| 2021/0352582 A1* | 11/2021 | Zeng | H04W 52/0229 |
| 2021/0400581 A1* | 12/2021 | Zhu | H04W 74/0808 |
| 2021/0410069 A1* | 12/2021 | Jo | H04L 5/0053 |
| 2022/0039009 A1* | 2/2022 | Iyer | H04L 5/0098 |
| 2022/0039014 A1* | 2/2022 | Shi | H04W 72/23 |
| 2022/0078834 A1* | 3/2022 | Wu | H04L 27/0006 |
| 2022/0132425 A1* | 4/2022 | Seo | H04W 52/02 |
| 2022/0225151 A1* | 7/2022 | Zhang | H04W 52/0229 |
| 2022/0279427 A1* | 9/2022 | Hwang | H04W 48/16 |
| 2022/0279442 A1* | 9/2022 | Luo | H04W 76/28 |
| 2022/0279564 A1* | 9/2022 | Li | H04L 1/08 |
| 2022/0303902 A1* | 9/2022 | Tao | H04W 72/0446 |
| 2022/0322232 A1* | 10/2022 | Li | H04W 52/0229 |

OTHER PUBLICATIONS

International Search Report and Written Opinion—PCT/US2020/058881—ISA/EPO—Feb. 16, 2021 (193967WO).
Nokia, et al., "On UE Adaptation to the Traffic", 3GPP Draft, R1-1901188, 3GPP TSG RAN WG1 Ad-Hoc #1901, 3rd Generation Partnership Project (3GPP), Mobile Competence Centre, 650, Route Des Lucioles, F-06921 Sophia-Antipolis Cedex, France, vol. RAN WG1, No. Taipei, Taiwan, Jan. 21, 2018-Jan. 25, 2018, Jan. 20, 2019 (Jan. 20, 2019), XP051594031, 13 Pages, Retrieved from the Internet: URL: http://www.3gpp.org/ftp/Meetings%5F3GPP%5FSYNC/RAN1/Docs/R1%2D1901188%2Ezip [retrieved on Jan. 20, 2019] section 2.2; p. 4-p. 6, the whole document.

* cited by examiner

CDRX WAKEUP SIGNAL FOR UNLICENSED SPECTRUM

CROSS REFERENCE TO RELATED APPLICATIONS

The present Application is a 371 national stage filing of International PCT Application No. PCT/US2020/058881 by Thyagarajan et al., entitled "CDRX WAKEUP SIGNAL FOR UNLICENSED SPECTRUM," filed Nov. 4, 2020; and claims priority to India Provisional Patent Application No. 201941045296 by Thyagarajan et al., entitled "CDRX WAKEUP SIGNAL FOR UNLICENSED SPECTRUM," filed Nov. 7, 2019, each of which is assigned to the assignee hereof, and each of which is expressly incorporated by reference in its entirety herein.

BACKGROUND

The following relates generally to wireless communications and more specifically to power saving for discontinuous reception (DRX) in a shared spectrum, including unlicensed spectrum.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

SUMMARY

The described techniques relate to improved methods, systems, devices, and apparatuses that support power saving for discontinuous reception (DRX) in a shared spectrum (e.g., unlicensed, shared licensed, etc.). Generally, the described techniques provide for improving communications between a user equipment (UE) and a base station in a shared radio frequency spectrum while the UE is operating in a DRX mode. In particular, the UE may be configured to adapt operation in a DRX mode based on whether a base station has access to a shared radio frequency spectrum. In one example, a UE may adjust a length of an on-duration for monitoring for a data transmission from a base station based on whether the base station has access to a shared radio frequency spectrum. In another example, a UE may adjust a periodicity for monitoring for control information from a base station in an on-duration based on whether the base station has access to the shared radio frequency spectrum. In yet another example, the UE may determine whether to keep monitoring subsequent wake-up signaling occasions for wake-up signaling from the base station after failing to receive wake-up signaling from the base station in previous wake-up signaling occasions based on whether the base station has access to the shared radio frequency spectrum. Further techniques for improving operation in a DRX mode are also described.

A method of wireless communication at a UE is described. The method may include monitoring a shared radio frequency spectrum band for wake-up signaling from a base station, the wake-up signaling for a discontinuous reception cycle at the UE, receiving the wake-up signaling prior to an on-duration of the discontinuous reception cycle, the wake-up signaling including an indication of a length of the on-duration, and entering, based on receiving the wake-up signaling, a wake state for the indicated length of the on-duration to monitor for physical downlink control channel scheduling data from the base station.

An apparatus for wireless communication at a UE is described. The apparatus may include a processor, memory coupled with the processor, and instructions stored in the memory. The instructions may be executable by the processor to cause the apparatus to monitor a shared radio frequency spectrum band for wake-up signaling from a base station, the wake-up signaling for a discontinuous reception cycle at the UE, receive the wake-up signaling prior to an on-duration of the discontinuous reception cycle, the wake-up signaling including an indication of a length of the on-duration, and enter, based on receiving the wake-up signaling, a wake state for the indicated length of the on-duration to monitor for physical downlink control channel scheduling data from the base station.

Another apparatus for wireless communication at a UE is described. The apparatus may include means for monitoring a shared radio frequency spectrum band for wake-up signaling from a base station, the wake-up signaling for a discontinuous reception cycle at the UE, receiving the wake-up signaling prior to an on-duration of the discontinuous reception cycle, the wake-up signaling including an indication of a length of the on-duration, and entering, based on receiving the wake-up signaling, a wake state for the indicated length of the on-duration to monitor for physical downlink control channel scheduling data from the base station.

A non-transitory computer-readable medium storing code for wireless communication at a UE is described. The code may include instructions executable by a processor to monitor a shared radio frequency spectrum band for wake-up signaling from a base station, the wake-up signaling for a discontinuous reception cycle at the UE, receive the wake-up signaling prior to an on-duration of the discontinuous reception cycle, the wake-up signaling including an indication of a length of the on-duration, and enter, based on receiving the wake-up signaling, a wake state for the indicated length of the on-duration to monitor for physical downlink control channel scheduling data from the base station.

Some examples of the method, apparatuses, and non-transitory computer-readable medium described herein may further include operations, features, means, or instructions for receiving the physical downlink control channel and the scheduled data in the on-duration in a same channel occupancy time in which the wake-up signaling may be received. In some examples of the method, apparatuses, and non-transitory computer-readable medium described herein, the length of the on-duration may include operations, features, means, or instructions for entering the wake state for the first length of the on-duration to monitor for the physical downlink control channel scheduling data from the base station.

Some examples of the method, apparatuses, and non-transitory computer-readable medium described herein may further include operations, features, means, or instructions for receiving the wake-up signaling in another physical downlink control channel scheduling the data on scheduled resources with an indication that the data may be guaranteed to be received on the scheduled resources during the on-duration, and receiving the data on the scheduled resource during the on-duration without monitoring for the physical downlink control channel, if the indication may be set. Some examples of the method, apparatuses, and non-transitory computer-readable medium described herein may further include operations, features, means, or instructions for receiving the physical downlink control channel and the scheduled data in the on-duration in a second channel occupancy time.

In some examples of the method, apparatuses, and non-transitory computer-readable medium described herein, the length of the on-duration may include operations, features, means, or instructions for entering the wake state for the second length of the on-duration to monitor for the physical downlink control channel scheduling the data from the base station. Some examples of the method, apparatuses, and non-transitory computer-readable medium described herein may further include operations, features, means, or instructions for receiving, in the wake-up signaling, an indication that the base station may have to gain access to the shared radio frequency spectrum band for the second channel occupancy time before transmitting the data, and monitoring the physical downlink control channel scheduling the data during the on-duration.

Some examples of the method, apparatuses, and non-transitory computer-readable medium described herein may further include operations, features, means, or instructions for receiving, in the wake-up signaling, an indication of an offset between the wake-up signaling and the data. Some examples of the method, apparatuses, and non-transitory computer-readable medium described herein may further include operations, features, means, or instructions for receiving a grant in the on-duration scheduling the UE to receive the data from the base station, receiving a first go-to-sleep signal in the on-duration after receiving the grant, and ignoring the first go-to-sleep signal based on receiving the grant.

Some examples of the method, apparatuses, and non-transitory computer-readable medium described herein may further include operations, features, means, or instructions for receiving a second go-to-sleep signal in the on-duration after receiving the grant, and entering a sleep state based on receiving the second go-to-sleep signal. Some examples of the method, apparatuses, and non-transitory computer-readable medium described herein may further include operations, features, means, or instructions for receiving a go-to-sleep signal in the on-duration, identifying that the UE failed to receive a grant scheduling the UE to receive the data from the base station, and entering a sleep state based on the identifying and on receiving the go-to-sleep signal.

A method of wireless communication at a base station is described. The method may include identifying data to transmit in a shared radio frequency spectrum band to a UE operating according to a discontinuous reception cycle, transmitting, to the UE prior to an on-duration of the discontinuous reception cycle, wake-up signaling including an indication of a length of the on-duration for which the UE is to enter a wake state to receive data from the base station, and transmitting the data to the UE in the on-duration based on transmitting the wake-up signaling.

An apparatus for wireless communication at a base station is described. The apparatus may include a processor, memory coupled with the processor, and instructions stored in the memory. The instructions may be executable by the processor to cause the apparatus to identify data to transmit in a shared radio frequency spectrum band to a UE operating according to a discontinuous reception cycle, transmit, to the UE prior to an on-duration of the discontinuous reception cycle, wake-up signaling including an indication of a length of the on-duration for which the UE is to enter a wake state to receive data from the base station, and transmit the data to the UE in the on-duration based on transmitting the wake-up signaling.

Another apparatus for wireless communication at a base station is described. The apparatus may include means for identifying data to transmit in a shared radio frequency spectrum band to a UE operating according to a discontinuous reception cycle, transmitting, to the UE prior to an on-duration of the discontinuous reception cycle, wake-up signaling including an indication of a length of the on-duration for which the UE is to enter a wake state to receive data from the base station, and transmitting the data to the UE in the on-duration based on transmitting the wake-up signaling.

A non-transitory computer-readable medium storing code for wireless communication at a base station is described. The code may include instructions executable by a processor to identify data to transmit in a shared radio frequency spectrum band to a UE operating according to a discontinuous reception cycle, transmit, to the UE prior to an on-duration of the discontinuous reception cycle, wake-up signaling including an indication of a length of the on-duration for which the UE is to enter a wake state to receive data from the base station, and transmit the data to the UE in the on-duration based on transmitting the wake-up signaling.

Some examples of the method, apparatuses, and non-transitory computer-readable medium described herein may further include operations, features, means, or instructions for performing a listen-before-talk procedure to gain access to the shared radio frequency spectrum band for a channel occupancy time, where the wake-up signaling and the data may be transmitted in the channel occupancy time. Some examples of the method, apparatuses, and non-transitory computer-readable medium described herein may further include operations, features, means, or instructions for selecting a first length as the length of the on-duration from a set of lengths including at least the first length and a second length longer than the first length, where the first length may be associated with receiving wake-up signaling in a same channel occupancy time as associated data, and the second length may be associated with receiving wake-up signaling in a different channel occupancy time from associated data.

Some examples of the method, apparatuses, and non-transitory computer-readable medium described herein may further include operations, features, means, or instructions for transmitting, in the wake-up signaling, a grant for resources and an indication that the data may be guaranteed to be transmitted on the resources in the on-duration if the wake-up signaling and data may be transmitted in a same channel occupancy time. Some examples of the method, apparatuses, and non-transitory computer-readable medium described herein may further include operations, features, means, or instructions for performing a first listen-before-talk procedure to gain access to the shared radio frequency spectrum band for a first channel occupancy time, where the wake-up signaling may be transmitted in the first channel occupancy time, and performing a second listen-before-talk procedure to gain access to the shared radio frequency spectrum band for a second channel occupancy time, where the data may be transmitted in the second channel occupancy time.

Some examples of the method, apparatuses, and non-transitory computer-readable medium described herein may further include operations, features, means, or instructions for selecting a second length as the length of the on-duration from a set of lengths including at least the second length and a first length shorter than the second length, where the second length may be associated with receiving wake-up signaling in a different channel occupancy time from associated data, and the first length may be associated with receiving wake-up signaling in a same channel occupancy time as associated data. Some examples of the method, apparatuses, and non-transitory computer-readable medium described herein may further include operations, features, means, or instructions for transmitting, in the wake-up signaling, an indication that the base station may have to gain access to the shared radio frequency spectrum band for the second channel occupancy time before transmitting the data.

Some examples of the method, apparatuses, and non-transitory computer-readable medium described herein may further include operations, features, means, or instructions for determining a length of a contention window selected for the second listen-before-talk procedure, identifying an offset between the wake-up signaling and the data based on the length of the contention window, and transmitting, in the wake-up signaling, an indication of the offset between the wake-up signaling and the data. Some examples of the method, apparatuses, and non-transitory computer-readable medium described herein may further include operations, features, means, or instructions for transmitting a grant in the on-duration scheduling the UE to receive the data from the base station, and transmitting a first go-to-sleep signal in the on-duration after transmitting the grant, the first go-to-sleep signal indicating that other UEs may be to enter a sleep state. Some examples of the method, apparatuses, and non-transitory computer-readable medium described herein may further include operations, features, means, or instructions for transmitting a second go-to-sleep signal indicating that the UE scheduled to receive the data from the base station may be to enter the sleep state.

A method of wireless communication at a UE is described. The method may include monitoring a shared radio frequency spectrum band for wake-up signaling from a base station, the wake-up signaling for a discontinuous reception cycle at the UE, receiving the wake-up signaling prior to an on-duration of the discontinuous reception cycle, setting an offset between the wake-up signaling and a transmission of data from the base station to zero, and monitoring for the data from the base station after receiving the wake-up signaling based on setting the offset to zero.

An apparatus for wireless communication at a UE is described. The apparatus may include a processor, memory coupled with the processor, and instructions stored in the memory. The instructions may be executable by the processor to cause the apparatus to monitor a shared radio frequency spectrum band for wake-up signaling from a base station, the wake-up signaling for a discontinuous reception cycle at the UE, receive the wake-up signaling prior to an on-duration of the discontinuous reception cycle, set an offset between the wake-up signaling and a transmission of data from the base station to zero, and monitor for the data from the base station after receiving the wake-up signaling based on setting the offset to zero.

Another apparatus for wireless communication at a UE is described. The apparatus may include means for monitoring a shared radio frequency spectrum band for wake-up signaling from a base station, the wake-up signaling for a discontinuous reception cycle at the UE, receiving the wake-up signaling prior to an on-duration of the discontinuous reception cycle, setting an offset between the wake-up signaling and a transmission of data from the base station to zero, and monitoring for the data from the base station after receiving the wake-up signaling based on setting the offset to zero.

A non-transitory computer-readable medium storing code for wireless communication at a UE is described. The code may include instructions executable by a processor to monitor a shared radio frequency spectrum band for wake-up signaling from a base station, the wake-up signaling for a discontinuous reception cycle at the UE, receive the wake-up signaling prior to an on-duration of the discontinuous reception cycle, set an offset between the wake-up signaling and a transmission of data from the base station to zero, and monitor for the data from the base station after receiving the wake-up signaling based on setting the offset to zero.

In some examples of the method, apparatuses, and non-transitory computer-readable medium described herein, setting the offset between the wake-up signaling and the transmission of the data from the base station to zero may include operations, features, means, or instructions for identifying that the UE failed to receive data in a previous on-duration of the discontinuous reception cycle signaled by a previous wake-up signaling, and setting the offset between the wake-up signaling and the transmission of the data from the base station to zero based on the identifying.

Some examples of the method, apparatuses, and non-transitory computer-readable medium described herein may further include operations, features, means, or instructions for detecting a signal transmitted by the base station in the on-duration, determining that the base station may have access to the shared radio frequency spectrum band for at least a portion of the on-duration based on detecting the signal, and setting the offset between subsequent wake-up signaling and an associated data transmission from the base station to non-zero based on determining that the base station may have access to the shared radio frequency spectrum band for at least the portion of the on-duration.

In some examples of the method, apparatuses, and non-transitory computer-readable medium described herein, setting the offset between the wake-up signaling and the transmission of the data from the base station to zero may include operations, features, means, or instructions for receiving a first portion of previous data in a previous on-duration of the discontinuous reception cycle signaled by a previous wake-up signaling, determining that the UE failed to receive a second portion of the previous data in the previous on-duration, and setting the offset between the wake-up signaling and the transmission of the data from the base station to zero based on the determining. Some examples of the method, apparatuses, and non-transitory computer-readable medium described herein may further include operations, features, means, or instructions for receiving signaling indicating a number of wake-up signals for which an offset between each wake-up signal and a respective transmission of data may be set to zero.

A method of wireless communication at a base station is described. The method may include identifying data to transmit to a UE in a shared radio frequency spectrum band, where the UE is operating according to a discontinuous reception cycle, setting an offset between wake-up signaling and a transmission of the data to zero, transmitting the wake-up signaling to the UE prior to an on-duration of the discontinuous reception cycle, and transmitting the data to the UE after transmitting the wake-up signaling based on setting the offset to zero.

An apparatus for wireless communication at a base station is described. The apparatus may include a processor, memory coupled with the processor, and instructions stored in the memory. The instructions may be executable by the processor to cause the apparatus to identify data to transmit to a UE in a shared radio frequency spectrum band, where the UE is operating according to a discontinuous reception cycle, set an offset between wake-up signaling and a transmission of the data to zero, transmit the wake-up signaling to the UE prior to an on-duration of the discontinuous reception cycle, and transmit the data to the UE after transmitting the wake-up signaling based on setting the offset to zero.

Another apparatus for wireless communication at a base station is described. The apparatus may include means for identifying data to transmit to a UE in a shared radio frequency spectrum band, where the UE is operating according to a discontinuous reception cycle, setting an offset between wake-up signaling and a transmission of the data to zero, transmitting the wake-up signaling to the UE prior to an on-duration of the discontinuous reception cycle, and transmitting the data to the UE after transmitting the wake-up signaling based on setting the offset to zero.

A non-transitory computer-readable medium storing code for wireless communication at a base station is described. The code may include instructions executable by a processor to identify data to transmit to a UE in a shared radio frequency spectrum band, where the UE is operating according to a discontinuous reception cycle, set an offset between wake-up signaling and a transmission of the data to zero, transmit the wake-up signaling to the UE prior to an on-duration of the discontinuous reception cycle, and transmit the data to the UE after transmitting the wake-up signaling based on setting the offset to zero.

In some examples of the method, apparatuses, and non-transitory computer-readable medium described herein, setting the offset between the wake-up signaling and the transmission of the data to zero may include operations, features, means, or instructions for identifying that the base station failed to transmit data in a previous on-duration of the discontinuous reception cycle signaled by a previous wake-up signaling, and setting the offset between the wake-up signaling and the transmission of the data to zero based on the identifying.

In some examples of the method, apparatuses, and non-transitory computer-readable medium described herein, setting the offset between the wake-up signaling and the transmission of the data to zero may include operations, features, means, or instructions for transmitting a first portion of previous data in a previous on-duration of the discontinuous reception cycle signaled by a previous wake-up signaling, determining that the base station failed to transmit a second portion of the previous data in the previous on-duration, and setting the offset between the wake-up signaling and the transmission of the data to zero based on the determining. Some examples of the method, apparatuses, and non-transitory computer-readable medium described herein may further include operations, features, means, or instructions for transmitting signaling indicating a number of wake-up signals for which an offset between each wake-up signal and a respective transmission of data may be set to zero.

A method of wireless communication at a UE is described. The method may include monitoring a shared radio frequency spectrum band for wake-up signaling from a base station, the wake-up signaling for a discontinuous reception cycle at the UE, receiving the wake-up signaling prior to an on-duration of the discontinuous reception cycle, determining a periodicity for monitoring for control information from the base station based on receiving the wake-up signaling, the control information including scheduling information for a data transmission from the base station, and monitoring for the control information from the base station in accordance with the determined periodicity.

An apparatus for wireless communication at a UE is described. The apparatus may include a processor, memory coupled with the processor, and instructions stored in the memory. The instructions may be executable by the processor to cause the apparatus to monitor a shared radio frequency spectrum band for wake-up signaling from a base station, the wake-up signaling for a discontinuous reception cycle at the UE, receive the wake-up signaling prior to an on-duration of the discontinuous reception cycle, determine a periodicity for monitoring for control information from the base station based on receiving the wake-up signaling, the control information including scheduling information for a data transmission from the base station, and monitor for the control information from the base station in accordance with the determined periodicity.

Another apparatus for wireless communication at a UE is described. The apparatus may include means for monitoring a shared radio frequency spectrum band for wake-up signaling from a base station, the wake-up signaling for a discontinuous reception cycle at the UE, receiving the wake-up signaling prior to an on-duration of the discontinuous reception cycle, determining a periodicity for monitoring for control information from the base station based on receiving the wake-up signaling, the control information including scheduling information for a data transmission from the base station, and monitoring for the control information from the base station in accordance with the determined periodicity.

A non-transitory computer-readable medium storing code for wireless communication at a UE is described. The code may include instructions executable by a processor to monitor a shared radio frequency spectrum band for wake-up signaling from a base station, the wake-up signaling for a discontinuous reception cycle at the UE, receive the wake-up signaling prior to an on-duration of the discontinuous reception cycle, determine a periodicity for monitoring for control information from the base station based on receiving the wake-up signaling, the control information including scheduling information for a data transmission from the base station, and monitor for the control information from the base station in accordance with the determined periodicity.

Some examples of the method, apparatuses, and non-transitory computer-readable medium described herein may further include operations, features, means, or instructions for determining that the data transmission may be to be received in a same channel occupancy time as the wake-up signaling, determining that the periodicity for monitoring for control information from the base station may be a first periodicity that may be longer than a second periodicity, where the second periodicity may be associated with receiving wake-up signaling in a different channel occupancy time from associated data, and monitoring for the control information from the base station in accordance with the first periodicity. Some examples of the method, apparatuses, and non-transitory computer-readable medium described herein may further include operations, features, means, or instructions for receiving an indication of sub-bands to monitor for the control information from the base station in accordance with the first periodicity, and monitoring the indicated sub-bands for the control information from the base station in accordance with the first periodicity.

Some examples of the method, apparatuses, and non-transitory computer-readable medium described herein may further include operations, features, means, or instructions for determining that the data transmission may be to be received in a different channel occupancy time from the wake-up signaling, determining that the periodicity for monitoring for control information from the base station may be a second periodicity that may be shorter than a first periodicity, where the first periodicity may be associated with receiving wake-up signaling in a same channel occupancy time as associated data, and monitoring for the control information from the base station in accordance with the second periodicity. Some examples of the method, apparatuses, and non-transitory computer-readable medium described herein may further include operations, features, means, or instructions for monitoring all sub-bands for the control information from the base station in accordance with the second periodicity.

A method of wireless communication at a UE is described. The method may include monitoring a first wake-up signaling occasion in a shared radio frequency spectrum band for first wake-up signaling from a base station, the first wake-up signaling for an on-duration of a discontinuous reception cycle at the UE, determining that the UE failed to receive the first wake-up signaling in the first wake-up signaling occasion, and monitoring, for the discontinuous reception cycle, a second wake-up signaling occasion for second wake-up signaling from the base station or entering a sleep state based on the determining, the second wake-up signaling for the on-duration of the discontinuous reception cycle at the UE.

An apparatus for wireless communication at a UE is described. The apparatus may include a processor, memory coupled with the processor, and instructions stored in the memory. The instructions may be executable by the processor to cause the apparatus to monitor a first wake-up signaling occasion in a shared radio frequency spectrum band for first wake-up signaling from a base station, the first wake-up signaling for an on-duration of a discontinuous reception cycle at the UE, determine that the UE failed to receive the first wake-up signaling in the first wake-up signaling occasion, and monitor, for the discontinuous reception cycle, a second wake-up signaling occasion for second wake-up signaling from the base station or entering a sleep state based on the determining, the second wake-up signaling for the on-duration of the discontinuous reception cycle at the UE.

Another apparatus for wireless communication at a UE is described. The apparatus may include means for monitoring a first wake-up signaling occasion in a shared radio frequency spectrum band for first wake-up signaling from a base station, the first wake-up signaling for an on-duration of a discontinuous reception cycle at the UE, determining that the UE failed to receive the first wake-up signaling in the first wake-up signaling occasion, and monitoring, for the discontinuous reception cycle, a second wake-up signaling occasion for second wake-up signaling from the base station or entering a sleep state based on the determining, the second wake-up signaling for the on-duration of the discontinuous reception cycle at the UE.

A non-transitory computer-readable medium storing code for wireless communication at a UE is described. The code may include instructions executable by a processor to monitor a first wake-up signaling occasion in a shared radio frequency spectrum band for first wake-up signaling from a base station, the first wake-up signaling for an on-duration of a discontinuous reception cycle at the UE, determine that the UE failed to receive the first wake-up signaling in the first wake-up signaling occasion, and monitor, for the discontinuous reception cycle, a second wake-up signaling occasion for second wake-up signaling from the base station or entering a sleep state based on the determining, the second wake-up signaling for the on-duration of the discontinuous reception cycle at the UE.

Some examples of the method, apparatuses, and non-transitory computer-readable medium described herein may further include operations, features, means, or instructions for determining that the base station had access to the shared radio frequency spectrum band in the first wake-up signaling occasion, entering the sleep state based on the determining, and avoiding monitoring the second wake-up signaling occasion for the second wake-up signaling from the base station based on the determining. Some examples of the method, apparatuses, and non-transitory computer-readable medium described herein may further include operations, features, means, or instructions for determining that the base station failed to gain access to the shared radio frequency spectrum band for the first wake-up signaling occasion, and monitoring the second wake-up signaling occasion for the second wake-up signaling from the base station based on the determining.

Some examples of the method, apparatuses, and non-transitory computer-readable medium described herein may further include operations, features, means, or instructions for detecting that an energy of a channel monitored for the first wake-up signaling in the first wake-up signaling occasion may be below a threshold, entering the sleep state based on the detecting, and avoiding monitoring the second wake-up signaling occasion for the second wake-up signaling from the base station based on the determining. Some examples of the method, apparatuses, and non-transitory computer-readable medium described herein may further include operations, features, means, or instructions for detecting that an energy of a channel monitored for the first wake-up signaling in the first wake-up signaling occasion may be below a threshold, determining that a hidden node blocked the first wake-up signaling from the base station, and monitoring the second wake-up signaling occasion for the second wake-up signaling from the base station based on the determining.

DETAILED DESCRIPTION

In some wireless communications systems, a UE may operate in a discontinuous reception (DRX) mode (e.g., a connected DRX mode (CDRX)) according to a DRX cycle. In the DRX mode, the UE may enter a sleep state for off-durations of the DRX cycle to save power, and the UE may enter a wake state for on-durations of the DRX cycle to monitor for data from a base station. To further limit power consumption, a UE may be configured to only wake up in an on-duration of a DRX cycle when the UE receives a wake-up signal (WUS) from a base station prior to or at the beginning of the on-duration. In some cases, however, when the UE is communicating with the base station in a shared radio frequency (RF) spectrum, the base station may or may not be able to gain access to the shared radio frequency spectrum for a data transmission in an on-duration after transmitting a WUS to the UE indicating that the UE is to wake up for the on-duration. In such cases, if the base station fails to gain access to the shared spectrum for the on-duration at the UE, the power used by the UE to wake up and monitor for data from the base station in the on-duration may be wasted. Alternatively, if the base station gains access to the shared spectrum after the on-duration at the UE, the UE may miss the data transmission from the base station, resulting in loss of throughput.

As described herein, a wireless communications system may support efficient techniques for improving communications between a UE and a base station in a shared radio frequency spectrum while the UE is operating in a DRX mode. In particular, a UE may be configured to adapt operation in a DRX mode based on whether a base station has access to a shared radio frequency spectrum. In one example, a UE may adjust a length of an on-duration for monitoring for a data transmission from a base station based on whether the base station has access to a shared radio frequency spectrum. In another example, a UE may adjust a periodicity for monitoring for control information from a base station in an on-duration based on whether the base station has access to the shared radio frequency spectrum. In yet another example, the UE may determine whether to keep monitoring subsequent wake-up signaling occasions for wake-up signaling from the base station after failing to receive wake-up signaling from the base station in previous wake-up signaling occasions based on whether the base station has access to the shared radio frequency spectrum. Further techniques to improve operation in a DRX mode are also described.

Aspects of the disclosure introduced above are initially described in the context of a wireless communications system. Examples of processes and signaling exchanges that support power saving for DRX in a shared spectrum are then described. Aspects of the disclosure are further illustrated by and described with reference to apparatus diagrams, system diagrams, and flowcharts that relate to power saving for DRX in a shared spectrum.

Figure 1:
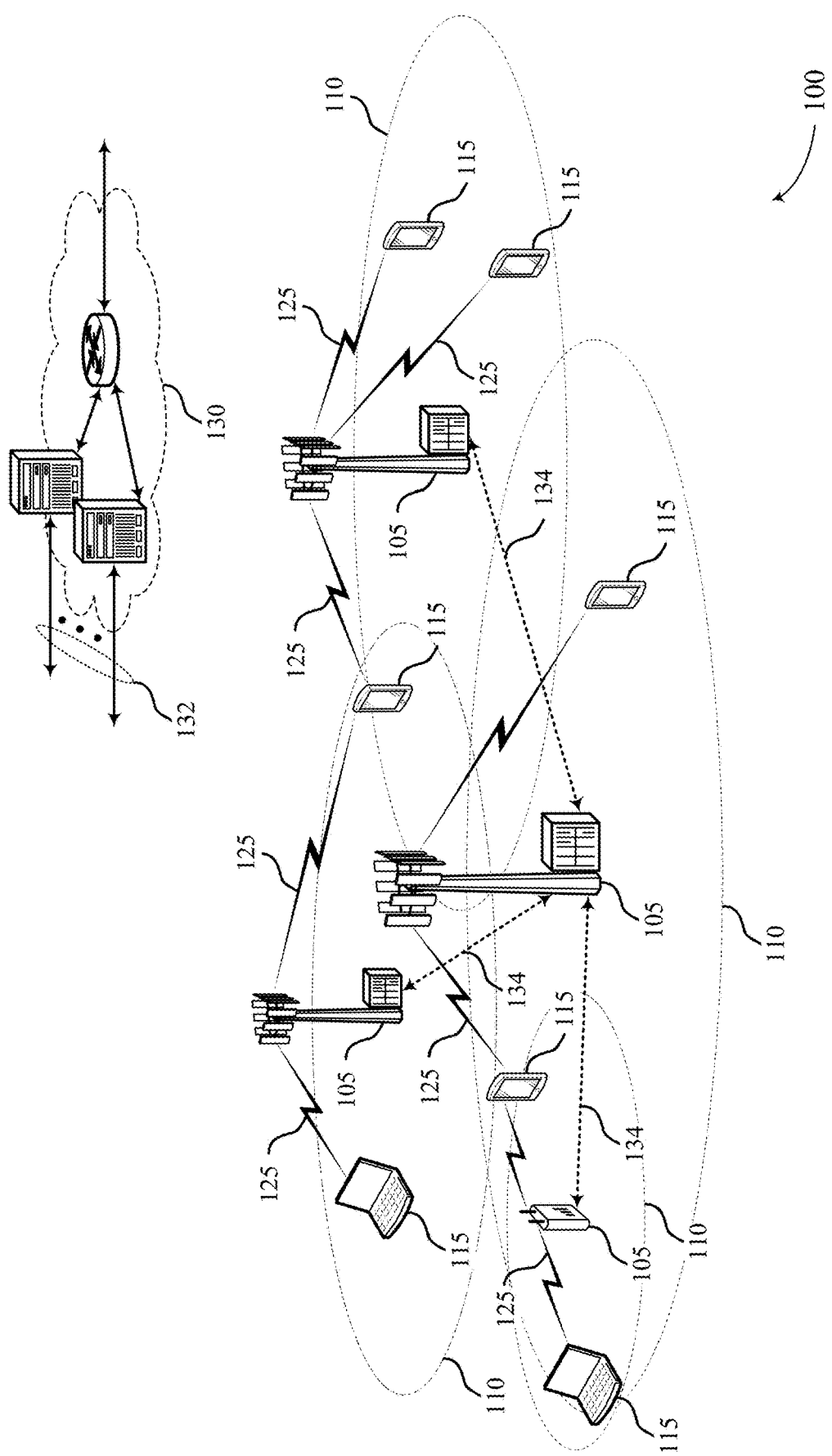
FIG. 1 illustrates an example of a wireless communications system that supports power saving for discontinuous reception (DRX) in a shared spectrum in accordance with aspects of the present disclosure.

FIG. 1 illustrates an example of a wireless communications system 100 that supports power saving for DRX in a shared spectrum in accordance with aspects of the present disclosure. The wireless communications system 100 includes base stations 105, UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105 (e.g., in a physical uplink control channel (PUCCH) or a physical uplink shared channel (PUSCH)), or downlink transmissions from a base station 105 to a UE 115 (e.g., in a physical downlink control channel (PDCCH) or a physical downlink shared channel (PDSCH)). Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" may refer to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

The term "carrier" may refer to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)) and may be positioned according to a channel raster for discovery by UEs 115. Carriers may be downlink or uplink (e.g., in a frequency division duplexing (FDD) mode), or be configured to carry downlink and uplink communications (e.g., in a time division duplexing (TDD) mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $Ts=1/30,720,000$ seconds. Time intervals of a communications resource may be organized according to radio frames each having a duration of 10 milliseconds (ms), where the frame period may be expressed as $Tf=307,200$ Ts. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100 and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some cases, wireless communications system 100 may utilize both unshared (e.g., licensed, such as exclusively licensed) and shared (e.g., unlicensed) radio frequency spectrum bands. For example, wireless communications system 100 may employ License Assisted Access (LAA), LTE-Unlicensed (LTE-U) radio access technology, or NR technology in an unlicensed band such as the 5 GHz and 60 GHz ISM bands (e.g., NR unlicensed (NR-U)). Techniques or procedures described with reference to share or unlicensed radio frequency spectrum bands may also be applied to shared licensed radio frequency spectrum bands. When operating in unlicensed radio frequency spectrum bands, wireless devices such as base stations 105 and UEs 115 may employ listen before talk (LBT) procedures to ensure a frequency channel (e.g., an LBT subchannel or a frequency band that is accessible via an LBT procedure) is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these.

Duplexing in unlicensed spectrum may be based on FDD, TDD, or a combination of both.

In some implementations, there may be different categories of LBT procedures, including category 1 LBT (i.e., no LBT), category 2 LBT (i.e., LBT including one-time channel sensing for a fixed period without a back-off period), category 3 LBT (i.e., LBT with a random (or other) back-off period and a fixed sized contention window), and category 4 LBT (i.e., LBT with a random (or other) back-off period and a variable sized contention window). In some cases, a category 2 LBT procedure may be referred to as a one-time LBT procedure where a UE 115 may perform channel sensing for a defined duration (e.g., 25 μs). Further, a category 4 LBT procedure may be referred to as a fairness-based LBT procedure for performing channel sensing with a backoff, where the backoff may be used to prevent a UE from accessing a channel immediately after detecting that the channel is clear.

In wireless communications system 100, a UE 115 may communicate with a base station 105 while operating in a DRX mode (e.g., connected mode DRX (DRX)). In the DRX mode, the UE may be configured with a DRX cycle that includes off-durations (which may also be referred to as inactive durations) for which the UE 115 may enter a sleep state to save power and on-durations (which may also be referred to as active durations) for which the UE 115 may enter a wake state to monitor for data from the base station 105. That is, the UE 115 may wake up periodically in on-durations of the DRX cycle to monitor for data or control information from a base station 105. Because the UE may enter the sleep state for off-durations of the DRX cycle when operating in the DRX mode, power consumption at the UE may be limited. In some cases, however, when operating in the DRX mode, the UE may be configured to constantly monitor for control information in one or more PDCCHs during on-durations, resulting in high power usage. In such cases, if the UE 115 fails to receive the control information in the on-durations, the power used to monitor for the control information in the on-durations may be wasted.

Thus, to further limit power consumption, a UE 115 may be configured to only wake up in an on-duration of a DRX cycle when the UE receives a WUS from a base station 105 prior to or at the beginning of the on-duration. The WUS may be referred to as a power saving signal or channel and may be a PDCCH (e.g., common PDCCH or UE-specific PDCCH with cross-slot scheduling), a reference signal, a MAC control element (MAC-CE), an RRC signal, or a new signal or channel. In addition, the WUS may indicate whether or not a UE 115 is to receive data in an on-duration some time before the start of the on-duration. After receiving the WUS, the UE 115 may enter a sleep state and wake up after a gap or offset to receive data in the on-duration. That is, a gap or offset (e.g., guaranteed) may be configured between a WUS and an on-duration (e.g., to enable fast sleep). The use of a WUS may be similar to cross-slot scheduling by a PDCCH, where a UE 115 wakes up after a gap only if the UE 115 is scheduled. In some systems (e.g., NR), the minimum gap between the PDCCH and PDSCH may be zero (e.g., where RRC can configure K0>0). In such systems, a UE 115 may not turn off an RF chain until it determines that there is no PDCCH scheduling PDSCH in the same slot.

Because the complexity associated with monitoring for a WUS may be lower than the complexity associated with monitoring for a PDCCH used to schedule a data transmission, power savings may be improved at a UE 115 configured to monitor for a WUS before or at the beginning of an on-duration of a DRX cycle. In addition, power savings may be improved even further because the UE 115 may buffer the WUS and switch off a radio frequency (RF) chain during the gap or offset after the WUS (i.e., due to faster RF turnoff, where the UE 115 may switch on the RF chain after the gap or offset if the WUS is valid).

Figure 2:
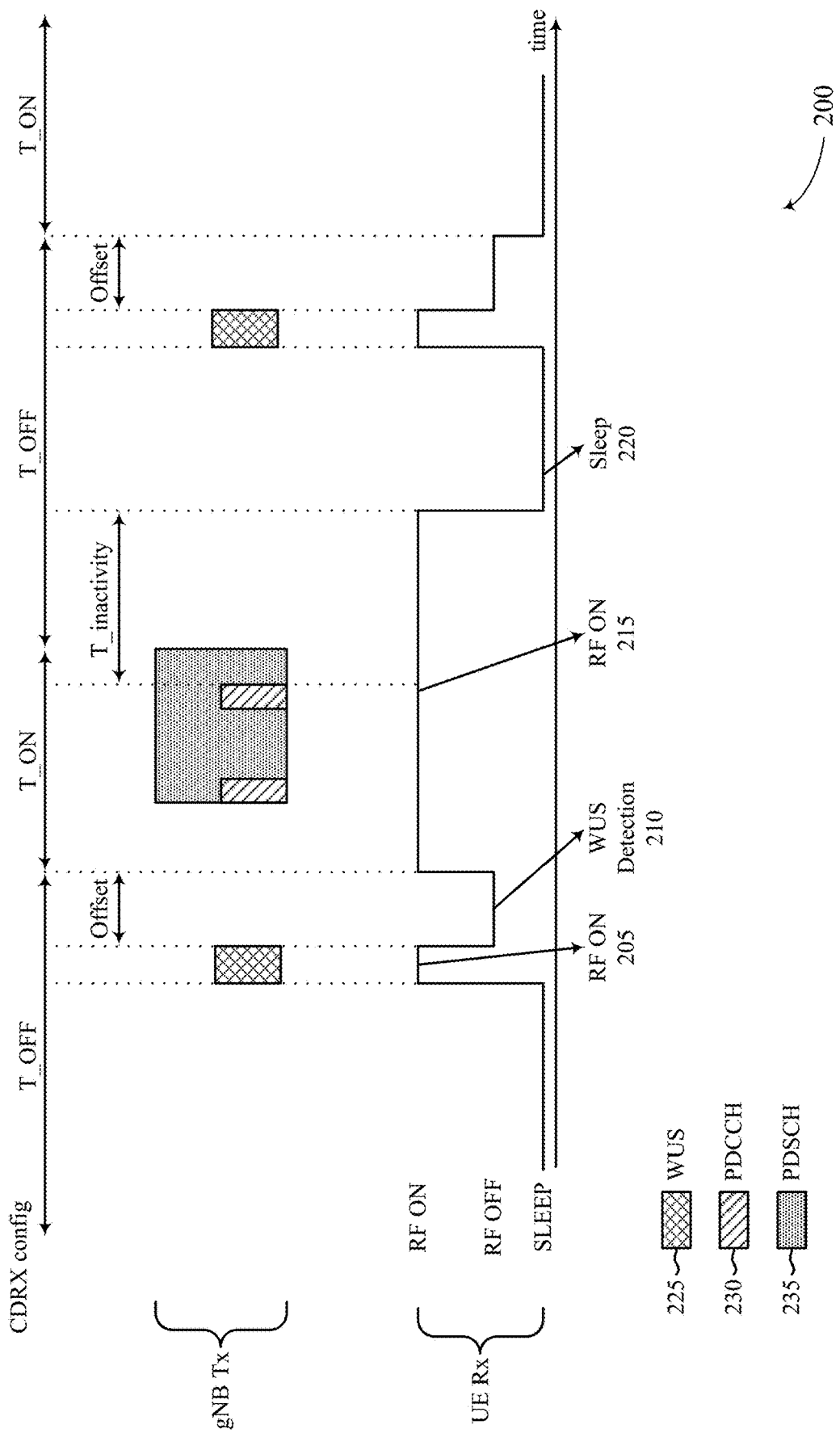
FIG. 2 illustrates an example of a DRX cycle at a user equipment (UE) used in combination with wake-up signaling in accordance with aspects of the present disclosure.

FIG. 2 illustrates an example of a DRX cycle 200 at a UE 115 used in combination with wake-up signaling in accordance with aspects of the present disclosure. The wake-up signaling may be used in off-durations of the DRX cycle to indicate to the UE 115 whether to wake up or continue to sleep in on-durations on the DRX cycle. In some cases, discontinuous transmission (DTX) may also be supported.

At 205, the UE 115 may switch on an RF chain for a wake-up signaling occasion, and the UE 115 may receive a WUS 225. At 210, the UE 115 may then switch off the RF chain and detect the WUS received at 205. After a gap or offset, the UE 115 may switch on the RF chain in an on-duration of the DRX cycle to receive control information in first and second PDCCHs 230 and data in a PDSCH 235 from a base station 105. At 220, after the UE 115 receives the second PDCCH and fails to receive another PDCCH for the duration of an inactivity timer, the UE 115 may enter a sleep state in an off-duration of the DRX cycle. The UE 115 may then repeat the procedures described above to continue receiving data from the base station 105 in accordance with the DRX cycle while limiting power consumption. In some examples, in addition to wake-up signaling, the UE 115 may support go-to-sleep (GTS) signaling (e.g., layer 1 GTS (L1GTS) signaling). In such examples, the base station 105 may transmit GTS signaling to the UE 115 in on-durations of the DRX cycle to indicate to the UE 115 to go to sleep or avoid monitoring for PDCCHs (e.g., PDCCH skipping). The GTS signaling may also indicate to the UE 115 to adapt (e.g., change) a bandwidth part, a PDCCH monitoring scheme, or a set of receive antennas being used at the UE 115, or one or more of these.

In some cases, a UE 115 operating in a DRX mode in accordance with a DRX cycle may be configured to communicate with a base station in a shared RF spectrum. The shared spectrum may be a spectrum that is unlicensed, licensed to multiple operators, or licensed to a single operation with opportunistic access by other devices (e.g., a licensed radio frequency spectrum band, an unlicensed radio frequency spectrum band, or a combination of licensed and unlicensed radio frequency spectrum band). In such cases, however, a base station 105 may perform an independent LBT to gain access to the shared spectrum for a WUS transmission and another independent LBT to gain access to the shared spectrum for a data transmission after the gap or offset following the WUS transmission (e.g., where a category 4 LBT procedure may fail for either of the WUS transmission and the data transmission).

Accordingly, in some instances, the base station 105 may transmit a WUS to a UE 115 indicating that the UE 115 is to enter a wake state for an on-duration, and the base station 105 may or may not be able to gain access to the shared spectrum for a data transmission in the on-duration. In such instances, if the base station fails to gain access to the shared spectrum for the on-duration at the UE, the power used by the UE to wake up and monitor for control information or data from the base station 105 in the on-duration may be wasted. Alternatively, if the base station 105 gains access to the shared spectrum after the on-duration at the UE 115, the UE 115 may miss the data transmission from the base station 105, resulting in loss of throughput. Wireless communications system 100 may support efficient techniques for improving communications between a UE 115 and a base station 105 in a shared spectrum while the UE 115 is operating in a DRX mode. In particular, a UE 115 may be configured to adapt operation in a DRX mode based on whether a base station 105 has access to a shared spectrum.

Figure 3:
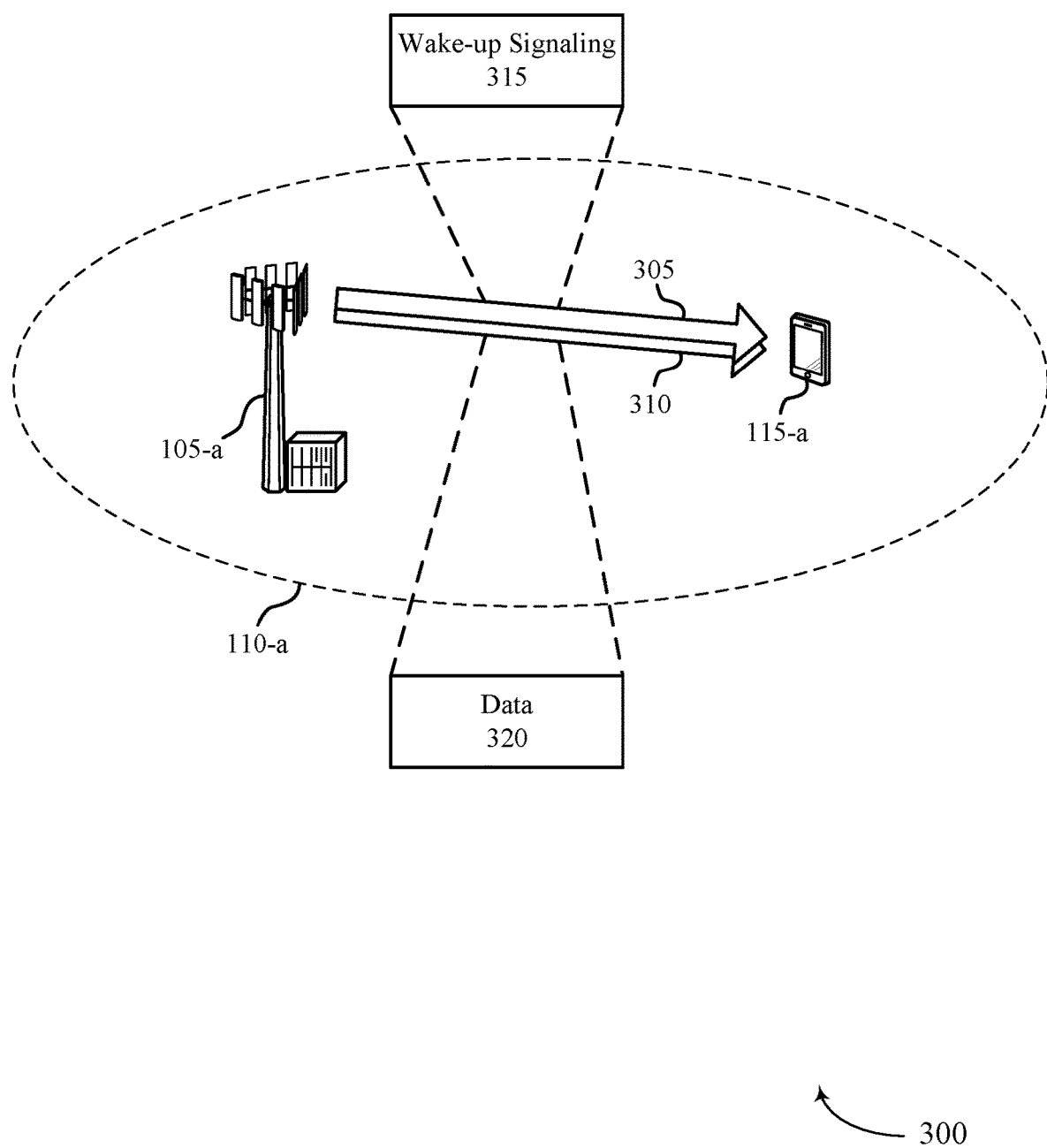
FIG. 3 illustrates an example of a wireless communications system that supports power saving for DRX in a shared spectrum in accordance with aspects of the present disclosure.

FIG. 3 illustrates an example of a wireless communications system 300 that supports power saving for DRX in a shared spectrum in accordance with aspects of the present disclosure. The wireless communications system 300 includes a UE 115-a, which may be an example of a UE 115 described with reference to FIGS. 1 and 2. The wireless communications system 300 also includes a base station 105-a, which may be an example of a base station 105 described with reference to FIGS. 1 and 2. The base station 105-a may provide communication coverage for a coverage area 110-a. Base station 105-a may communicate with UE 115-a in a shared spectrum, and base station 105-a may transmit downlink signals to UE 115-a on resources of a carrier 305 and a carrier 310 (e.g., same or different carriers). The wireless communications system 300 may implement aspects of wireless communications system 100. For example, the wireless communications system 300 may support efficient techniques for improving communications between UE 115-a and base station 105-a in a shared spectrum while the UE 115-a is operating in a DRX mode.

In the example of FIG. 3, UE 115-a may monitor for wake-up signaling 315 from base station 105-a in the DRX mode, and, after receiving the wake-up signaling 315 indicating that the UE 115-a is to wake up for an on-duration, UE 115-a may monitor for data 320 from the base station 105-a in the on-duration. In accordance with the techniques described herein, the UE 115-a may be configured to adapt operation in the DRX mode based on whether the base station 105-a has access to a shared spectrum. In one example, the UE 115-a may adjust a length of an on-duration for monitoring for a data transmission from the base station 105-a based on whether the base station 105-a has access to a shared spectrum. In another example, the UE 115-a may adjust a periodicity for monitoring for control information from the base station 105-a in an on-duration based on whether the base station 105-a has access to the shared spectrum. In yet another example, the UE 115-a may determine whether to keep monitoring subsequent wake-up signaling occasions for wake-up signaling from the base station 105-a after failing to receive wake-up signaling from the base station 105-a in previous wake-up signaling occasions based on whether the base station 105-a has access to the shared spectrum. Further techniques for improving operation in a DRX mode are also described.

Figure 4:
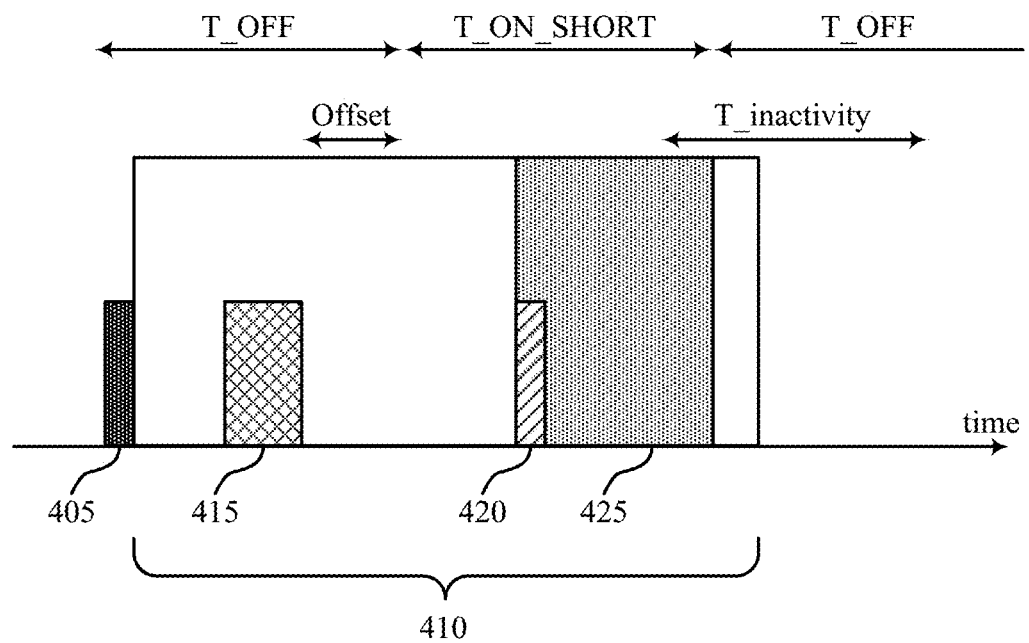
FIGS. 4 through 8 illustrate examples of communications between a UE operating in a DRX mode and a base station in a shared spectrum in accordance with aspects of the present disclosure.
Figure 5:
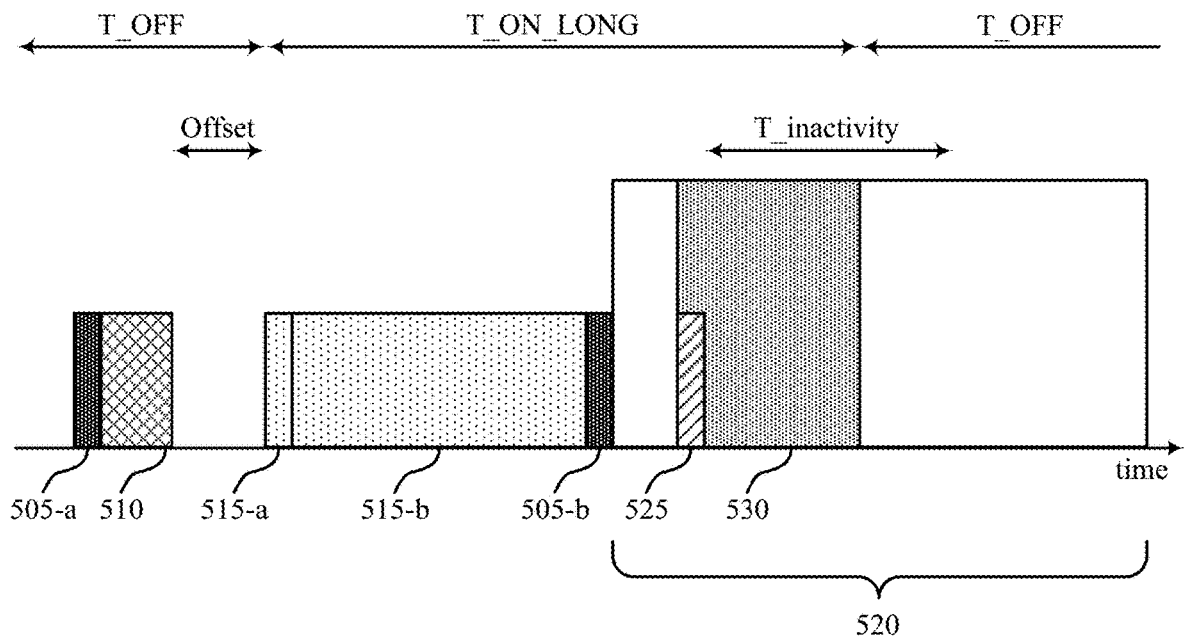

FIGS. 4 and 5 illustrate examples of communications between a UE 115 operating in a DRX mode and a base station 105 in a shared spectrum in accordance with aspects of the present disclosure. In these examples, the base station 105 may transmit wake-up signaling to the UE 115 indicating a length of an on-duration for which the UE 115 is to enter a wake state to receive data from the base station 105. That is, the wake-up signaling may include a bit indicating a length of an on-duration, and the UE 115 may be configured to adapt (or adjust) the length of the on-duration based on the wake-up signaling received from the base station 105. The length of the on-duration may be selected from a set of two or more values, including at least a first, shorter length and a second, longer length. The base station 105 may determine whether to configure the UE 115 with the first, shorter on-duration or the second, longer on-duration for monitoring for data from the base station 105 (or a third, different on-duration) based on whether the base station 105 has access to the shared spectrum for a data transmission (e.g., at the time of transmitting the wake-up signaling).

In the example of FIG. 4, the base station 105 may configure the UE 115 with the first, short on-duration for monitoring for data from the base station 105 (e.g., based on the wake-up signaling 415 and the following PDCCH 420 and PDSCH 425 being in the same COT). The base station 105 may perform a successful LBT procedure 405 to gain access to the shared spectrum for a channel occupancy time (COT) 410. The base station 105 may then transmit wake-up signaling 415 to the UE 115 indicating that the UE 115 is to monitor for data from the base station 105 in an on-duration (e.g., a subsequent on-duration). Because the base station 105 may have access to the shared spectrum for the COT 410 spanning the wake-up signaling 415 and at least a portion of the on-duration, the base station 105 may configure the UE 115 with a first, short on-duration for monitoring for the data from the base station 105. That is, the base station 105 may transmit an indication in the wake-up signaling 415 that the UE 115 is to wake up for the first, short on-duration to receive the data from the base station 105.

The base station 105 may then transmit control information in a PDCCH 420 and data in a PDSCH 425 to the UE 115 in the short on-duration (e.g., where the control information in the PDCCH 420 includes scheduling information for the PDSCH 425). The UE 115 may enter a wake state for the short on-duration to receive the control information and the data from the base station 105. Using the techniques described above, because the on-duration may be short when the wake-up signaling 415 and the PDSCH 425 are in a same COT, the UE 115 may save power. In some cases, the base station 105 may gain access to the shared spectrum for the COT 410 to transmit data to one or more other UEs 115 or to transmit a dedicated reference signal (DRS) or a synchronization signal block (SSB). In such cases, the base station 105 may transmit the data, DRS, or SSB in the gap or offset between the wake-up signaling 415 and the PDSCH 425. Thus, if the gap or offset between the wake-up signaling 415 and the PDSCH 425 can be filled with a DRS, SSB, data for another UE, or any other signals, the wake-up signaling may indicate a short length for a subsequent on-duration (e.g., where the DRS, SSB, or data transmissions are aligned to the gap or offset).

In the example of FIG. 5, the base station 105 may configure the UE 115 with the second, long on-duration for monitoring for data from the base station 105 (e.g., based on the wake-up signaling 510 and the following PDCCH 525 and PDSCH 530 being in different COTs). The base station 105 may perform a successful LBT procedure 505-a to gain access to the shared spectrum for a first COT (not shown) to transmit wake-up signaling 510 to the UE 115. The first COT may not extend beyond the wake-up signaling since the base station 105 may not have other data or signals to transmit to other UEs 115. The base station 105 may then transmit the wake-up signaling 510 to the UE 115 indicating that the UE 115 is to monitor for data from the base station 105 in an on-duration (e.g., a subsequent on-duration). Because the first COT may not extend beyond the wake-up signaling, the base station 105 may have to regain access to the shared spectrum for a second COT to transmit data in the on-duration to the UE 115, and the base station may configure the UE 115 with a second, long on-duration for monitoring for data from the base station 105. That is, the base station 105 may transmit an indication in the wake-up signaling 510 that the UE 115 is to wake up for the second, long on-duration to receive data from the base station.

The base station 105 may perform LBT procedures 515-*a* and 515-*b* to attempt to regain access to the shared spectrum to transmit data to the UE 115, and the LBT procedures 515-*a* and 515-*b* may fail. The base station 105 may then perform a successful LBT procedure 505-*b* to regain access to the shared spectrum for a second COT 520, and the base station 105 may transmit control information in a PDCCH 525 and data in a PDSCH 530 in the second COT 520 (e.g., where the control information in the PDCCH 525 includes scheduling information for the PDSCH 530). Because the UE 115 may extend an on-duration (e.g., based on being configured with the second, long on-duration), the UE 115 may be in a wake state for the transmissions from the base station 105, and the UE 115 may receive the control information and the data from the base station 105. Thus, in accordance with the techniques described with reference to FIG. 5, if the base station 105 cannot guarantee to be able to send the wake-up signaling 510 and the data in the PDSCH 530 in the same COT (e.g., as the wake-up signaling 510 and the PDSCH 530 may be in different COTs), the base station 105 may configure the UE 115 to monitor for the second, long on-duration.

In some cases, if the wake-up signaling 510 and the PDSCH 530 are in different COTs, the UE 115 may be configured to dynamically change the offset after the wake-up signaling 510. For example, the UE 115 may adjust the offset after the wake-up signaling 510 based on the random contention window selected by the base station 105 for an LBT procedure (e.g., a category 4 LBT procedure) used to gain access to the shared spectrum for the second COT. The base station 105 may determine the length of the contention window, identify an offset between the wake-up signaling 510 and the PDSCH 530 based on the contention window, and transmit an indication of the offset in the wake-up signaling 510 to the UE 115. The UE 115 may then wait to enter a wake state for an on-duration until after the indicated offset following the wake-up signaling 510. Because the offset after the wake-up signaling 510 may be adjusted (e.g., extended or increased), the UE 115 may save power by avoiding entering the wake state for additional time (e.g., time used by the base station 105 for the LBT procedure).

In addition to adapting or adjusting the length of an on-duration based on whether a base station 105 has access to the shared spectrum, a UE 115 may be configured to adapt or adjust a periodicity for monitoring for control information from the base station 105 in an on-duration based on whether the base station 105 has access to the shared spectrum. In such cases, the base station 105 may transmit wake-up signaling to the UE 115 indicating the periodicity for monitoring for control information from the base station 105. That is, the wake-up signaling may include a bit indicating a periodicity for monitoring for control information in an on-duration (e.g., a long value and a short value or more than two values), and the UE 115 may be configured to adapt (or adjust) the periodicity for monitoring for control information in the on-duration based on the wake-up signaling received from the base station 105. The base station 105 may determine whether to configure the UE 115 with a first, short periodicity or a second, long periodicity for monitoring for control information based on whether the base station 105 has access to the shared spectrum for a data transmission (e.g., at the time of transmitting the wake-up signaling).

In the example of FIG. 4, the base station 105 may configure the UE 115 with a first, long periodicity for monitoring for control information from the base station 105 in an on-duration based on the base station 105 having access to the shared spectrum for the data transmission at the time of transmitting the wake-up signaling 415. That is, when the wake-up signaling 415 and the following PDCCH 420 and PDSCH 425 are in the same COT 410, the UE 115 may monitor for control information with a first, long periodicity (e.g., per slot) to save power. In some cases, the wake-up signaling 415 may indicate the sub-bands for the UE 115 to monitor for the control information with the (e.g., for sub-band based PDCCH monitoring).

In the example of FIG. 5, the base station 105 may configure the UE 115 with a second, short periodicity for monitoring for control information from the base station 105 in an on-duration based on the base station 105 not having access to the shared spectrum for the data transmission at the time of transmitting the wake-up signaling. That is, when the wake-up signaling and the following PDCCH and PDSCH are in different COTs, the UE 115 may monitor for control information with a second, short periodicity (e.g., per mini-slot) since the base station 105 may attempt to transmit the control information in the PDCCH with a high granularity to gain access to the shared spectrum. For example, the UE 115 may monitor all coresets. In some cases, the UE 115 may monitor all sub-bands for the control information from the base station 105 (e.g., for sub-band based PDCCH monitoring).

In some aspects, the wake-up signaling described above may be a PDCCH that schedules the PDSCH similar to cross-slot scheduling schemes. In such aspects, the wake-up signaling may include a PDSCH guarantee bit that indicates whether the UE 115 is guaranteed to receive data in the on-duration. That is, when the wake-up signaling and the following PDSCH are in a same COT, the wake-up signaling or PDCCH may include a bit to guarantee the PDSCH after the gap or offset following the wake-up signaling (e.g., to allow the UE 115 to directly start decoding the PDSCH at the scheduled occasion without monitoring for a PDCCH again). In this case, the UE 115 may avoid monitoring for an additional (or initial) PDCCH in the on-duration to decode the first PDSCH in the on-duration. Alternatively, when the wake-up signaling and the following PDSCH are in different COTs, the wake-up signaling or PDCCH may include a bit to indicate that the PDSCH after the gap or offset following the wake-up signaling is not guaranteed. For example, the bit may indicate that the base station 105 has to gain access to the shared spectrum for another COT before transmitting the data in a PDSCH. In this case, the UE 115 may monitor for an additional (or initial PDCCH) in the on-duration to decode the first PDSCH in the on-duration.

In the examples described above, the base station 105 may transmit indications in the wake-up signaling of the length of an on-duration and the periodicity for monitoring for control information in the on-duration. In some cases, however, instead of receiving signaling from the base station 105 indicating the length of the on-duration or the periodicity for monitoring for control information, the UE 115 may be configured to detect whether the base station 105 has access to the shared spectrum (e.g., for at least a portion of an on-duration) to determine the length of the on-duration or the periodicity for monitoring for control information. For example, the UE 115 may determine whether a base station 105 has access to the shared spectrum in an on-duration based on detecting (or receiving) scheduling information for a COT (COT-SI) or a GTS signal from the base station 105 in the on-duration. If the UE 115 determines that the base station 105 has access to the shared spectrum in an on-duration, the UE 115 may monitor for data from the base station 105 for a first, short on-duration (i.e., the UE 115 may use a shortened on-duration), and the UE 115 may monitor for control information from the base station 105 with a first, long periodicity. Alternatively, if the UE 115 determines that the base station 105 does not have access to the shared spectrum in an on-duration, the UE 115 may monitor for data from the base station 105 for a second, long on-duration (i.e., the UE 115 may use an extended on-duration), and the UE 115 may monitor for control information from the base station 105 with a second, short periodicity.

Figure 6:
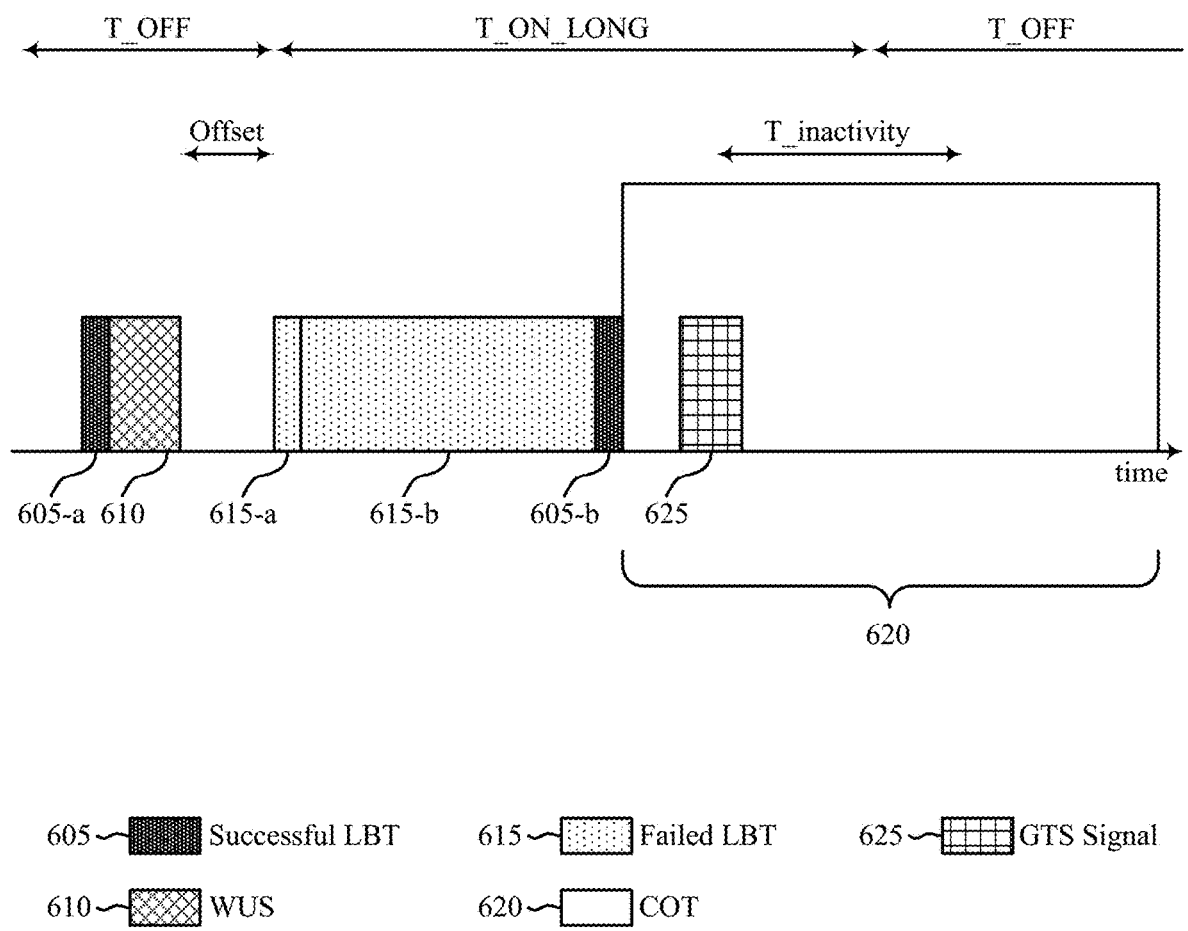

FIG. 6 illustrates an example of communication between a UE 115 operating in a DRX mode and a base station 105 in a shared spectrum in accordance with aspects of the present disclosure. In the example of FIG. 6, a base station 105 may transmit GTS signaling to a UE 115 indicating that the UE 115 is to enter a sleep state. Specifically, as described with reference to FIG. 5, it may be appropriate for a UE 115 to increase or extend an on-duration to account for time for a base station 105 to perform an LBT procedure to gain access to a shared spectrum. In some cases, however, even UEs that may not be served in an on-duration may extend the on-duration (e.g., when wake-up signaling is group-based rather than UE-specific). In such cases, the UEs 115 may enter a wake state for a long time in an on-duration, and the power used to monitor for signals from a base station 105 in the on-duration may be wasted. If the wake-up signaling transmitted by a base station 105 is UE-specific, the base station 105 may avoid transmitting the GTS signaling. The GTS signaling may be referred to as layer 1 GTS (L1GTS) signaling or PDCCH skip signaling, which may be different from higher layer GTS signaling, and a L1GTS signal (e.g., similar to a wake-up signal) may be transmitted in an on-duration of a DRX cycle.

In the example of FIG. 6, the base station 105 may transmit GTS signaling in an on-duration that indicates to UEs 115 that detect the GTS signaling and fail to receive a grant from the base station 105 to enter a sleep state. The base station 105 may perform a successful LBT procedure 605-a to gain access to a shared spectrum and may transmit wake-up signaling 610 to a group of UEs. The base station 105 may then perform LBT procedures 615-a and 615-b to attempt to regain access to the shared spectrum to transmit data to at least one of the UEs, and the LBT procedures 615-a and 615-b may fail. In some cases, while the base station 105 performs the LBT procedures 615-a and 615-b, each of the UEs 115 in the group may have already entered a wake state and may be monitoring for control information from the base station. To limit the power consumption at the UEs that may not be served in the on-duration, after the base station 105 gains access to the shared spectrum for a COT 620 using a successful LBT procedure 605-b, the base station 105 may transmit GTS signaling in the on-duration.

The subset of UEs that receive the GTS signaling 625 and fail to receive a grant scheduling a data transmission before the GTS signaling 625 may enter a sleep state to save power. Alternatively, the subset of UEs that receive the GTS signaling 625 and identify a grant received before the GTS signaling may ignore the GTS signaling 625 and continue to monitor for data from the base station 105 in the on-duration. In some cases, the GTS signaling 625 may be UE ID specific or may be specific to a group of UEs 115 (e.g., UEs not served by the base station 105). The GTS signaling may also include a list of UE-IDs that identify UEs that should remain in a wake state and other UEs that should enter a sleep state. The GTS signaling 625 may be a common signal to indicate for all UEs 115 to go to sleep (e.g., by default) except granted or served UEs 115 (i.e., UEs receiving PDCCH in the on-duration, same COT, same slot, within a certain duration of the wake-up signaling 610, etc.). In some cases, the base station 105 may transmit second GTS (or L1GTS) signaling (e.g., after the on-duration or during a period of inactivity) that indicates that all UEs should enter a sleep state. Using these techniques, UEs that are not served in an on-duration may enter a sleep state early, and even served UEs may enter a sleep state before the inactivity timer expires.

Figure 7:
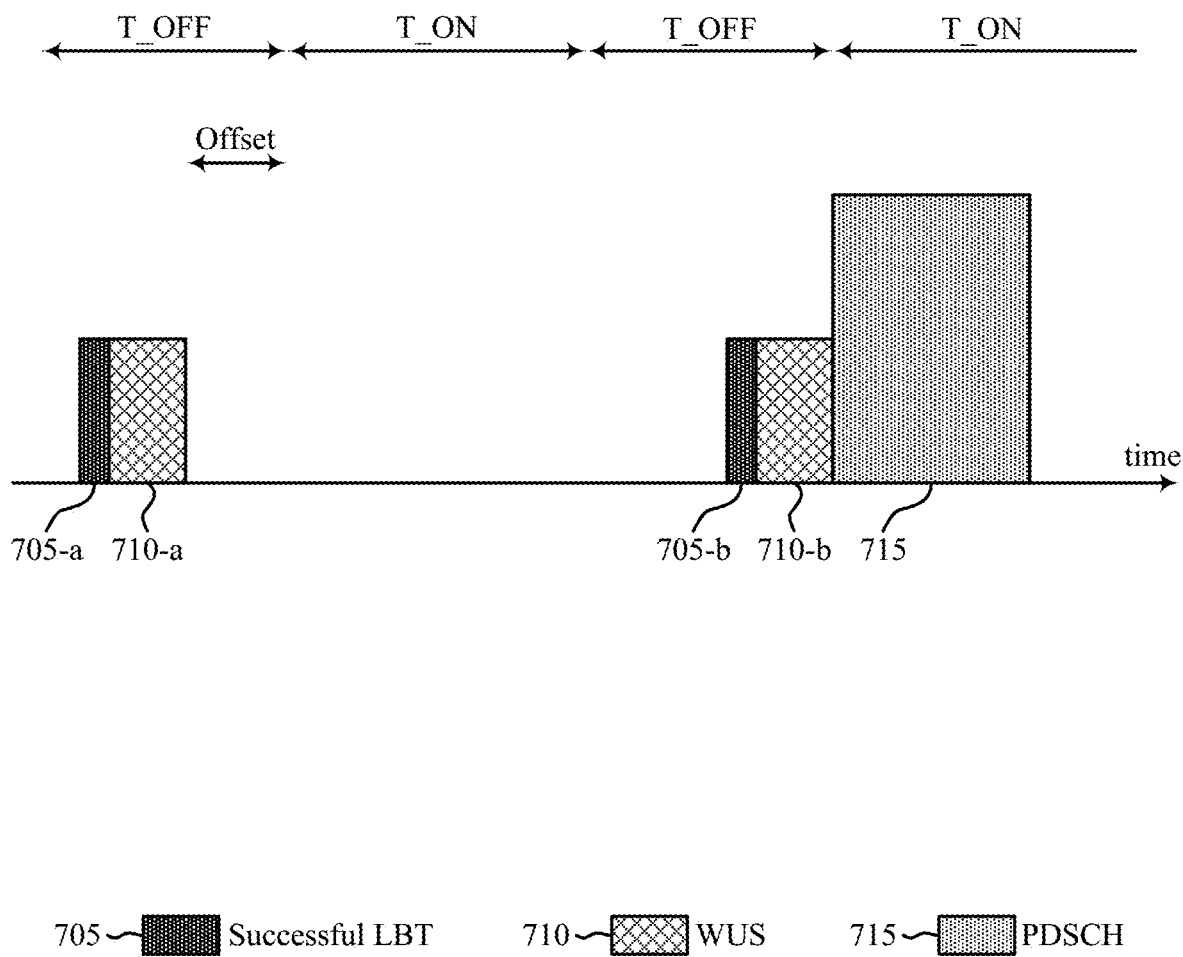

FIG. 7 illustrates an example of communications between a UE 115 operating in a DRX mode and a base station 105 in a shared spectrum in accordance with aspects of the present disclosure. In the example of FIG. 7, a base station 105 and a UE 115 may set an offset between wake-up signaling and data to zero to limit latency. In particular, after a base station 105 gains access to a shared spectrum to transmit wake-up signaling and the base station 105 leaves an offset or gap after the wake-up signaling and before a data transmission, it may take a long time for the base station 105 to regain access to the shared spectrum (e.g., a second COT, since the base station 105 may perform a category 4 LBT procedure to regain access to the shared spectrum for the second COT). Accordingly, in some cases, it may be appropriate for the base station 105 to transmit data to the UE 115 without a gap after the wake-up signaling. In such cases, the UE 115 may monitor for data from the base station 105 after receiving the wake-up signaling without an offset after the wake-up signaling (e.g., offset=0).

In the example of FIG. 7, a base station 105 and a UE 115 may set an offset between wake-up signaling and data to zero, and the base station 105 may transmit data to the UE after transmitting wake-up signaling without an offset (or with a zero-offset) following the wake-up signaling. The base station 105 may perform a first successful LBT procedure 705-a to gain access to a shared spectrum and may transmit wake-up signaling 710-a to a UE 115. The UE 115 may receive the wake-up signaling, and after monitoring for data from the base station 105 in an on-duration, the UE 115 may fail to receive data in the on-duration. Afterwards, base station 105 may perform a second successful LBT procedure 705-b to gain access to the shared spectrum and may transmit wake-up signaling 710-b to the UE 115. The base station 105 may then determine that the base station 105 failed to transmit data to UE 115 in a previous on-duration after transmitting wake-up signaling 710-a to the UE 115 for the previous on-duration (e.g., if the base station 105 failed to gain access to the shared spectrum for a data transmission).

Accordingly, base station 105 may set the offset between the wake-up signaling 710-b and the PDSCH 715 to zero based on determining that the base station 105 failed to transmit the data to the UE 115 in the previous on-duration. The UE 115 may also determine that no data was received from the base station 105 in the previous on-duration, and the UE 115 may also set the offset between the wake-up signaling 710-b and the PDSCH 715 to zero. That is, if the UE 115 receives first wake-up signaling and fails to receive data after a non-zero offset in an on-duration, then the offset after a next set of wake-up signaling (e.g., one or more wake-up signals) may be set to zero (e.g., since the UE 115 may assume that the base station 105 failed an LBT procedure the first time). The UE 115 may switch back to a non-zero offset after a number (N) of cycles (e.g., if the UE 115 fails to receive data from the base station 105). In some cases, if the UE 115 receives data in the previous on-duration (e.g., but fails to receive all of the data), the UE 115 may also set the offset between wake-up signaling and PDSCHs to zero for subsequent on-durations (e.g., since there may be additional data for the UE 115 to receive in a next data cycle).

If the UE 115 fails to receive the PDSCH 715 in the on-duration after setting the offset to zero, and the UE 115 detects that the base station 105 has access to the shared spectrum for the on-duration (e.g., based on detecting COT-SI or a GTS signal in the on-duration), the UE 115 may set the offset after subsequent wake-up signaling to a non-zero value (e.g., the UE 115 may switch back to a non-zero offset). Alternatively, if the UE 115 fails to receive the PDSCH 715 in the on-duration after setting the offset to zero, and the UE 115 detects that the base station 105 does not have access to the shared spectrum for the on-duration (e.g., based on failing to detect COT-SI or a GTS signal in the on-duration), the UE 115 may continue to set the offset after subsequent wake-up signaling to zero. The number of wake-up signals after which the UE 115 may set the offsets to zero may be fixed or may be based on a timer. In some cases, the base station 105 may transmit an indication of the number of times that the UE 115 may set the offset between wake-up signaling and data transmissions to zero.

Figure 8:
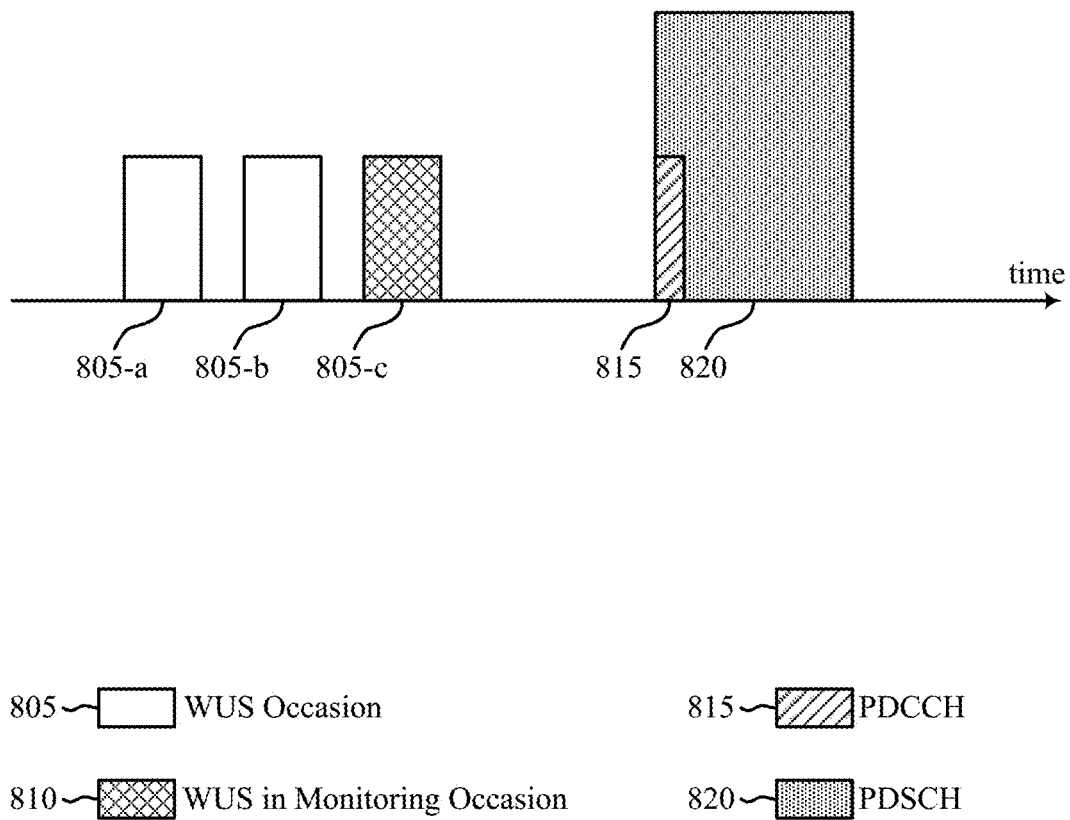

FIG. 8 illustrates an example of communications between a UE 115 operating in a DRX mode and a base station 105 in a shared spectrum in accordance with aspects of the present disclosure. In the example of FIG. 8, to facilitate multiple attempts by the base station 105 to gain access to a shared spectrum (e.g., to beat LBT, provide time diversity for LBT related fails, or for base station 105 scheduling flexibility), the UE 115 may be configured to monitor for wake-up signaling at multiple occasions in a single DRX cycle. After the UE 115 monitors the multiple occasions for the wake-up signaling and fails to receive wake-up signaling, the UE 115 may enter a sleep state. In some cases, when the UE 115 fails to receive wake-up signaling, it may be appropriate for the UE 115 to determine whether a base station 105 intended to transmit wake-up signaling. In particular, it may be wasteful for the UE 115 to continue monitoring for wake-up signaling from a base station 105 if the base station 105 does not intend on transmitting wake-up signaling to the UE 115.

As described herein, a UE 115 may support efficient techniques for determining whether the base station 105 had access to the shared spectrum for a COT and did not intend to transmit wake-up signaling 810 or whether the base station 105 failed to transmit wake-up signaling 810 based on failing to gain access to the shared spectrum. Then, the UE 115 may determine whether to continue monitoring for wake-up signaling 810 from the base station based on whether the base station intends to transmit wake-up signaling 810 to the UE 115. For instance, if the UE 115 determines that the base station 105 intends to transmit wake-up signaling 810 in an upcoming wake-up signaling occasion 805-c, the UE 115 may monitor the wake-up signaling occasion 805-c for the wake-up signaling (e.g., after failing to receive wake-up signaling in wake-up signaling occasions 805-a and 805-b). Alternatively, if the UE 115 determines that the base station 105 does not intend to transmit wake-up signaling 810 in an upcoming wake-up signaling occasion 805-c, the UE 115 may enter a sleep state and avoid monitoring for the wake-up signaling 810 in the wake-up signaling occasion 805-c. If the UE 115 receives wake-up signaling 810, the UE 115 may wake up in an on-duration to receive control information in a PDCCH 815 and data in a PDSCH 820 from the base station 105.

In one example, when the UE 115 fails to receive wake-up signaling in a first wake-up signaling occasion (e.g., one of multiple occasions), and the UE 115 detects that the base station 105 had access to the shared spectrum for a COT or that the first wake-up signaling occasion is inside the COT, the UE 115 may determine that the base station 105 did not intend to transmit wake-up signaling to the UE 115. Thus, the UE 115 may determine that wake-up signaling is not received (e.g., not detected), and the UE 115 may enter a sleep state and avoid monitoring a second, upcoming wake-up signaling occasion for wake-up signaling from the base station. That is, the UE 115 may skip monitoring the other wake-up signaling occasions in the period or cycle. The UE 115 may detect whether the base station 105 had access to the shared spectrum for the COT based on detecting a demodulation reference signal (DMRS) or a COT-SI in the first wake-up signaling occasion or in a subsequent on-duration. In some cases, in one cycle, even after detecting that the base station did not intend to transmit the wake-up signaling to the UE 115 in a previous wake-up signaling occasion, the UE 115 may continue monitoring subsequent wake-up signaling occasions for wake-up signaling. In such cases, however, if the UE 115 continues to fail to receive wake-up signaling in such subsequent wake-up signaling occasions in a threshold number of cycles, the UE 115 may be configured to avoid monitoring such subsequent wake-up signaling occasions in subsequent cycles.

In another example, when the UE 115 fails to receive wake-up signaling in a first wake-up signaling occasion (e.g., one of multiple occasions), and the UE 115 detects that the base station 105 did not have access to the shared spectrum for a COT or that the first wake-up signaling occasion is not inside a COT, the UE 115 may determine that the base station 105 intended to transmit wake-up signaling to the UE 115. That is, the UE 115 may assume that the base station 105 intended to transmit wake-up signaling to the UE 115 (e.g., the base station intended to transmit the wake-up signaling but failed to gain access to the shared spectrum) since the UE 115 may not be able to identify whether the base station 105 had access to the shared spectrum for the first wake-up signaling occasion. In such cases, the UE 115 may monitor a second, upcoming wake-up signaling occasion for wake-up signaling from the base station 105.

In yet another example, when the UE 115 fails to receive wake-up signaling in a first wake-up signaling occasion (e.g., one of multiple occasions), and the UE 115 detects that the base station 105 did not have access to the shared spectrum for a COT or that the first wake-up signaling is not inside a COT, the UE 115 may perform channel sensing to determine whether the base station 105 intended to transmit wake-up signaling to the UE 115. In particular, if the channel energy (e.g., reference signal strength indicator (RSSI)) is below a threshold (e.g., low) during the first wake-up signaling occasion, the UE 115 may determine that the base station 105 did not intend to transmit wake-up signaling to the UE 115. For instance, the UE 115 may determine that there is no hidden node (e.g., in a small cell scenario) blocking the base station 105 from accessing the shared spectrum. Thus, the UE 115 may enter a sleep state and avoid monitoring a second, upcoming wake-up signaling occasion for wake-up signaling from the base station 105. Alternatively, if the channel energy is below the threshold during the first wake-up signaling occasion, the UE 115 may determine that the base station 105 did intend to transmit wake-up signaling to the UE 115. For instance, the UE 115 may determine that there is a hidden node (e.g., in a large cell scenario) that may be blocking the base station 105 from accessing the shared spectrum. Thus, the UE 115 may monitor a second, upcoming wake-up signaling occasion for wake-up signaling from the base station 105.

Figure 9:
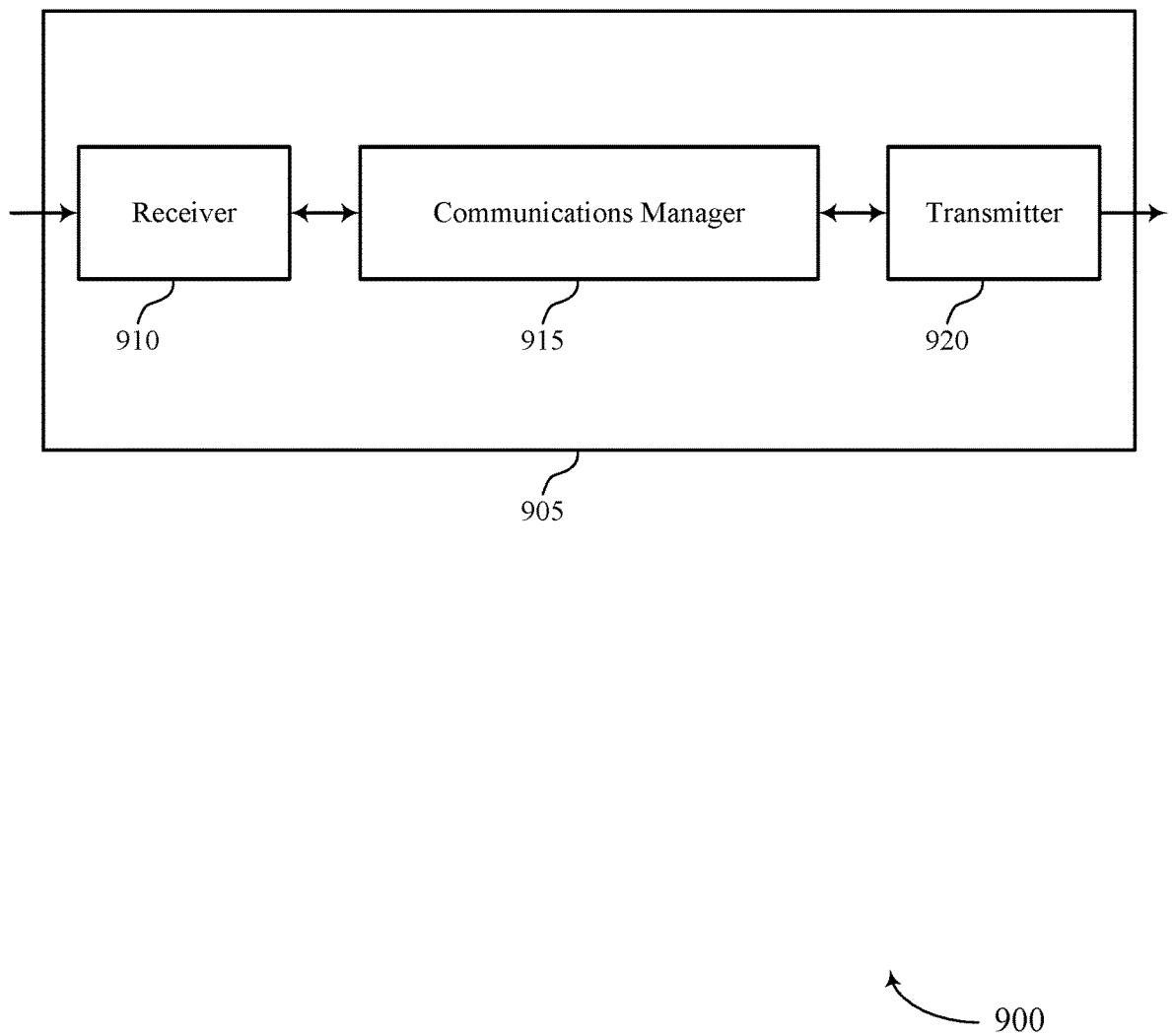
FIGS. 9 and 10 show block diagrams of devices that support power saving for DRX in a shared spectrum in accordance with aspects of the present disclosure.

FIG. 9 shows a block diagram 900 of a device 905 that supports power saving for DRX in a shared spectrum in accordance with aspects of the present disclosure. The device 905 may be an example of aspects of a UE 115 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to power saving for DRX in a shared spectrum, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may monitor a shared radio frequency spectrum band for wake-up signaling from a base station, the wake-up signaling for a discontinuous reception cycle at the UE, receive the wake-up signaling prior to an on-duration of the discontinuous reception cycle, the wake-up signaling including an indication of a length of the on-duration, and enter, based on receiving the wake-up signaling, a wake state for the indicated length of the on-duration to monitor for physical downlink control channel scheduling data from the base station.

The communications manager 915 may also monitor a shared radio frequency spectrum band for wake-up signaling from a base station, the wake-up signaling for a discontinuous reception cycle at the UE, receive the wake-up signaling prior to an on-duration of the discontinuous reception cycle, set an offset between the wake-up signaling and a transmission of data from the base station to zero, and monitor for the data from the base station after receiving the wake-up signaling based on setting the offset to zero.

The communications manager 915 may also monitor a shared radio frequency spectrum band for wake-up signaling from a base station, the wake-up signaling for a discontinuous reception cycle at the UE, receive the wake-up signaling prior to an on-duration of the discontinuous reception cycle, determine a periodicity for monitoring for control information from the base station based on receiving the wake-up signaling, the control information including scheduling information for a data transmission from the base station, and monitor for the control information from the base station in accordance with the determined periodicity.

The communications manager 915 may also monitor a first wake-up signaling occasion in a shared radio frequency spectrum band for first wake-up signaling from a base station, the first wake-up signaling for an on-duration of a discontinuous reception cycle at the UE, monitor, for the discontinuous reception cycle, a second wake-up signaling occasion for second wake-up signaling from the base station or entering a sleep state based on the determining, the second wake-up signaling for the on-duration of the discontinuous reception cycle at the UE, and determine that the UE failed to receive the first wake-up signaling in the first wake-up signaling occasion. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
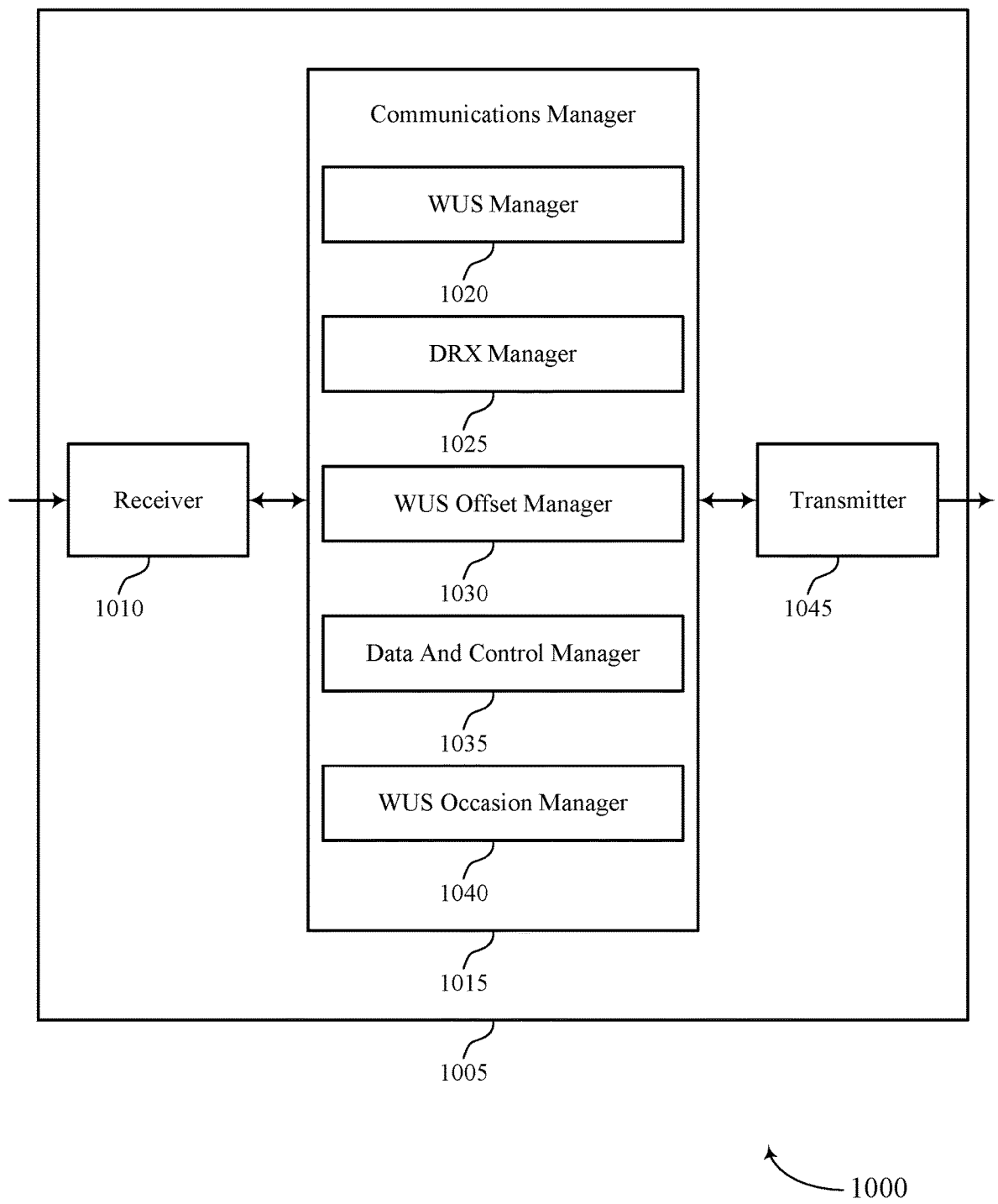

FIG. 10 shows a block diagram 1000 of a device 1005 that supports power saving for DRX in a shared spectrum in accordance with aspects of the present disclosure. The device 1005 may be an example of aspects of a device 905, or a UE 115 as described herein. The device 1005 may include a receiver 1010, a communications manager 1015, and a transmitter 1045. The device 1005 may also include a processor. Each of these components may be in communication with one another (e.g., via one or more buses).

The receiver 1010 may receive information such as packets, user data, or control information associated with various information channels (e.g., control channels, data channels, and information related to power saving for DRX in a shared spectrum, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a WUS manager 1020, a DRX manager 1025, a WUS offset manager 1030, a data and control manager 1035, and a WUS occasion manager 1040. The communications manager 1015 may be an example of aspects of the communications manager 1210 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an I/O component, a transceiver, a network server, another computing device, one or more other components described in the present disclosure, or a combination thereof in accordance with various aspects of the present disclosure.

The WUS manager 1020 may monitor a shared radio frequency spectrum band for wake-up signaling from a base station, the wake-up signaling for a discontinuous reception cycle at the UE and receive the wake-up signaling prior to an on-duration of the discontinuous reception cycle, the wake-up signaling including an indication of a length of the on-duration. The DRX manager 1025 may enter, based on receiving the wake-up signaling, a wake state for the indicated length of the on-duration to monitor for physical downlink control channel scheduling data from the base station.

The WUS manager 1020 may monitor a shared radio frequency spectrum band for wake-up signaling from a base station, the wake-up signaling for a discontinuous reception cycle at the UE and receive the wake-up signaling prior to an on-duration of the discontinuous reception cycle. The WUS offset manager 1030 may set an offset between the wake-up signaling and a transmission of data from the base station to zero. The data and control manager 1035 may monitor for the data from the base station after receiving the wake-up signaling based on setting the offset to zero.

The WUS manager 1020 may monitor a shared radio frequency spectrum band for wake-up signaling from a base station, the wake-up signaling for a discontinuous reception cycle at the UE and receive the wake-up signaling prior to an on-duration of the discontinuous reception cycle. The data and control manager 1035 may determine a periodicity for monitoring for control information from the base station based on receiving the wake-up signaling, the control information including scheduling information for a data transmission from the base station and monitor for the control information from the base station in accordance with the determined periodicity.

The WUS occasion manager 1040 may monitor a first wake-up signaling occasion in a shared radio frequency spectrum band for first wake-up signaling from a base station, the first wake-up signaling for an on-duration of a discontinuous reception cycle at the UE. The WUS manager 1020 may determine that the UE failed to receive the first wake-up signaling in the first wake-up signaling occasion. The WUS occasion manager 1040 may monitor, for the discontinuous reception cycle, a second wake-up signaling occasion for second wake-up signaling from the base station or enter a sleep state based on the determining, the second wake-up signaling for the on-duration of the discontinuous reception cycle at the UE.

The transmitter 1045 may transmit signals generated by other components of the device 1005. In some examples, the transmitter 1045 may be collocated with a receiver 1010 in a transceiver module. For example, the transmitter 1045 may be an example of aspects of the transceiver 1220 described with reference to FIG. 12. The transmitter 1045 may utilize a single antenna or a set of antennas.

Figure 11:
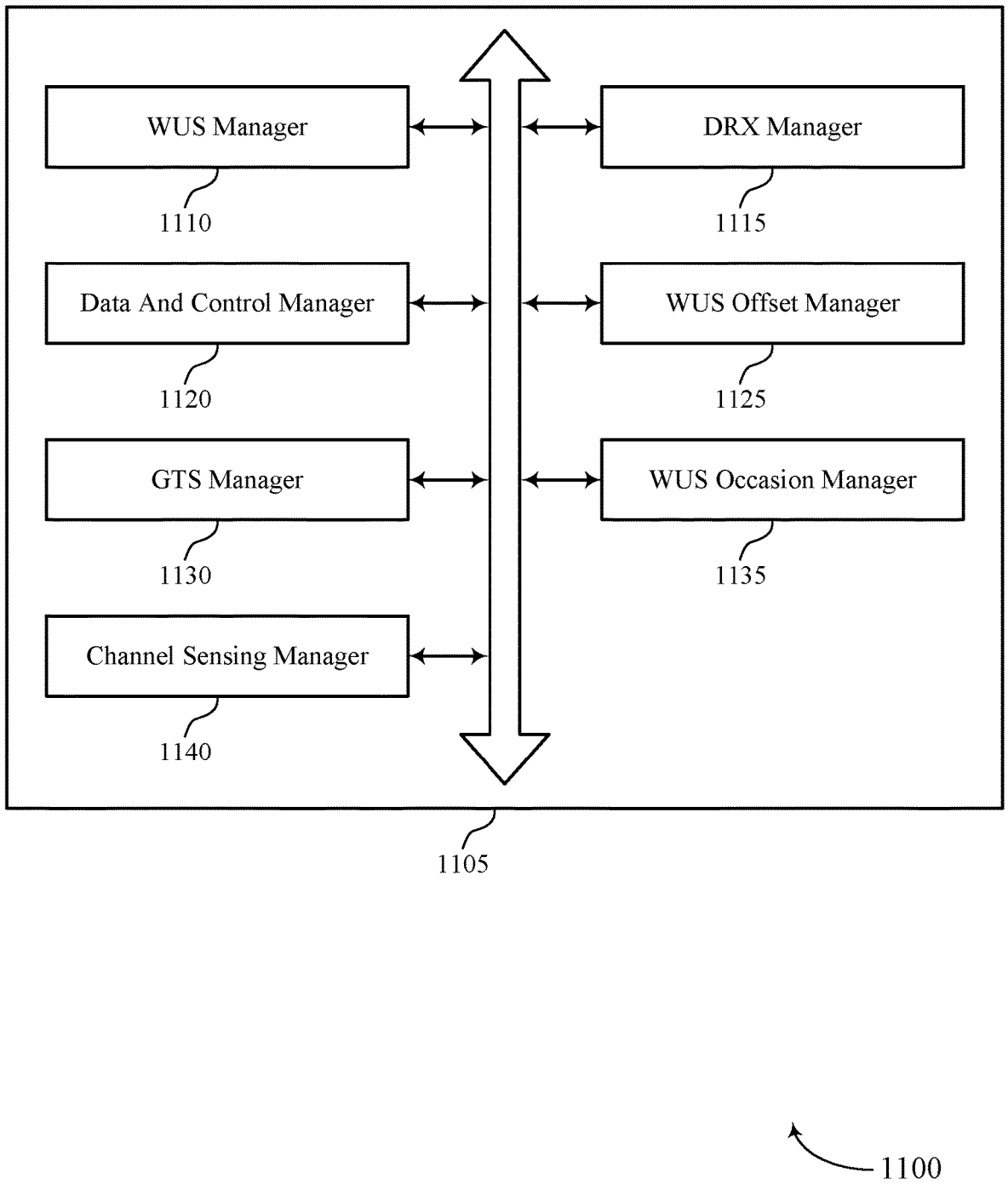
FIG. 11 shows a block diagram of a communications manager that supports power saving for DRX in a shared spectrum in accordance with aspects of the present disclosure.

FIG. 11 shows a block diagram 1100 of a communications manager 1105 that supports power saving for DRX in a shared spectrum in accordance with aspects of the present disclosure. The communications manager 1105 may be an example of aspects of a communications manager 915, a communications manager 1015, or a communications manager 1210 described herein. The communications manager 1105 may include a WUS manager 1110, a DRX manager 1115, a data and control manager 1120, a WUS offset manager 1125, a GTS manager 1130, a WUS occasion manager 1135, and a channel sensing manager 1140. Each of these modules may communicate, directly or indirectly, with one another (e.g., via one or more buses).

The communications manager 1105, or its sub-components, may be implemented in hardware, code (e.g., software or firmware) executed by a processor, or any combination thereof. If implemented in code executed by a processor, the functions of the communications manager 1105, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1105, or its sub-components, may be physically located at various positions, including being distributed such that portions of functions are implemented at different physical locations by one or more physical components. In some examples, the communications manager 1105, or its sub-components, may be a separate and distinct component in accordance with various aspects of the present disclosure. In some examples, the communications manager 1105, or its sub-components, may be combined with one or more other hardware components, including but not limited to an I/O component, a transceiver, a network server, another computing device, one or more other components described in the present disclosure, or a combination thereof in accordance with various aspects of the present disclosure.

The WUS manager 1110 may monitor a shared radio frequency spectrum band for wake-up signaling from a base station, the wake-up signaling for a discontinuous reception cycle at the UE. In some examples, the WUS manager 1110 may receive the wake-up signaling prior to an on-duration of the discontinuous reception cycle, the wake-up signaling including an indication of a length of the on-duration. In some examples, the WUS manager 1110 may monitor a shared radio frequency spectrum band for wake-up signaling from a base station, the wake-up signaling for a discontinuous reception cycle at the UE. In some examples, the WUS manager 1110 may receive the wake-up signaling prior to an on-duration of the discontinuous reception cycle. In some examples, the WUS manager 1110 may monitor a shared radio frequency spectrum band for wake-up signaling from a base station, the wake-up signaling for a discontinuous reception cycle at the UE.

In some examples, the WUS manager 1110 may receive the wake-up signaling prior to an on-duration of the discontinuous reception cycle. In some examples, the WUS manager 1110 may determine that the UE failed to receive the first wake-up signaling in the first wake-up signaling occasion. In some examples, the WUS manager 1110 may receive the wake-up signaling in another physical downlink control channel scheduling the data on scheduled resources with an indication that the data is guaranteed to be received on the scheduled resources during the on-duration. In some examples, the WUS manager 1110 may receive, in the wake-up signaling, an indication that the base station has to gain access to the shared radio frequency spectrum band for the second channel occupancy time before transmitting the data.

The DRX manager 1115 may enter, based on receiving the wake-up signaling, a wake state for the indicated length of the on-duration to monitor for physical downlink control channel scheduling data from the base station. In some examples, the DRX manager 1115 may enter the wake state for the first length of the on-duration to monitor for the physical downlink control channel scheduling data from the base station. In some examples, the DRX manager 1115 may enter the wake state for the second length of the on-duration to monitor for the physical downlink control channel scheduling the data from the base station. In some examples, the DRX manager 1115 may enter a sleep state based on the identifying and on receiving the go-to-sleep signal. In some examples, the DRX manager 1115 may detect a signal transmitted by the base station in the on-duration. In some examples, the DRX manager 1115 may determine that the base station has access to the shared radio frequency spectrum band for at least a portion of the on-duration based on detecting the signal. In some examples, the DRX manager 1115 may enter the sleep state based on the determining. In some examples, the DRX manager 1115 may enter the sleep state based on the detecting.

The data and control manager 1120 may monitor for the data from the base station after receiving the wake-up signaling based on setting the offset to zero. In some examples, the data and control manager 1120 may determine a periodicity for monitoring for control information from the base station based on receiving the wake-up signaling, the control information including scheduling information for a data transmission from the base station. In some examples, the data and control manager 1120 may monitor for the control information from the base station in accordance with the determined periodicity. In some examples, the data and control manager 1120 may receive the physical downlink control channel and the scheduled data in the on-duration in a same channel occupancy time in which the wake-up signaling is received. In some examples, the data and control manager 1120 may receive the data on the scheduled resource during the on-duration without monitoring for the physical downlink control channel, if the indication is set. In some examples, the data and control manager 1120 may receive the physical downlink control channel and the scheduled data in the on-duration in a second channel occupancy time.

In some examples, the data and control manager 1120 may monitor the physical downlink control channel scheduling the data during the on-duration. In some examples, the data and control manager 1120 may receive a grant in the on-duration scheduling the UE to receive the data from the base station. In some examples, the data and control manager 1120 may identify that the UE failed to receive a grant scheduling the UE to receive the data from the base station. In some examples, the data and control manager 1120 may identify that the UE failed to receive data in a previous on-duration of the discontinuous reception cycle signaled by a previous wake-up signaling. In some examples, the data and control manager 1120 may receive a first portion of previous data in a previous on-duration of the discontinuous reception cycle signaled by a previous wake-up signaling.

In some examples, the data and control manager 1120 may determine that the UE failed to receive a second portion of the previous data in the previous on-duration. In some examples, the data and control manager 1120 may determine that the data transmission is to be received in a same channel occupancy time as the wake-up signaling. In some examples, the data and control manager 1120 may determine that the periodicity for monitoring for control information from the base station is a first periodicity that is longer than a second periodicity, where the second periodicity is associated with receiving wake-up signaling in a different channel occupancy time from associated data. In some examples, the data and control manager 1120 may monitor for the control information from the base station in accordance with the first periodicity.

In some examples, the data and control manager 1120 may receive an indication of sub-bands to monitor for the control information from the base station in accordance with the first periodicity. In some examples, the data and control manager 1120 may monitor the indicated sub-bands for the control information from the base station in accordance with the first periodicity. In some examples, the data and control manager 1120 may determine that the data transmission is to be received in a different channel occupancy time from the wake-up signaling. In some examples, the data and control manager 1120 may determine that the periodicity for monitoring for control information from the base station is a second periodicity that is shorter than a first periodicity, where the first periodicity is associated with receiving wake-up signaling in a same channel occupancy time as associated data. In some examples, the data and control manager 1120 may monitor for the control information from the base station in accordance with the second periodicity. In some examples, the data and control manager 1120 may monitor all sub-bands for the control information from the base station in accordance with the second periodicity.

The WUS offset manager 1125 may set an offset between the wake-up signaling and a transmission of data from the base station to zero. In some examples, the WUS offset manager 1125 may receive, in the wake-up signaling, an indication of an offset between the wake-up signaling and the data. In some examples, the WUS offset manager 1125 may set the offset between the wake-up signaling and the transmission of the data from the base station to zero based on the identifying. In some examples, the WUS offset manager 1125 may set the offset between subsequent wake-up signaling and an associated data transmission from the base station to non-zero based on determining that the base station has access to the shared radio frequency spectrum band for at least the portion of the on-duration. In some examples, the WUS offset manager 1125 may set the offset between the wake-up signaling and the transmission of the data from the base station to zero based on the determining. In some examples, the WUS offset manager 1125 may receive signaling indicating a number of wake-up signals for which an offset between each wake-up signal and a respective transmission of data is set to zero.

The WUS occasion manager 1135 may monitor a first wake-up signaling occasion in a shared radio frequency spectrum band for first wake-up signaling from a base station, the first wake-up signaling for an on-duration of a discontinuous reception cycle at the UE. In some examples, the WUS occasion manager 1135 may monitor, for the discontinuous reception cycle, a second wake-up signaling occasion for second wake-up signaling from the base station or enter a sleep state based on the determining, the second wake-up signaling for the on-duration of the discontinuous reception cycle at the UE. In some examples, the WUS occasion manager 1135 may determine that the base station had access to the shared radio frequency spectrum band in the first wake-up signaling occasion.

In some examples, the WUS occasion manager 1135 may avoid monitoring the second wake-up signaling occasion for the second wake-up signaling from the base station based on the determining. In some examples, the WUS occasion manager 1135 may determine that the base station failed to gain access to the shared radio frequency spectrum band for the first wake-up signaling occasion. In some examples, the WUS occasion manager 1135 may monitor the second wake-up signaling occasion for the second wake-up signaling from the base station based on the determining. In some examples, the WUS occasion manager 1135 may determine that a hidden node blocked the first wake-up signaling from the base station.

The GTS manager 1130 may receive a first go-to-sleep signal in the on-duration after receiving the grant. In some examples, the GTS manager 1130 may ignore the first go-to-sleep signal based on receiving the grant. In some examples, the GTS manager 1130 may receive a second go-to-sleep signal in the on-duration after receiving the grant. In some examples, the GTS manager 1130 may enter a sleep state based on receiving the second go-to-sleep signal. In some examples, the GTS manager 1130 may receive a go-to-sleep signal in the on-duration. The channel sensing manager 1140 may detect that an energy of a channel monitored for the first wake-up signaling in the first wake-up signaling occasion is below a threshold.

Figure 12:
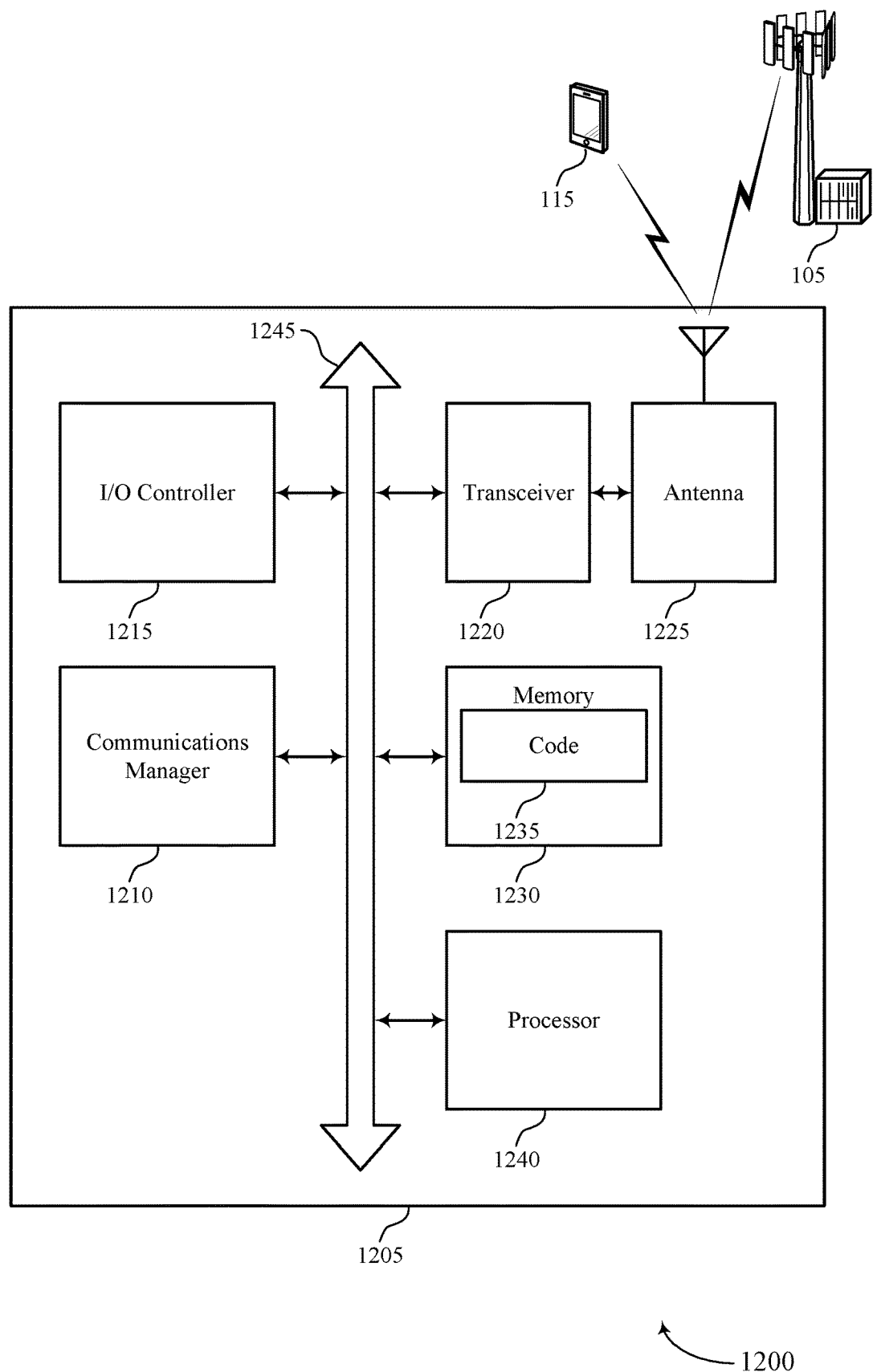
FIG. 12 shows a diagram of a system including a device that supports power saving for DRX in a shared spectrum in accordance with aspects of the present disclosure.

FIG. 12 shows a diagram of a system 1200 including a device 1205 that supports power saving for DRX in a shared spectrum in accordance with aspects of the present disclosure. The device 1205 may be an example of or include the components of device 905, device 1005, or a UE 115 as described herein. The device 1205 may include components for bi-directional voice and data communications including components for transmitting and receiving communications, including a communications manager 1210, an I/O controller 1215, a transceiver 1220, an antenna 1225, memory 1230, and a processor 1240. These components may be in electronic communication via one or more buses (e.g., bus 1245).

The communications manager 1210 may monitor a shared radio frequency spectrum band for wake-up signaling from a base station, the wake-up signaling for a discontinuous reception cycle at the UE, receive the wake-up signaling prior to an on-duration of the discontinuous reception cycle, the wake-up signaling including an indication of a length of the on-duration, and enter, based on receiving the wake-up signaling, a wake state for the indicated length of the on-duration to monitor for physical downlink control channel scheduling data from the base station.

The communications manager 1210 may also monitor a shared radio frequency spectrum band for wake-up signaling from a base station, the wake-up signaling for a discontinuous reception cycle at the UE, receive the wake-up signaling prior to an on-duration of the discontinuous reception cycle, set an offset between the wake-up signaling and a transmission of data from the base station to zero, and monitor for the data from the base station after receiving the wake-up signaling based on setting the offset to zero.

The communications manager 1210 may also monitor a shared radio frequency spectrum band for wake-up signaling from a base station, the wake-up signaling for a discontinuous reception cycle at the UE, receive the wake-up signaling prior to an on-duration of the discontinuous reception cycle, determine a periodicity for monitoring for control information from the base station based on receiving the wake-up signaling, the control information including scheduling information for a data transmission from the base station, and monitor for the control information from the base station in accordance with the determined periodicity.

The communications manager 1210 may also monitor a first wake-up signaling occasion in a shared radio frequency spectrum band for first wake-up signaling from a base station, the first wake-up signaling for an on-duration of a discontinuous reception cycle at the UE, monitor, for the discontinuous reception cycle, a second wake-up signaling occasion for second wake-up signaling from the base station or entering a sleep state based on the determining, the second wake-up signaling for the on-duration of the discontinuous reception cycle at the UE, and determine that the UE failed to receive the first wake-up signaling in the first wake-up signaling occasion.

The communications manager 1210, or its sub-components, may be implemented in hardware, code (e.g., software or firmware) executed by a processor, or any combination thereof. If implemented in code executed by a processor, the functions of the communications manager 1210, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1210, or its sub-components, may be physically located at various positions, including being distributed such that portions of functions are implemented at different physical locations by one or more physical components. In some examples, the communications manager 1210, or its sub-components, may be a separate and distinct component in accordance with various aspects of the present disclosure. In some examples, the communications manager 1210, or its sub-components, may be combined with one or more other hardware components, including but not limited to an I/O component, a transceiver, a network server, another computing device, one or more other components described in the present disclosure, or a combination thereof in accordance with various aspects of the present disclosure.

The I/O controller 1215 may manage input and output signals for the device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the device 1205 via the I/O controller 1215 or via hardware components controlled by the I/O controller 1215.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include random-access memory (RAM) and read-only memory (ROM). The memory 1230 may store computer-readable, computer-executable code 1235 including instructions that, when executed, cause the processor to perform various functions described herein. In some cases, the memory 1230 may contain, among other things, a basic input/output system (BIOS) which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting power saving for DRX in a shared spectrum).

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
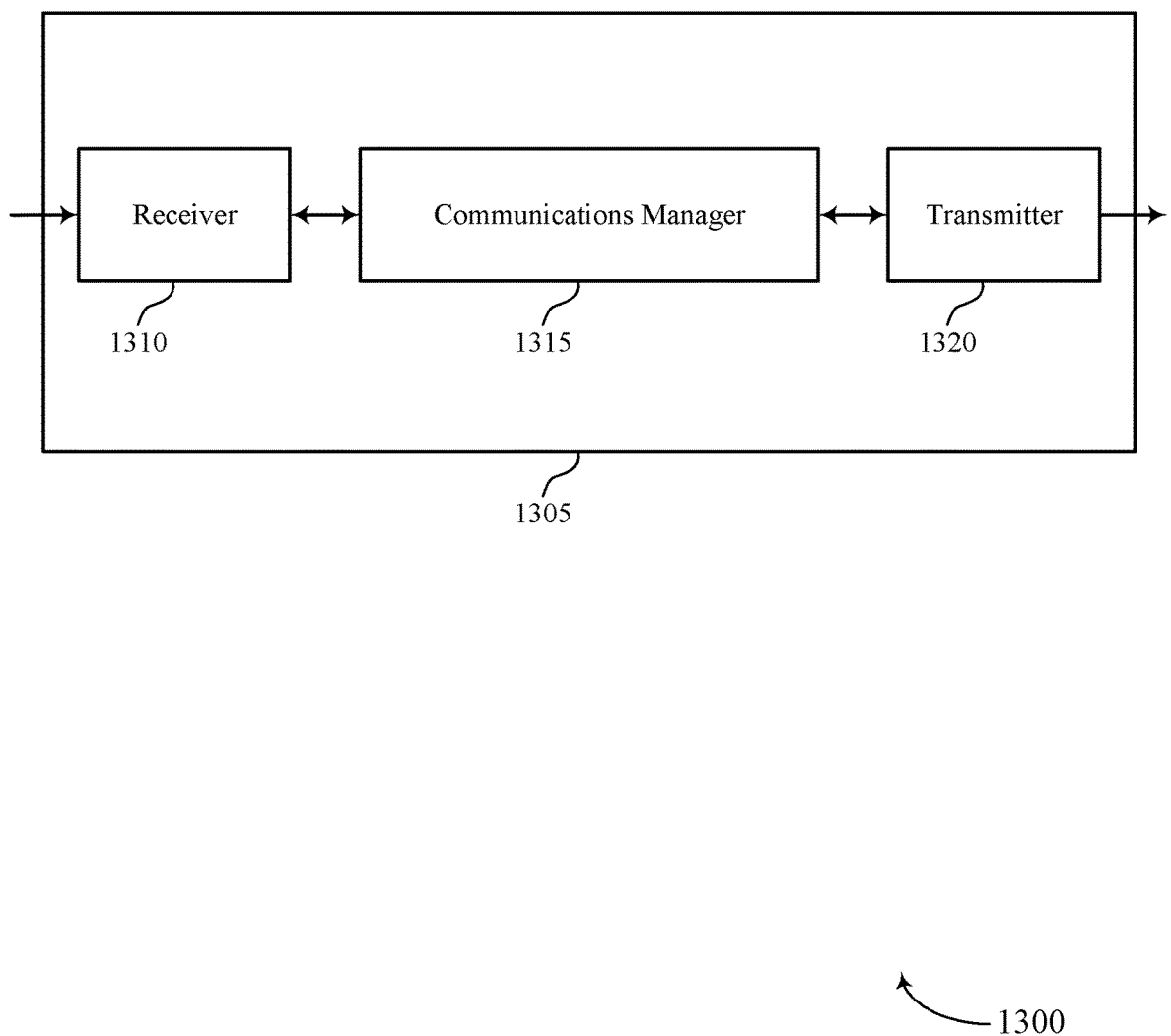
FIGS. 13 and 14 show block diagrams of devices that support power saving for DRX in a shared spectrum in accordance with aspects of the present disclosure.

FIG. 13 shows a block diagram 1300 of a device 1305 that supports power saving for DRX in a shared spectrum in accordance with aspects of the present disclosure. The device 1305 may be an example of aspects of a base station 105 as described herein. The device 1305 may include a receiver 1310, a communications manager 1315, and a transmitter 1320. The device 1305 may also include a processor. Each of these components may be in communication with one another (e.g., via one or more buses).

The receiver 1310 may receive information such as packets, user data, or control information associated with various information channels (e.g., control channels, data channels, and information related to power saving for DRX in a shared spectrum, etc.). Information may be passed on to other components of the device 1305. The receiver 1310 may be an example of aspects of the transceiver 1620 described with reference to FIG. 16. The receiver 1310 may utilize a single antenna or a set of antennas.

The communications manager 1315 may identify data to transmit in a shared radio frequency spectrum band to a UE operating according to a discontinuous reception cycle, transmit the data to the UE in the on-duration based on transmitting the wake-up signaling, and transmit, to the UE prior to an on-duration of the discontinuous reception cycle, wake-up signaling including an indication of a length of the on-duration for which the UE is to enter a wake state to receive data from the base station.

The communications manager 1315 may also identify data to transmit to a UE in a shared radio frequency spectrum band, where the UE is operating according to a discontinuous reception cycle, transmit the data to the UE after transmitting the wake-up signaling based on setting the offset to zero, set an offset between wake-up signaling and a transmission of the data to zero, and transmit the wake-up signaling to the UE prior to an on-duration of the discontinuous reception cycle. The communications manager 1315 may be an example of aspects of the communications manager 1610 described herein.

The communications manager 1315, or its sub-components, may be implemented in hardware, code (e.g., software or firmware) executed by a processor, or any combination thereof. If implemented in code executed by a processor, the functions of the communications manager 1315, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1315, or its sub-components, may be physically located at various positions, including being distributed such that portions of functions are implemented at different physical locations by one or more physical components. In some examples, the communications manager 1315, or its sub-components, may be a separate and distinct component in accordance with various aspects of the present disclosure. In some examples, the communications manager 1315, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1320 may transmit signals generated by other components of the device 1305. In some examples, the transmitter 1320 may be collocated with a receiver 1310 in a transceiver module. For example, the transmitter 1320 may be an example of aspects of the transceiver 1620 described with reference to FIG. 16. The transmitter 1320 may utilize a single antenna or a set of antennas.

Figure 14:
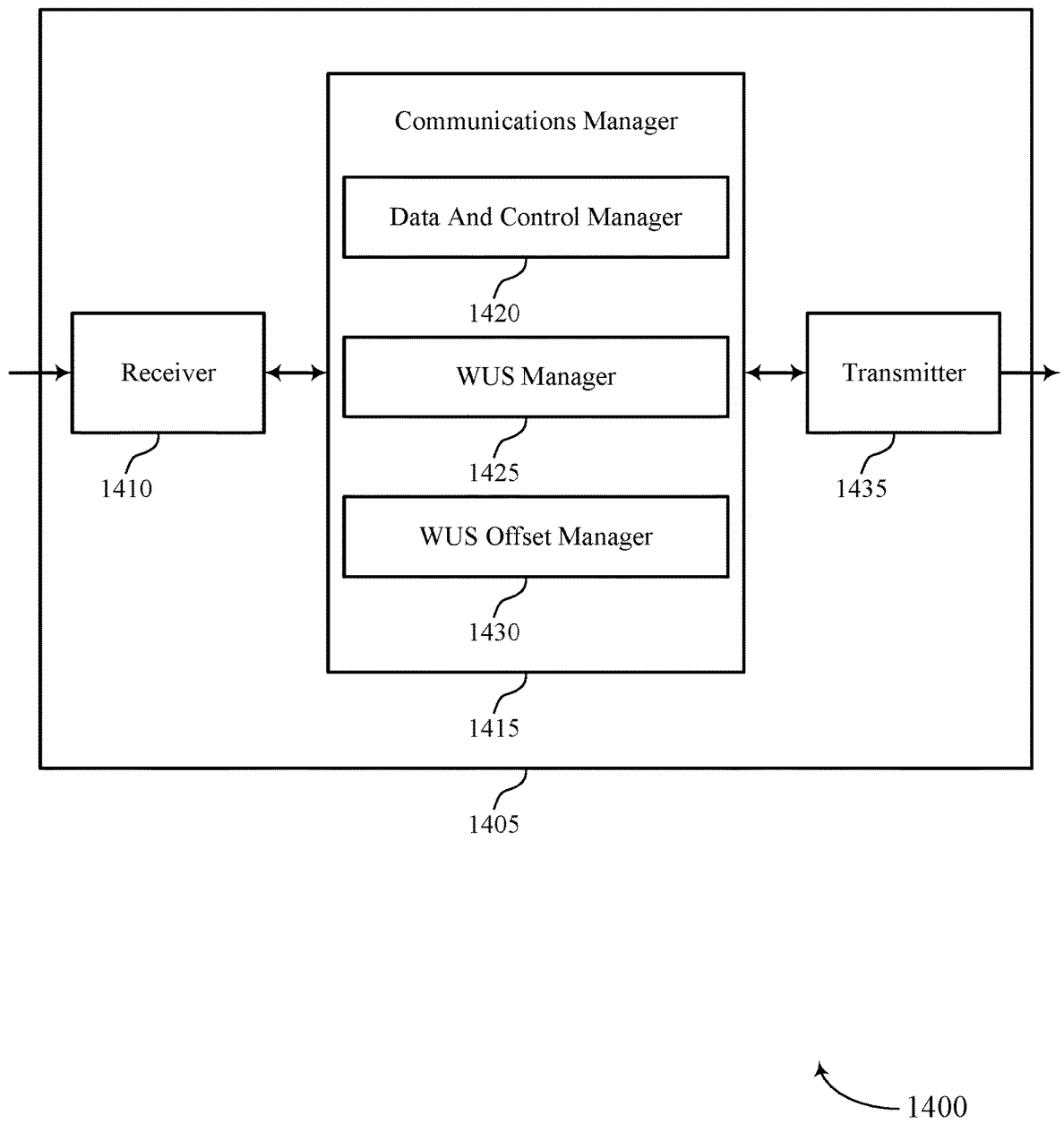

FIG. 14 shows a block diagram 1400 of a device 1405 that supports power saving for DRX in a shared spectrum in accordance with aspects of the present disclosure. The device 1405 may be an example of aspects of a device 1305, or a base station 105 as described herein. The device 1405 may include a receiver 1410, a communications manager 1415, and a transmitter 1435. The device 1405 may also include a processor. Each of these components may be in communication with one another (e.g., via one or more buses).

The receiver 1410 may receive information such as packets, user data, or control information associated with various information channels (e.g., control channels, data channels, and information related to power saving for DRX in a shared spectrum, etc.). Information may be passed on to other components of the device 1405. The receiver 1410 may be an example of aspects of the transceiver 1620 described with reference to FIG. 16. The receiver 1410 may utilize a single antenna or a set of antennas.

The communications manager 1415 may be an example of aspects of the communications manager 1315 as described herein. The communications manager 1415 may include a data and control manager 1420, a WUS manager 1425, and a WUS offset manager 1430. The communications manager 1415 may be an example of aspects of the communications manager 1610 described herein.

The communications manager 1415, or its sub-components, may be implemented in hardware, code (e.g., software or firmware) executed by a processor, or any combination thereof. If implemented in code executed by a processor, the functions of the communications manager 1415, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1415, or its sub-components, may be physically located at various positions, including being distributed such that portions of functions are implemented at different physical locations by one or more physical components. In some examples, the communications manager 1415, or its sub-components, may be a separate and distinct component in accordance with various aspects of the present disclosure. In some examples, the communications manager 1415, or its sub-components, may be combined with one or more other hardware components, including but not limited to an I/O component, a transceiver, a network server, another computing device, one or more other components described in the present disclosure, or a combination thereof in accordance with various aspects of the present disclosure.

The data and control manager 1420 may identify data to transmit in a shared radio frequency spectrum band to a UE operating according to a discontinuous reception cycle. The WUS manager 1425 may transmit, to the UE prior to an on-duration of the discontinuous reception cycle, wake-up signaling including an indication of a length of the on-duration for which the UE is to enter a wake state to receive data from the base station. The data and control manager 1420 may transmit the data to the UE in the on-duration based on transmitting the wake-up signaling.

The data and control manager 1420 may identify data to transmit to a UE in a shared radio frequency spectrum band, where the UE is operating according to a discontinuous reception cycle. The WUS offset manager 1430 may set an offset between wake-up signaling and a transmission of the data to zero. The WUS manager 1425 may transmit the wake-up signaling to the UE prior to an on-duration of the discontinuous reception cycle. The data and control manager 1420 may transmit the data to the UE after transmitting the wake-up signaling based on setting the offset to zero.

The transmitter 1435 may transmit signals generated by other components of the device 1405. In some examples, the transmitter 1435 may be collocated with a receiver 1410 in a transceiver module. For example, the transmitter 1435 may be an example of aspects of the transceiver 1620 described with reference to FIG. 16. The transmitter 1435 may utilize a single antenna or a set of antennas.

Figure 15:
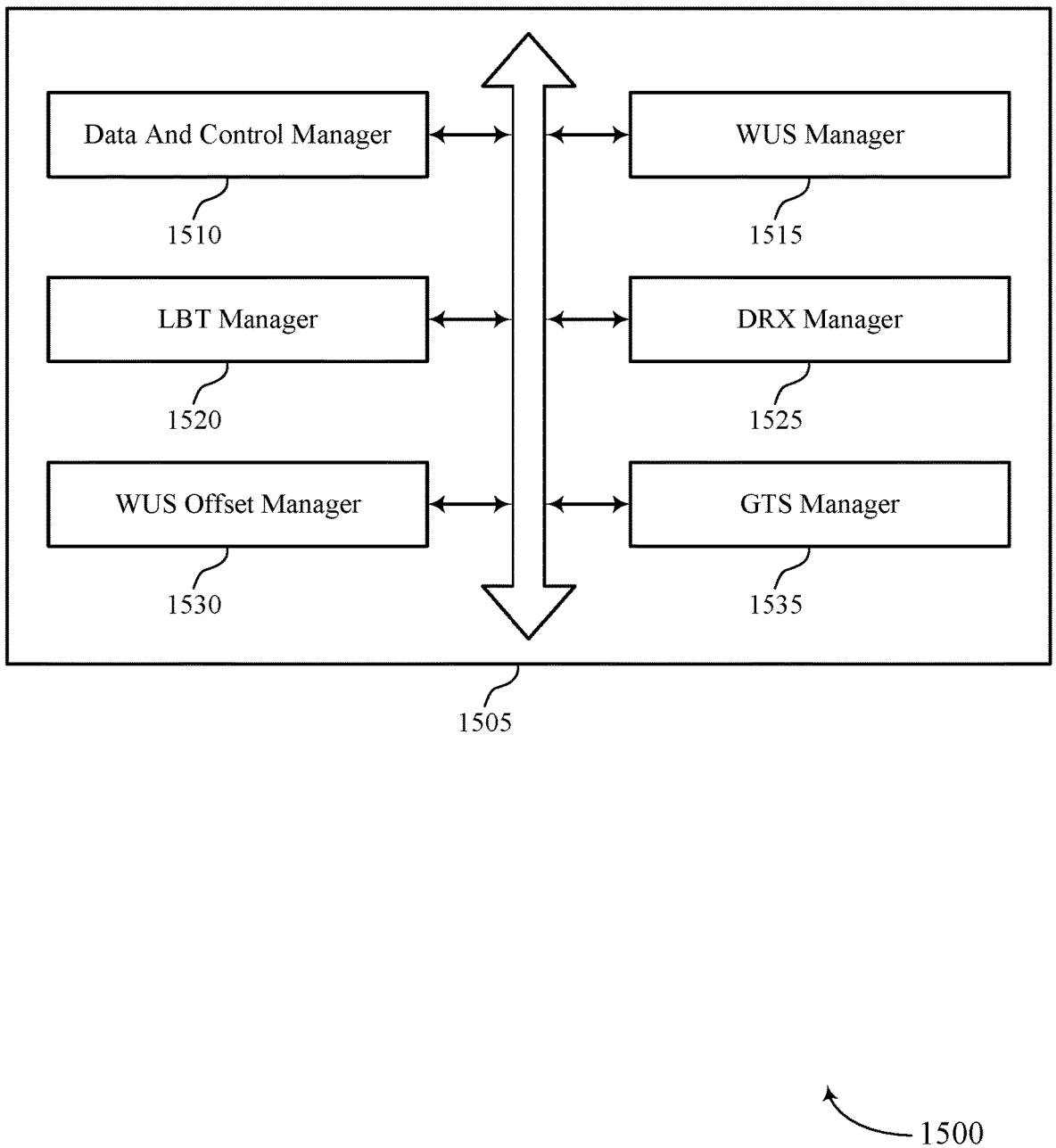
FIG. 15 shows a block diagram of a communications manager that supports power saving for DRX in a shared spectrum in accordance with aspects of the present disclosure.

FIG. 15 shows a block diagram 1500 of a communications manager 1505 that supports power saving for DRX in a shared spectrum in accordance with aspects of the present disclosure. The communications manager 1505 may be an example of aspects of a communications manager 1315, a communications manager 1415, or a communications manager 1610 described herein. The communications manager 1505 may include a data and control manager 1510, a WUS manager 1515, a LBT manager 1520, a DRX manager 1525, a WUS offset manager 1530, and a GTS manager 1535. Each of these modules may communicate, directly or indirectly, with one another (e.g., via one or more buses).

The communications manager 1505, or its sub-components, may be implemented in hardware, code (e.g., software or firmware) executed by a processor, or any combination thereof. If implemented in code executed by a processor, the functions of the communications manager 1505, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1505, or its sub-components, may be physically located at various positions, including being distributed such that portions of functions are implemented at different physical locations by one or more physical components. In some examples, the communications manager 1505, or its sub-components, may be a separate and distinct component in accordance with various aspects of the present disclosure. In some examples, the communications manager 1505, or its sub-components, may be combined with one or more other hardware components, including but not limited to an I/O component, a transceiver, a network server, another computing device, one or more other components described in the present disclosure, or a combination thereof in accordance with various aspects of the present disclosure.

The data and control manager 1510 may identify data to transmit in a shared radio frequency spectrum band to a UE operating according to a discontinuous reception cycle. In some examples, the data and control manager 1510 may transmit the data to the UE in the on-duration based on transmitting the wake-up signaling. In some examples, the data and control manager 1510 may identify data to transmit to a UE in a shared radio frequency spectrum band, where the UE is operating according to a discontinuous reception cycle. In some examples, the data and control manager 1510 may transmit the data to the UE after transmitting the wake-up signaling based on setting the offset to zero. In some examples, the data and control manager 1510 may transmit a grant in the on-duration scheduling the UE to receive the data from the base station. In some examples, the data and control manager 1510 may identify that the base station failed to transmit data in a previous on-duration of the discontinuous reception cycle signaled by a previous wake-up signaling. In some examples, the data and control manager 1510 may transmit a first portion of previous data in a previous on-duration of the discontinuous reception cycle signaled by a previous wake-up signaling. In some examples, the data and control manager 1510 may determine that the base station failed to transmit a second portion of the previous data in the previous on-duration.

The WUS manager 1515 may transmit, to the UE prior to an on-duration of the discontinuous reception cycle, wake-up signaling including an indication of a length of the on-duration for which the UE is to enter a wake state to receive data from the base station. In some examples, the WUS manager 1515 may transmit the wake-up signaling to the UE prior to an on-duration of the discontinuous reception cycle. In some examples, the WUS manager 1515 may transmit, in the wake-up signaling, a grant for resources and an indication that the data is guaranteed to be transmitted on the resources in the on-duration if the wake-up signaling and data are transmitted in a same channel occupancy time. In some examples, the WUS manager 1515 may transmit, in the wake-up signaling, an indication that the base station has to gain access to the shared radio frequency spectrum band for the second channel occupancy time before transmitting the data. In some examples, the WUS manager 1515 may transmit, in the wake-up signaling, an indication of the offset between the wake-up signaling and the data.

The WUS offset manager 1530 may set an offset between wake-up signaling and a transmission of the data to zero. In some examples, the WUS offset manager 1530 may identify an offset between the wake-up signaling and the data based on the length of the contention window. In some examples, the WUS offset manager 1530 may set the offset between the wake-up signaling and the transmission of the data to zero based on the identifying. In some examples, the WUS offset manager 1530 may set the offset between the wake-up signaling and the transmission of the data to zero based on the determining. In some examples, the WUS offset manager 1530 may transmit signaling indicating a number of wake-up signals for which an offset between each wake-up signal and a respective transmission of data is set to zero.

The LBT manager 1520 may perform a listen-before-talk procedure to gain access to the shared radio frequency spectrum band for a channel occupancy time, where the wake-up signaling and the data are transmitted in the channel occupancy time. In some examples, the LBT manager 1520 may perform a first listen-before-talk procedure to gain access to the shared radio frequency spectrum band for a first channel occupancy time, where the wake-up signaling is transmitted in the first channel occupancy time. In some examples, the LBT manager 1520 may perform a second listen-before-talk procedure to gain access to the shared radio frequency spectrum band for a second channel occupancy time, where the data is transmitted in the second channel occupancy time. In some examples, the LBT manager 1520 may determine a length of a contention window selected for the second listen-before-talk procedure.

The DRX manager 1525 may select a first length as the length of the on-duration from a set of lengths including at least the first length and a second length longer than the first length, where the first length is associated with receiving wake-up signaling in a same channel occupancy time as associated data, and the second length is associated with receiving wake-up signaling in a different channel occupancy time from associated data. In some examples, the DRX manager 1525 may select a second length as the length of the on-duration from a set of lengths including at least the second length and a first length shorter than the second length, where the second length is associated with receiving wake-up signaling in a different channel occupancy time from associated data, and the first length is associated with receiving wake-up signaling in a same channel occupancy time as associated data.

The GTS manager 1535 may transmit a first go-to-sleep signal in the on-duration after transmitting the grant, the first go-to-sleep signal indicating that other UEs are to enter a sleep state. In some examples, the GTS manager 1535 may transmit a second go-to-sleep signal indicating that the UE scheduled to receive the data from the base station is to enter the sleep state.

Figure 16:
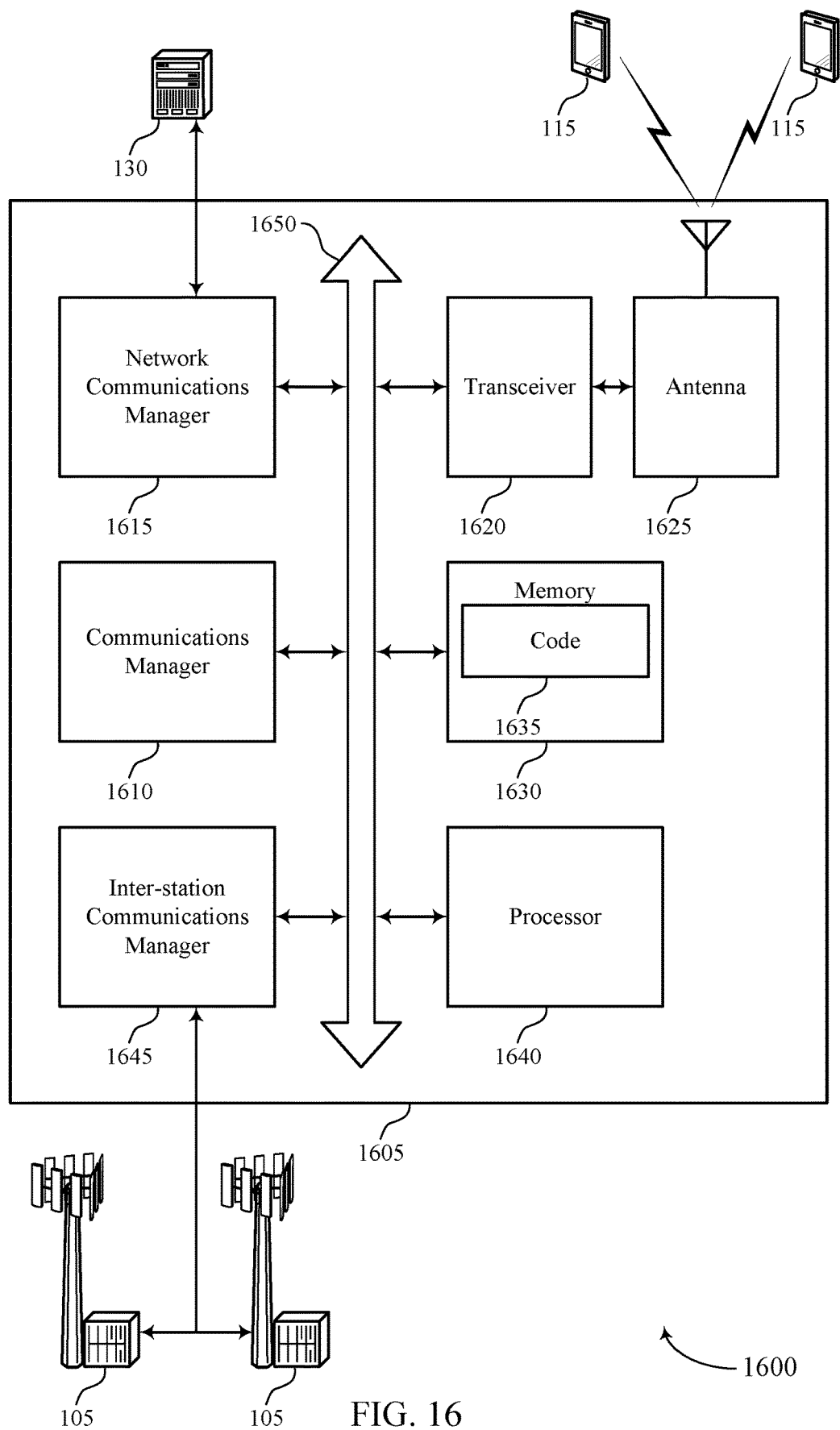
FIG. 16 shows a diagram of a system including a device that supports power saving for DRX in a shared spectrum in accordance with aspects of the present disclosure.

FIG. 16 shows a diagram of a system 1600 including a device 1605 that supports power saving for DRX in a shared spectrum in accordance with aspects of the present disclosure. The device 1605 may be an example of or include the components of device 1305, device 1405, or a base station 105 as described herein. The device 1605 may include components for bi-directional voice and data communications including components for transmitting and receiving communications, including a communications manager 1610, a network communications manager 1615, a transceiver 1620, an antenna 1625, memory 1630, a processor 1640, and an inter-station communications manager 1645. These components may be in electronic communication via one or more buses (e.g., bus 1650).

The communications manager 1610 may identify data to transmit in a shared radio frequency spectrum band to a UE operating according to a discontinuous reception cycle, transmit the data to the UE in the on-duration based on transmitting the wake-up signaling, and transmit, to the UE prior to an on-duration of the discontinuous reception cycle, wake-up signaling including an indication of a length of the on-duration for which the UE is to enter a wake state to receive data from the base station.

The communications manager 1610 may also identify data to transmit to a UE in a shared radio frequency spectrum band, where the UE is operating according to a discontinuous reception cycle, transmit the data to the UE after transmitting the wake-up signaling based on setting the offset to zero, set an offset between wake-up signaling and a transmission of the data to zero, and transmit the wake-up signaling to the UE prior to an on-duration of the discontinuous reception cycle.

The communications manager 1610, or its sub-components, may be implemented in hardware, code (e.g., software or firmware) executed by a processor, or any combination thereof. If implemented in code executed by a processor, the functions of the communications manager 1610, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1610, or its sub-components, may be physically located at various positions, including being distributed such that portions of functions are implemented at different physical locations by one or more physical components. In some examples, the communications manager 1610, or its sub-components, may be a separate and distinct component in accordance with various aspects of the present disclosure. In some examples, the communications manager 1610, or its sub-components, may be combined with one or more other hardware components, including but not limited to an I/O component, a transceiver, a network server, another computing device, one or more other components described in the present disclosure, or a combination thereof in accordance with various aspects of the present disclosure.

The network communications manager 1615 may manage communications with the core network (e.g., via one or more wired backhaul links). For example, the network communications manager 1615 may manage the transfer of data communications for client devices, such as one or more UEs 115.

The transceiver 1620 may communicate bi-directionally, via one or more antennas, wired, or wireless links as described above. For example, the transceiver 1620 may represent a wireless transceiver and may communicate bi-directionally with another wireless transceiver. The transceiver 1620 may also include a modem to modulate the packets and provide the modulated packets to the antennas for transmission, and to demodulate packets received from the antennas.

In some cases, the wireless device may include a single antenna 1625. However, in some cases the device may have more than one antenna 1625, which may be capable of concurrently transmitting or receiving multiple wireless transmissions.

The memory 1630 may include RAM, ROM, or a combination thereof. The memory 1630 may store computer-readable code 1635 including instructions that, when executed by a processor (e.g., the processor 1640) cause the device to perform various functions described herein. In some cases, the memory 1630 may contain, among other things, a BIOS which may control basic hardware or software operation such as the interaction with peripheral components or devices.

The processor 1640 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some cases, a memory controller may be integrated into processor 1640. The processor 1640 may be configured to execute computer-readable instructions stored in a memory (e.g., the memory 1630) to cause the device 1605 to perform various functions (e.g., functions or tasks supporting power saving for DRX in a shared spectrum).

The inter-station communications manager 1645 may manage communications with other base station 105, and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communication network technology to provide communication between base stations 105.

The code 1635 may include instructions to implement aspects of the present disclosure, including instructions to support wireless communications. The code 1635 may be stored in a non-transitory computer-readable medium such as system memory or other type of memory. In some cases, the code 1635 may not be directly executable by the processor 1640 but may cause a computer (e.g., when compiled and executed) to perform functions described herein.

Figure 17:
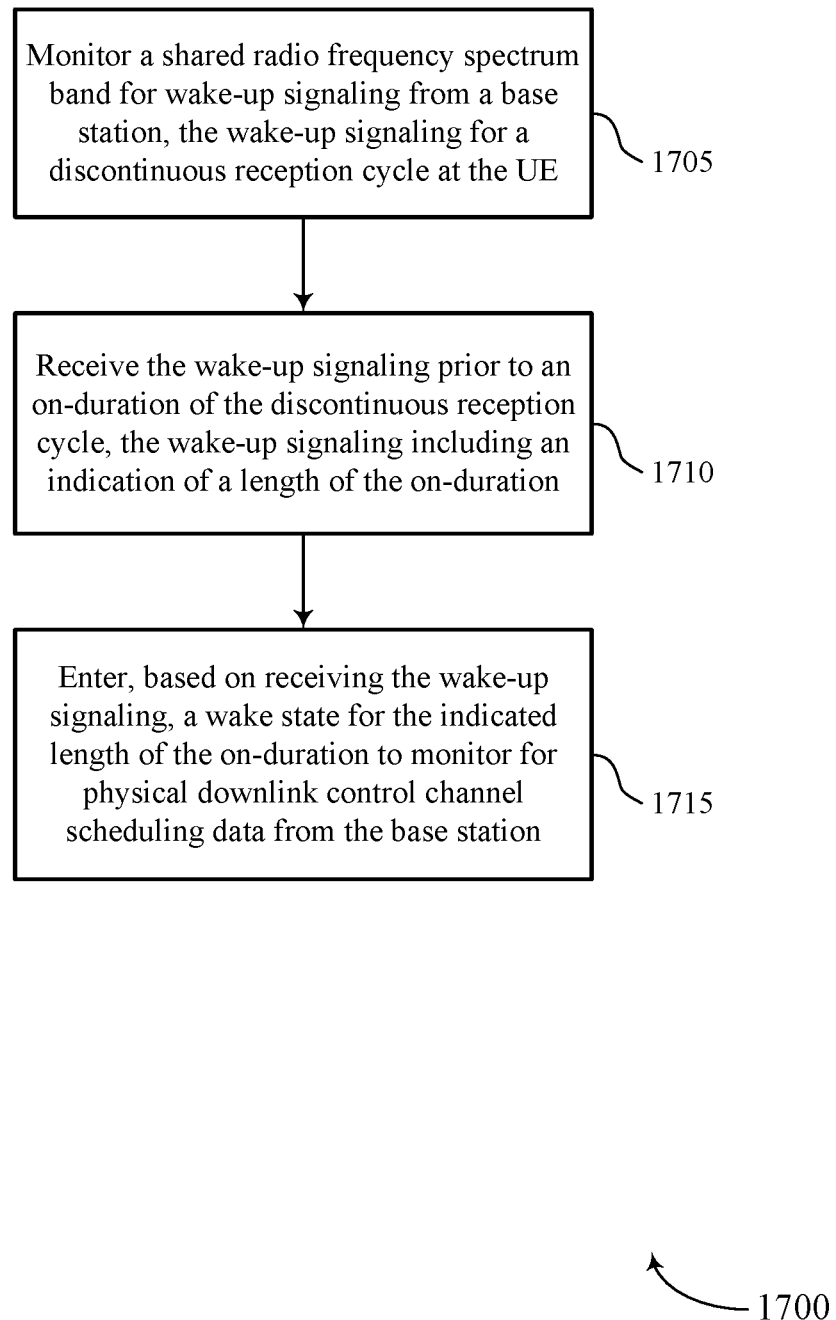
FIGS. 17 through 22 show flowcharts illustrating methods that support power saving for DRX in a shared spectrum in accordance with aspects of the present disclosure.

FIG. 17 shows a flowchart illustrating a method 1700 that supports power saving for DRX in a shared spectrum in accordance with aspects of the present disclosure. The operations of method 1700 may be implemented by a UE 115 or its components as described herein. For example, the operations of method 1700 may be performed by a communications manager as described with reference to FIGS. 9 through 12. In some examples, a UE may execute a set of instructions to control the functional elements of the UE to perform the functions described below. Additionally, or alternatively, a UE may perform aspects of the functions described below using special-purpose hardware.

At 1705, the UE may monitor a shared radio frequency spectrum band for wake-up signaling from a base station, the wake-up signaling for a discontinuous reception cycle at the UE. The operations of 1705 may be performed according to the methods described herein. In some examples, aspects of the operations of 1705 may be performed by a WUS manager as described with reference to FIGS. 9 through 12.

At 1710, the UE may receive the wake-up signaling prior to an on-duration of the discontinuous reception cycle, the wake-up signaling including an indication of a length of the on-duration. The operations of 1710 may be performed according to the methods described herein. In some examples, aspects of the operations of 1710 may be performed by a WUS manager as described with reference to FIGS. 9 through 12.

At 1715, the UE may enter, based on receiving the wake-up signaling, a wake state for the indicated length of the on-duration to monitor for physical downlink control channel scheduling data from the base station. The operations of 1715 may be performed according to the methods described herein. In some examples, aspects of the operations of 1715 may be performed by a DRX manager as described with reference to FIGS. 9 through 12.

Figure 18:
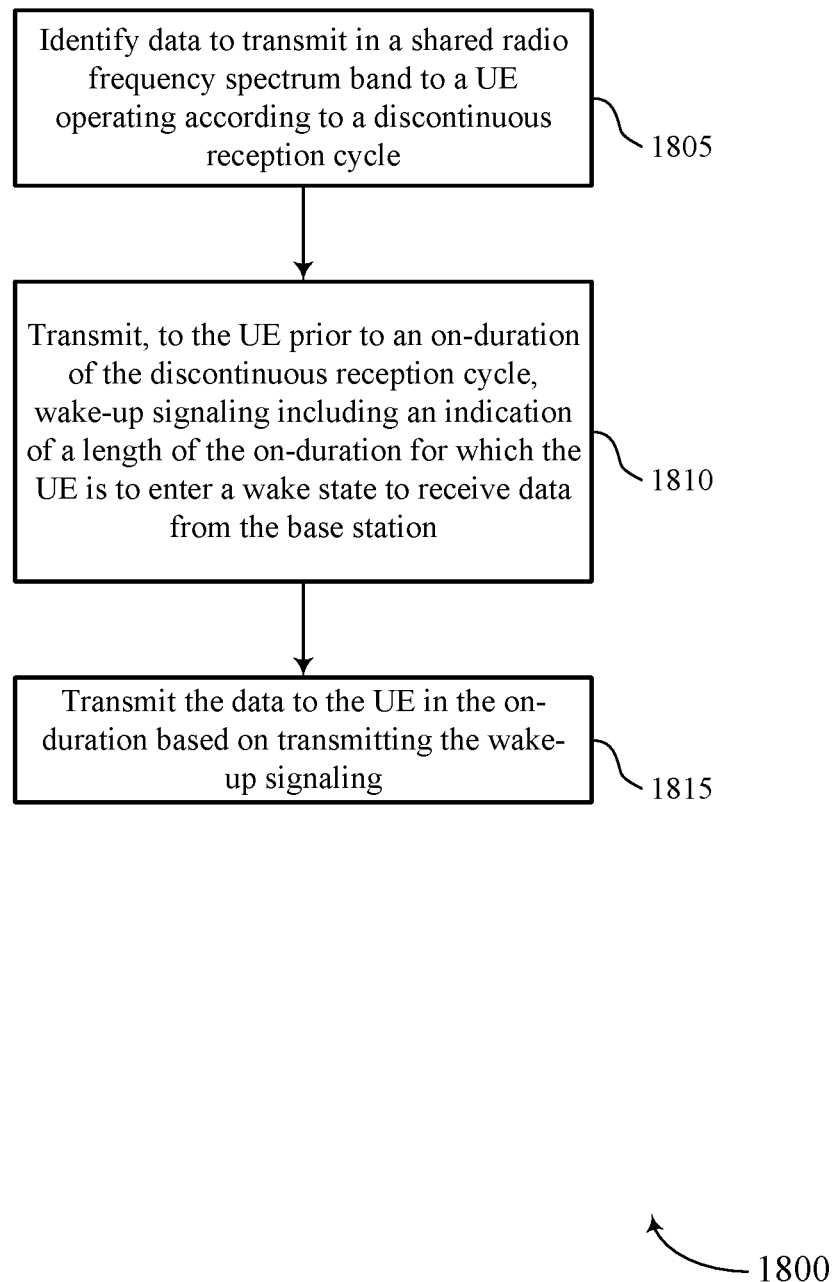

FIG. 18 shows a flowchart illustrating a method 1800 that supports power saving for DRX in a shared spectrum in accordance with aspects of the present disclosure. The operations of method 1800 may be implemented by a base station 105 or its components as described herein. For example, the operations of method 1800 may be performed by a communications manager as described with reference to FIGS. 13 through 16. In some examples, a base station may execute a set of instructions to control the functional elements of the base station to perform the functions described below. Additionally, or alternatively, a base station may perform aspects of the functions described below using special-purpose hardware.

At 1805, the base station may identify data to transmit in a shared radio frequency spectrum band to a UE operating according to a discontinuous reception cycle. The operations of 1805 may be performed according to the methods described herein. In some examples, aspects of the operations of 1805 may be performed by a data and control manager as described with reference to FIGS. 13 through 16.

At 1810, the base station may transmit, to the UE prior to an on-duration of the discontinuous reception cycle, wake-up signaling including an indication of a length of the on-duration for which the UE is to enter a wake state to receive data from the base station. The operations of 1810 may be performed according to the methods described herein. In some examples, aspects of the operations of 1810 may be performed by a WUS manager as described with reference to FIGS. 13 through 16.

At 1815, the base station may transmit the data to the UE in the on-duration based on transmitting the wake-up signaling. The operations of 1815 may be performed according to the methods described herein. In some examples, aspects of the operations of 1815 may be performed by a data and control manager as described with reference to FIGS. 13 through 16.

Figure 19:
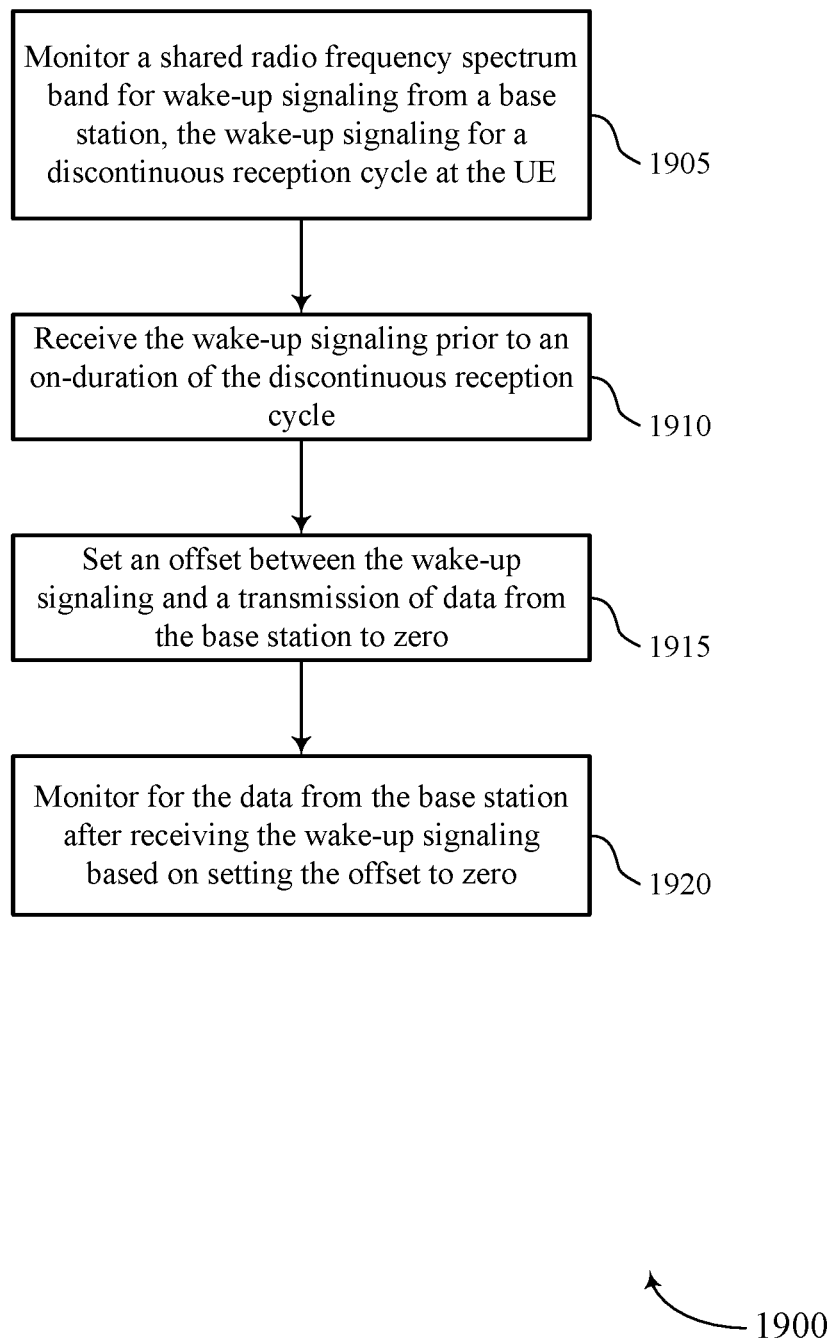

FIG. 19 shows a flowchart illustrating a method 1900 that supports power saving for DRX in a shared spectrum in accordance with aspects of the present disclosure. The operations of method 1900 may be implemented by a UE 115 or its components as described herein. For example, the operations of method 1900 may be performed by a communications manager as described with reference to FIGS. 9 through 12. In some examples, a UE may execute a set of instructions to control the functional elements of the UE to perform the functions described below. Additionally, or alternatively, a UE may perform aspects of the functions described below using special-purpose hardware.

At 1905, the UE may monitor a shared radio frequency spectrum band for wake-up signaling from a base station, the wake-up signaling for a discontinuous reception cycle at the UE. The operations of 1905 may be performed according to the methods described herein. In some examples, aspects of the operations of 1905 may be performed by a WUS manager as described with reference to FIGS. 9 through 12.

At 1910, the UE may receive the wake-up signaling prior to an on-duration of the discontinuous reception cycle. The operations of 1910 may be performed according to the methods described herein. In some examples, aspects of the operations of 1910 may be performed by a WUS manager as described with reference to FIGS. 9 through 12.

At 1915, the UE may set an offset between the wake-up signaling and a transmission of data from the base station to zero. The operations of 1915 may be performed according to the methods described herein. In some examples, aspects of the operations of 1915 may be performed by a WUS offset manager as described with reference to FIGS. 9 through 12.

At 1920, the UE may monitor for the data from the base station after receiving the wake-up signaling based on setting the offset to zero. The operations of 1920 may be performed according to the methods described herein. In some examples, aspects of the operations of 1920 may be performed by a data and control manager as described with reference to FIGS. 9 through 12.

Figure 20:
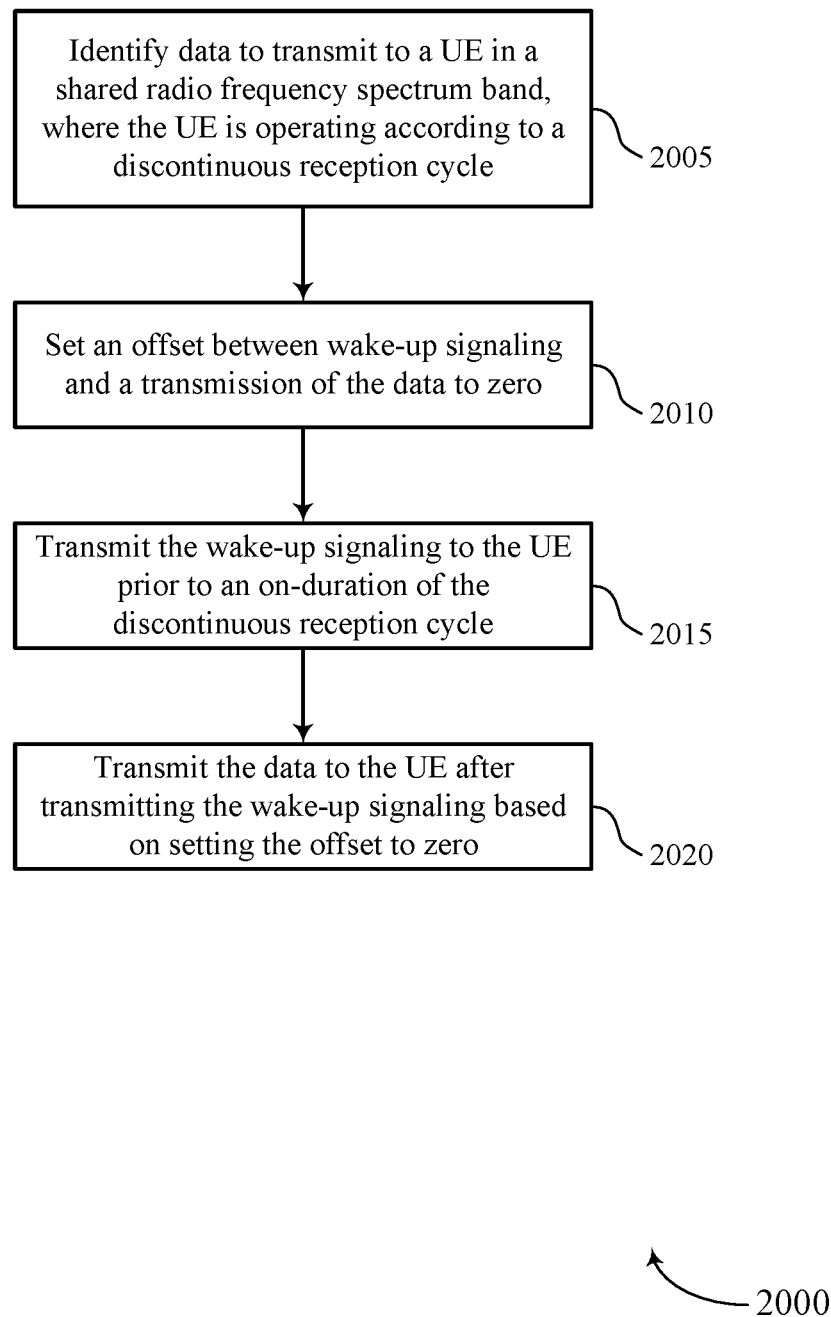

FIG. 20 shows a flowchart illustrating a method 2000 that supports power saving for DRX in a shared spectrum in accordance with aspects of the present disclosure. The operations of method 2000 may be implemented by a base station 105 or its components as described herein. For example, the operations of method 2000 may be performed by a communications manager as described with reference to FIGS. 13 through 16. In some examples, a base station may execute a set of instructions to control the functional elements of the base station to perform the functions described below. Additionally, or alternatively, a base station may perform aspects of the functions described below using special-purpose hardware.

At 2005, the base station may identify data to transmit to a UE in a shared radio frequency spectrum band, where the UE is operating according to a discontinuous reception cycle. The operations of 2005 may be performed according to the methods described herein. In some examples, aspects of the operations of 2005 may be performed by a data and control manager as described with reference to FIGS. 13 through 16.

At 2010, the base station may set an offset between wake-up signaling and a transmission of the data to zero. The operations of 2010 may be performed according to the methods described herein. In some examples, aspects of the operations of 2010 may be performed by a WUS offset manager as described with reference to FIGS. 13 through 16.

At 2015, the base station may transmit the wake-up signaling to the UE prior to an on-duration of the discontinuous reception cycle. The operations of 2015 may be performed according to the methods described herein. In some examples, aspects of the operations of 2015 may be performed by a WUS manager as described with reference to FIGS. 13 through 16.

At 2020, the base station may transmit the data to the UE after transmitting the wake-up signaling based on setting the offset to zero. The operations of 2020 may be performed according to the methods described herein. In some examples, aspects of the operations of 2020 may be performed by a data and control manager as described with reference to FIGS. 13 through 16.

Figure 21:
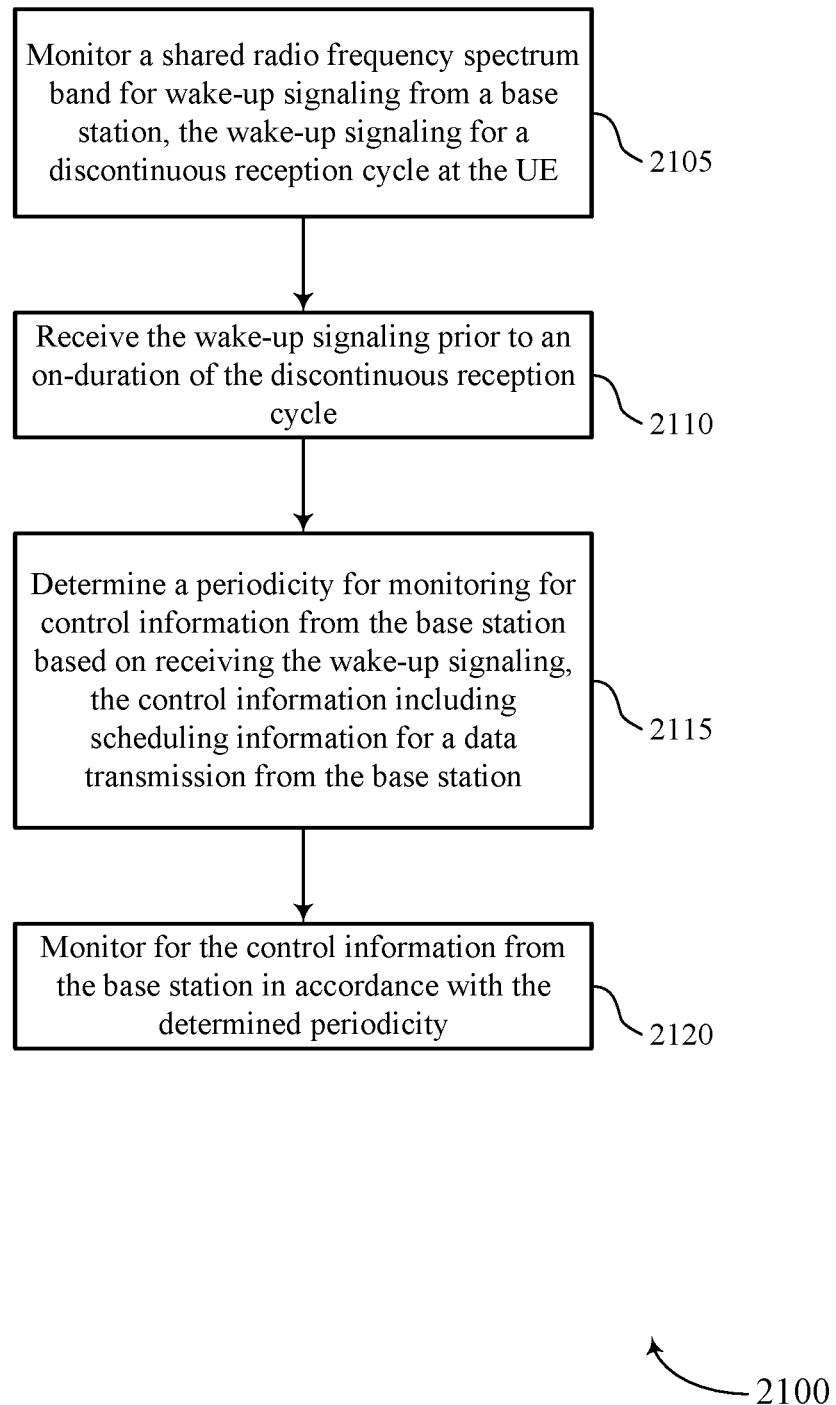

FIG. 21 shows a flowchart illustrating a method 2100 that supports power saving for DRX in a shared spectrum in accordance with aspects of the present disclosure. The operations of method 2100 may be implemented by a UE 115 or its components as described herein. For example, the operations of method 2100 may be performed by a communications manager as described with reference to FIGS. 9 through 12. In some examples, a UE may execute a set of instructions to control the functional elements of the UE to perform the functions described below. Additionally, or alternatively, a UE may perform aspects of the functions described below using special-purpose hardware.

At 2105, the UE may monitor a shared radio frequency spectrum band for wake-up signaling from a base station, the wake-up signaling for a discontinuous reception cycle at the UE. The operations of 2105 may be performed according to the methods described herein. In some examples, aspects of the operations of 2105 may be performed by a WUS manager as described with reference to FIGS. 9 through 12.

At 2110, the UE may receive the wake-up signaling prior to an on-duration of the discontinuous reception cycle. The operations of 2110 may be performed according to the methods described herein. In some examples, aspects of the operations of 2110 may be performed by a WUS manager as described with reference to FIGS. 9 through 12.

At 2115, the UE may determine a periodicity for monitoring for control information from the base station based on receiving the wake-up signaling, the control information including scheduling information for a data transmission from the base station. The operations of 2115 may be performed according to the methods described herein. In some examples, aspects of the operations of 2115 may be performed by a data and control manager as described with reference to FIGS. 9 through 12.

At 2120, the UE may monitor for the control information from the base station in accordance with the determined periodicity. The operations of 2120 may be performed according to the methods described herein. In some examples, aspects of the operations of 2120 may be performed by a data and control manager as described with reference to FIGS. 9 through 12.

Figure 22:
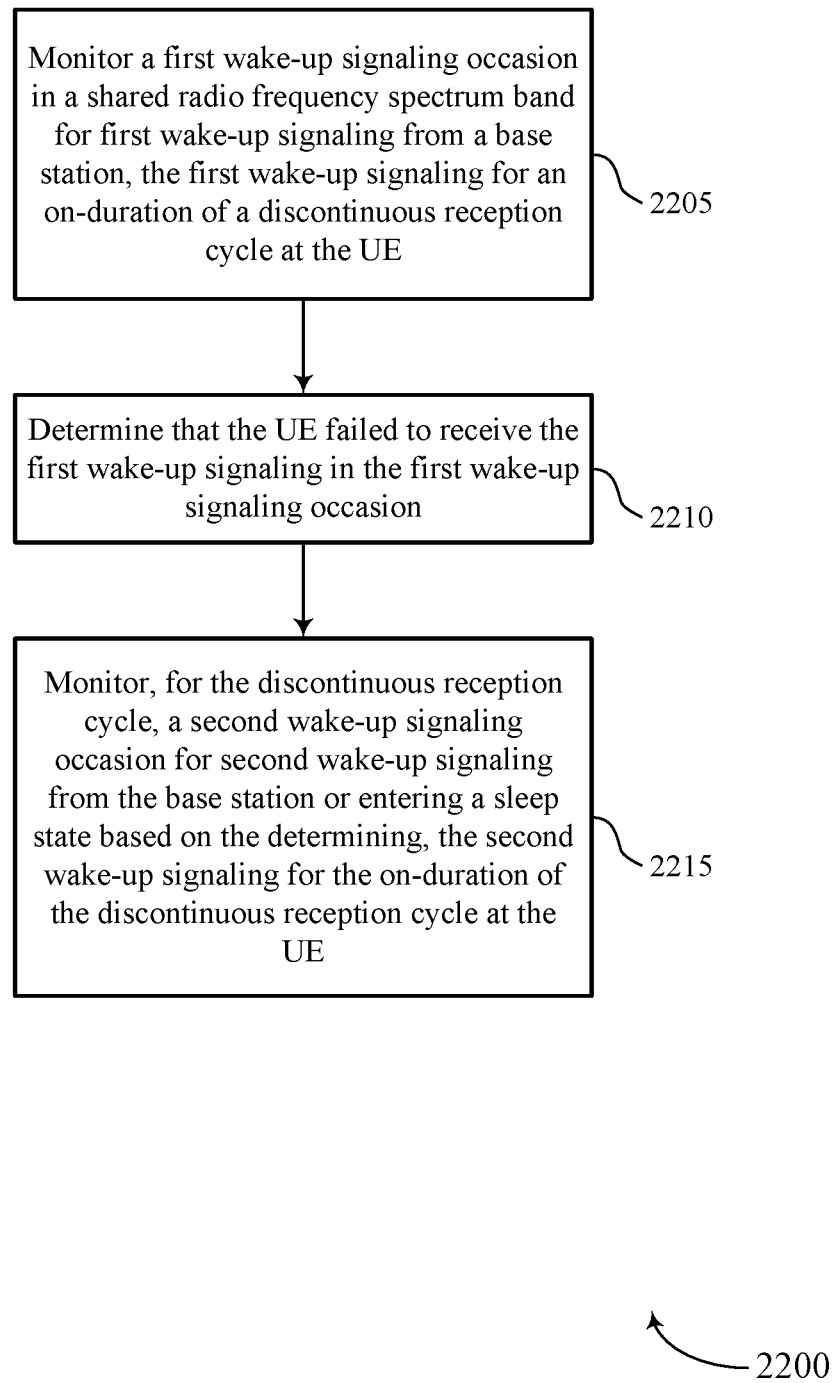

FIG. 22 shows a flowchart illustrating a method 2200 that supports power saving for DRX in a shared spectrum in accordance with aspects of the present disclosure. The operations of method 2200 may be implemented by a UE 115 or its components as described herein. For example, the operations of method 2200 may be performed by a communications manager as described with reference to FIGS. 9 through 12. In some examples, a UE may execute a set of instructions to control the functional elements of the UE to perform the functions described below. Additionally, or alternatively, a UE may perform aspects of the functions described below using special-purpose hardware.

At 2205, the UE may monitor a first wake-up signaling occasion in a shared radio frequency spectrum band for first wake-up signaling from a base station, the first wake-up signaling for an on-duration of a discontinuous reception cycle at the UE. The operations of 2205 may be performed according to the methods described herein. In some examples, aspects of the operations of 2205 may be performed by a WUS occasion manager as described with reference to FIGS. 9 through 12.

At 2210, the UE may determine that the UE failed to receive the first wake-up signaling in the first wake-up signaling occasion. The operations of 2210 may be performed according to the methods described herein. In some examples, aspects of the operations of 2210 may be performed by a WUS manager as described with reference to FIGS. 9 through 12.

At 2215, the UE may monitor, for the discontinuous reception cycle, a second wake-up signaling occasion for second wake-up signaling from the base station or entering a sleep state based on the determining, the second wake-up signaling for the on-duration of the discontinuous reception cycle at the UE. The operations of 2215 may be performed according to the methods described herein. In some examples, aspects of the operations of 2215 may be performed by a WUS occasion manager as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a UE, comprising: monitoring a shared radio frequency spectrum band for wake-up signaling from a base station, the wake-up signaling for a discontinuous reception cycle at the UE; receiving the wake-up signaling prior to an on-duration of the discontinuous reception cycle, the wake-up signaling comprising an indication of a length of the on-duration; and entering, based at least in part on receiving the wake-up signaling, a wake state for the indicated length of the on-duration to monitor for physical downlink control channel scheduling data from the base station.

Aspect 2: The method of aspect 1, further comprising: receiving the physical downlink control channel and the scheduled data in the on-duration in a same channel occupancy time in which the wake-up signaling is received.

Aspect 3: The method of aspect 2, wherein the length of the on-duration comprises a first length that is shorter than a second length of the on-duration, the second length associated with receiving wake-up signaling in a different channel occupancy time than associated data, the method further comprising: entering the wake state for the first length of the on-duration to monitor for the physical downlink control channel scheduling data from the base station.

Aspect 4: The method of any of aspects 2 through 3, further comprising: receiving the wake-up signaling in another physical downlink control channel scheduling the data on scheduled resources with an indication that the data is guaranteed to be received on the scheduled resources during the on-duration; and receiving the data on the scheduled resource during the on-duration without monitoring for the physical downlink control channel, if the indication is set.

Aspect 5: The method of any of aspects 1 through 4, wherein the wake-up signaling is received in a first channel occupancy time, the method further comprising: receiving the physical downlink control channel and the scheduled data in the on-duration in a second channel occupancy time.

Aspect 6: The method of aspect 5, wherein the length of the on-duration comprises a second length that is longer than a first length, the first length associated with receiving wake-up signaling in a same channel occupancy time as associated data, the method further comprising: entering the wake state for the second length of the on-duration to monitor for the physical downlink control channel scheduling the data from the base station.

Aspect 7: The method of any of aspects 5 through 6, further comprising: receiving, in the wake-up signaling, an indication that the base station has to gain access to the shared radio frequency spectrum band for the second channel occupancy time before transmitting the data; and monitoring the physical downlink control channel scheduling the data during the on-duration.

Aspect 8: The method of any of aspects 5 through 7, further comprising: receiving, in the wake-up signaling, an indication of an offset between the wake-up signaling and the data.

Aspect 9: The method of any of aspects 5 through 8, further comprising: receiving a grant in the on-duration scheduling the UE to receive the data from the base station; receiving a first go-to-sleep signal in the on-duration after receiving the grant; and ignoring the first go-to-sleep signal based at least in part on receiving the grant.

Aspect 10: The method of aspect 9, further comprising: receiving a second go-to-sleep signal in the on-duration after receiving the grant; and entering a sleep state based at least in part on receiving the second go-to-sleep signal.

Aspect 11: The method of any of aspects 1 through 10, further comprising: receiving a go-to-sleep signal in the on-duration; identifying that the UE failed to receive a grant scheduling the UE to receive the data from the base station; and entering a sleep state based at least in part on the identifying and on receiving the go-to-sleep signal.

Aspect 12: A method for wireless communication at a base station, comprising: identifying data to transmit in a shared radio frequency spectrum band to a UE operating according to a discontinuous reception cycle; transmitting, to the UE prior to an on-duration of the discontinuous reception cycle, wake-up signaling comprising an indication of a length of the on-duration for which the UE is to enter a wake state to receive data from the base station; and transmitting the data to the UE in the on-duration based at least in part on transmitting the wake-up signaling.

Aspect 13: The method of aspect 12, further comprising: performing a listen-before-talk procedure to gain access to the shared radio frequency spectrum band for a channel occupancy time, wherein the wake-up signaling and the data are transmitted in the channel occupancy time.

Aspect 14: The method of aspect 13, further comprising: selecting a first length as the length of the on-duration from a set of lengths comprising at least the first length and a second length longer than the first length, wherein the first length is associated with receiving wake-up signaling in a same channel occupancy time as associated data, and the second length is associated with receiving wake-up signaling in a different channel occupancy time from associated data.

Aspect 15: The method of any of aspects 13 through 14, further comprising: transmitting, in the wake-up signaling, a grant for resources and an indication that the data is guaranteed to be transmitted on the resources in the on-duration if the wake-up signaling and data are transmitted in a same channel occupancy time.

Aspect 16: The method of any of aspects 12 through 15, further comprising: performing a first listen-before-talk procedure to gain access to the shared radio frequency spectrum band for a first channel occupancy time, wherein the wake-up signaling is transmitted in the first channel occupancy time; and performing a second listen-before-talk procedure to gain access to the shared radio frequency spectrum band for a second channel occupancy time, wherein the data is transmitted in the second channel occupancy time.

Aspect 17: The method of aspect 16, further comprising: selecting a second length as the length of the on-duration from a set of lengths comprising at least the second length and a first length shorter than the second length, wherein the second length is associated with receiving wake-up signaling in a different channel occupancy time from associated data, and the first length is associated with receiving wake-up signaling in a same channel occupancy time as associated data.

Aspect 18: The method of any of aspects 16 through 17, further comprising: transmitting, in the wake-up signaling, an indication that the base station has to gain access to the shared radio frequency spectrum band for the second channel occupancy time before transmitting the data.

Aspect 19: The method of any of aspects 16 through 18, further comprising: determining a length of a contention window selected for the second listen-before-talk procedure; identifying an offset between the wake-up signaling and the data based at least in part on the length of the contention window; and transmitting, in the wake-up signaling, an indication of the offset between the wake-up signaling and the data.

Aspect 20: The method of any of aspects 16 through 19, further comprising: transmitting a grant in the on-duration scheduling the UE to receive the data from the base station; and transmitting a first go-to-sleep signal in the on-duration after transmitting the grant, the first go-to-sleep signal indicating that other UEs are to enter a sleep state.

Aspect 21: The method of aspect 20, further comprising: transmitting a second go-to-sleep signal indicating that the UE scheduled to receive the data from the base station is to enter the sleep state.

Aspect 22: A method for wireless communication at a UE, comprising: monitoring a shared radio frequency spectrum band for wake-up signaling from a base station, the wake-up signaling for a discontinuous reception cycle at the UE; receiving the wake-up signaling prior to an on-duration of the discontinuous reception cycle; setting an offset between the wake-up signaling and a transmission of data from the base station to zero; and monitoring for the data from the base station after receiving the wake-up signaling based at least in part on setting the offset to zero.

Aspect 23: The method of aspect 22, wherein setting the offset between the wake-up signaling and the transmission of the data from the base station to zero comprises: identifying that the UE failed to receive data in a previous on-duration of the discontinuous reception cycle signaled by a previous wake-up signaling; and setting the offset between the wake-up signaling and the transmission of the data from the base station to zero based at least in part on the identifying.

Aspect 24: The method of aspect 23, further comprising: detecting a signal transmitted by the base station in the on-duration; determining that the base station has access to the shared radio frequency spectrum band for at least a portion of the on-duration based at least in part on detecting the signal; and setting the offset between subsequent wake-up signaling and an associated data transmission from the base station to non-zero based at least in part on determining that the base station has access to the shared radio frequency spectrum band for at least the portion of the on-duration.

Aspect 25: The method of any of aspects 22 through 24, wherein setting the offset between the wake-up signaling and the transmission of the data from the base station to zero comprises: receiving a first portion of previous data in a previous on-duration of the discontinuous reception cycle signaled by a previous wake-up signaling; determining that the UE failed to receive a second portion of the previous data in the previous on-duration; and setting the offset between the wake-up signaling and the transmission of the data from the base station to zero based at least in part on the determining.

Aspect 26: The method of any of aspects 22 through 25, further comprising: receiving signaling indicating a number of wake-up signals for which an offset between each wake-up signal and a respective transmission of data is set to zero.

Aspect 27: A method for wireless communication at a base station, comprising: identifying data to transmit to a UE in a shared radio frequency spectrum band, wherein the UE is operating according to a discontinuous reception cycle; setting an offset between wake-up signaling and a transmission of the data to zero; transmitting the wake-up signaling to the UE prior to an on-duration of the discontinuous reception cycle; and transmitting the data to the UE after transmitting the wake-up signaling based at least in part on setting the offset to zero.

Aspect 28: The method of aspect 27, wherein setting the offset between the wake-up signaling and the transmission of the data to zero comprises: identifying that the base station failed to transmit data in a previous on-duration of the discontinuous reception cycle signaled by a previous wake-up signaling; and setting the offset between the wake-up signaling and the transmission of the data to zero based at least in part on the identifying.

Aspect 29: The method of any of aspects 27 through 28, wherein setting the offset between the wake-up signaling and the transmission of the data to zero comprises: transmitting a first portion of previous data in a previous on-duration of the discontinuous reception cycle signaled by a previous wake-up signaling; determining that the base station failed to transmit a second portion of the previous data in the previous on-duration; and setting the offset between the wake-up signaling and the transmission of the data to zero based at least in part on the determining.

Aspect 30: The method of any of aspects 27 through 29, further comprising: transmitting signaling indicating a number of wake-up signals for which an offset between each wake-up signal and a respective transmission of data is set to zero.

Aspect 31: A method for wireless communication at a UE, comprising: monitoring a shared radio frequency spectrum band for wake-up signaling from a base station, the wake-up signaling for a discontinuous reception cycle at the UE; receiving the wake-up signaling prior to an on-duration of the discontinuous reception cycle; determining a periodicity for monitoring for control information from the base station based at least in part on receiving the wake-up signaling, the control information comprising scheduling information for a data transmission from the base station; and monitoring for the control information from the base station in accordance with the determined periodicity.

Aspect 32: The method of aspect 31, further comprising: determining that the data transmission is to be received in a same channel occupancy time as the wake-up signaling; determining that the periodicity for monitoring for control information from the base station is a first periodicity that is longer than a second periodicity, wherein the second periodicity is associated with receiving wake-up signaling in a different channel occupancy time from associated data; and monitoring for the control information from the base station in accordance with the first periodicity.

Aspect 33: The method of aspect 32, further comprising: receiving an indication of sub-bands to monitor for the control information from the base station in accordance with the first periodicity; and monitoring the indicated sub-bands for the control information from the base station in accordance with the first periodicity.

Aspect 34: The method of any of aspects 31 through 33, further comprising: determining that the data transmission is to be received in a different channel occupancy time from the wake-up signaling; determining that the periodicity for monitoring for control information from the base station is a second periodicity that is shorter than a first periodicity, wherein the first periodicity is associated with receiving wake-up signaling in a same channel occupancy time as associated data; and monitoring for the control information from the base station in accordance with the second periodicity.

Aspect 35: The method of aspect 34, further comprising: monitoring all sub-bands for the control information from the base station in accordance with the second periodicity.

Aspect 36: A method for wireless communication at a UE, comprising: monitoring a first wake-up signaling occasion in a shared radio frequency spectrum band for first wake-up signaling from a base station, the first wake-up signaling for an on-duration of a discontinuous reception cycle at the UE; determining that the UE failed to receive the first wake-up signaling in the first wake-up signaling occasion; and monitoring, for the discontinuous reception cycle, a second wake-up signaling occasion for second wake-up signaling from the base station or entering a sleep state based at least in part on the determining, the second wake-up signaling for the on-duration of the discontinuous reception cycle at the UE.

Aspect 37: The method of aspect 36, further comprising: determining that the base station had access to the shared radio frequency spectrum band in the first wake-up signaling occasion; entering the sleep state based at least in part on the determining; and avoiding monitoring the second wake-up signaling occasion for the second wake-up signaling from the base station based at least in part on the determining.

Aspect 38: The method of any of aspects 36 through 37, further comprising: determining that the base station failed to gain access to the shared radio frequency spectrum band for the first wake-up signaling occasion; and monitoring the second wake-up signaling occasion for the second wake-up signaling from the base station based at least in part on the determining.

Aspect 39: The method of any of aspects 36 through 38, further comprising: detecting that an energy of a channel monitored for the first wake-up signaling in the first wake-up signaling occasion is below a threshold; entering the sleep state based at least in part on the detecting; and avoiding monitoring the second wake-up signaling occasion for the second wake-up signaling from the base station based at least in part on the determining.

Aspect 40: The method of any of aspects 36 through 39, further comprising: detecting that an energy of a channel monitored for the first wake-up signaling in the first wake-up signaling occasion is below a threshold; determining that a hidden node blocked the first wake-up signaling from the base station; and monitoring the second wake-up signaling occasion for the second wake-up signaling from the base station based at least in part on the determining.

Aspect 41: An apparatus for wireless communication at a UE, comprising a processor; memory coupled with the processor; and instructions stored in the memory and executable by the processor to cause the apparatus to perform a method of any of aspects 1 through 11.

Aspect 42: An apparatus for wireless communication at a UE, comprising at least one means for performing a method of any of aspects 1 through 11.

Aspect 43: A non-transitory computer-readable medium storing code for wireless communication at a UE, the code comprising instructions executable by a processor to perform a method of any of aspects 1 through 11.

Aspect 44: An apparatus for wireless communication at a base station, comprising a processor; memory coupled with the processor; and instructions stored in the memory and executable by the processor to cause the apparatus to perform a method of any of aspects 12 through 21.

Aspect 45: An apparatus for wireless communication at a base station, comprising at least one means for performing a method of any of aspects 12 through 21.

Aspect 46: A non-transitory computer-readable medium storing code for wireless communication at a base station, the code comprising instructions executable by a processor to perform a method of any of aspects 12 through 21.

Aspect 47: An apparatus for wireless communication at a UE, comprising a processor; memory coupled with the processor; and instructions stored in the memory and executable by the processor to cause the apparatus to perform a method of any of aspects 22 through 26.

Aspect 48: An apparatus for wireless communication at a UE, comprising at least one means for performing a method of any of aspects 22 through 26.

Aspect 49: A non-transitory computer-readable medium storing code for wireless communication at a UE, the code comprising instructions executable by a processor to perform a method of any of aspects 22 through 26.

Aspect 50: An apparatus for wireless communication at a base station, comprising a processor; memory coupled with the processor; and instructions stored in the memory and executable by the processor to cause the apparatus to perform a method of any of aspects 27 through 30.

Aspect 51: An apparatus for wireless communication at a base station, comprising at least one means for performing a method of any of aspects 27 through 30.

Aspect 52: A non-transitory computer-readable medium storing code for wireless communication at a base station, the code comprising instructions executable by a processor to perform a method of any of aspects 27 through 30.

Aspect 53: An apparatus for wireless communication at a UE, comprising a processor; memory coupled with the processor; and instructions stored in the memory and executable by the processor to cause the apparatus to perform a method of any of aspects 31 through 35.

Aspect 54: An apparatus for wireless communication at a UE, comprising at least one means for performing a method of any of aspects 31 through 35.

Aspect 55: A non-transitory computer-readable medium storing code for wireless communication at a UE, the code comprising instructions executable by a processor to perform a method of any of aspects 31 through 35.

Aspect 56: An apparatus for wireless communication at a UE, comprising a processor; memory coupled with the processor; and instructions stored in the memory and executable by the processor to cause the apparatus to perform a method of any of aspects 36 through 40.

Aspect 57: An apparatus for wireless communication at a UE, comprising at least one means for performing a method of any of aspects 36 through 40.

Aspect 58: A non-transitory computer-readable medium storing code for wireless communication at a UE, the code comprising instructions executable by a processor to perform a method of any of aspects 36 through 40.

Aspect 59: The method of aspect 1, further comprising: an antenna, or a display, or a user interface, or a combination thereof.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication at a user equipment (UE), comprising:
   a processor,
   memory coupled with the processor; and
   instructions stored in the memory and executable by the processor to cause the apparatus to:
      monitor a shared radio frequency spectrum band for wake-up signaling from a base station, the wake-up signaling for a discontinuous reception cycle at the UE;
      receive the wake-up signaling prior to an on-duration of the discontinuous reception cycle, the wake-up signaling comprising an indication of a length of the on-duration;
      enter, based at least in part on receiving the wake-up signaling, a wake state for the indicated length of the on-duration to monitor for physical downlink control channel scheduling data from the base station; and
      receive the physical downlink control channel scheduling data in the on-duration in a same channel occupancy time in which the wake-up signaling is received.

2. The apparatus of claim 1, wherein the length of the on-duration comprises a first length that is shorter than a second length of the on-duration, and the instructions are further executable by the processor to cause the apparatus to:
   enter the wake state for the first length of the on-duration to monitor for the physical downlink control channel scheduling data from the base station.

3. The apparatus of claim 1, wherein the instructions are further executable by the processor to cause the apparatus to:
   receive the wake-up signaling in another physical downlink control channel scheduling the data on scheduled resources with an indication that the data is guaranteed to be received on the scheduled resources during the on-duration; and
   receive the data on the scheduled resource during the on-duration without monitoring for the physical downlink control channel, if the indication is set.

4. The apparatus of claim 1, further comprising an antenna, or a display, or a user interface, or a combination thereof.

5. An apparatus for wireless communication at a user equipment (UE), comprising:
   a processor,
   memory coupled with the processor; and
   instructions stored in the memory and executable by the processor to cause the apparatus to:
      monitor a shared radio frequency spectrum band for wake-up signaling from a base station, the wake-up signaling for a discontinuous reception cycle at the UE;
      receive the wake-up signaling prior to an on-duration of the discontinuous reception cycle, the wake-up signaling comprising an indication of a length of the on-duration wherein the wake-up signaling is received in a first channel occupancy time;
      enter, based at least in part on receiving the wake-up signaling, a wake state for the indicated length of the on-duration to monitor for physical downlink control channel scheduling data receive the base station; and
      receiving the physical downlink control channel scheduling data in the on-duration in a second channel occupancy time.

6. The apparatus of claim 5, wherein the length of the on-duration comprises a second length that is longer than a first length, and the instructions are further executable by the processor to cause the apparatus to:
   enter the wake state for the second length of the on-duration to monitor for the physical downlink control channel scheduling the data from the base station.

7. The apparatus of claim 5, wherein the instructions are further executable by the processor to cause the apparatus to:
   receive, in the wake-up signaling, an indication that the base station has to gain access to the shared radio frequency spectrum band for the second channel occupancy time before transmitting the data; and
   monitor the physical downlink control channel scheduling the data during the on-duration.

8. The apparatus of claim 5, wherein the instructions are further executable by the processor to cause the apparatus to:
   receive, in the wake-up signaling, an indication of an offset between the wake-up signaling and the data.

9. The apparatus of claim 5, wherein the instructions are further executable by the processor to cause the apparatus to:
   receive a grant in the on-duration scheduling the UE to receive the data from the base station;
   receive a first go-to-sleep signal in the on-duration after receiving the grant; and
   ignore the first go-to-sleep signal based at least in part on receiving the grant.

10. The apparatus of claim 9, wherein the instructions are further executable by the processor to cause the apparatus to:
    receive a second go-to-sleep signal in the on-duration after receiving the grant; and
    enter a sleep state based at least in part on receiving the second go-to-sleep signal.

11. An apparatus for wireless communication at a user equipment (UE), comprising:
    a processor,
    memory coupled with the processor; and
    instructions stored in the memory and executable by the processor to cause the apparatus to:
       monitor a shared radio frequency spectrum band for wake-up signaling from a base station, the wake-up signaling for a discontinuous reception cycle at the UE;

receive the wake-up signaling prior to an on-duration of the discontinuous reception cycle, the wake-up signaling comprising an indication of a length of the on-duration;

enter, based at least in part on receiving the wake-up signaling, a wake state for the indicated length of the on-duration to monitor for physical downlink control channel scheduling data from the base station;

receive a go-to-sleep signal in the on-duration;

identify that the UE failed to receive a grant scheduling the UE to receive the data from the base station; and enter a sleep state based at least in part on the identifying and on receiving the go-to-sleep signal.

12. A method for wireless communication at a user equipment (UE), comprising:

monitoring a shared radio frequency spectrum band for wake-up signaling from a base station, the wake-up signaling for a discontinuous reception cycle at the UE;

receiving the wake-up signaling prior to an on-duration of the discontinuous reception cycle, the wake-up signaling comprising an indication of a length of the on-duration; and entering, based at least in part on receiving the wake-up signaling, a wake state for the indicated length of the on-duration to monitor for physical downlink control channel scheduling data from the base station; and receiving the physical downlink control channel scheduling data in the on-duration in a same channel occupancy time in which the wake-up signaling is received.

13. The method of claim 12, wherein the length of the on-duration comprises a first length that is shorter than a second length of the on-duration, the second length associated with receiving wake-up signaling in a different channel occupancy time than associated data, the method further comprising:

entering the wake state for the first length of the on-duration to monitor for the physical downlink control channel scheduling data from the base station.

14. The method of claim 12, further comprising:

receiving the wake-up signaling in another physical downlink control channel scheduling the data on scheduled resources with an indication that the data is guaranteed to be received on the scheduled resources during the on-duration; and receiving the data on the scheduled resource during the on-duration without monitoring for the physical downlink control channel, if the indication is set.

15. A method for wireless communication at a user equipment (UE), comprising:

monitoring a shared radio frequency spectrum band for wake-up signaling from a base station, the wake-up signaling for a discontinuous reception cycle at the UE;

receiving the wake-up signaling prior to an on-duration of the discontinuous reception cycle, the wake-up signaling comprising an indication of a length of the on-duration; wherein the wake-up signaling is received in a first channel occupancy time;

entering, based at least in part on receiving the wake-up signaling, a wake state for the indicated length of the on-duration to monitor for physical downlink control channel scheduling data from the base station; and receiving the physical downlink control channel scheduling data in the on-duration in a second channel occupancy time.

16. The method of claim 15, wherein the length of the on-duration comprises a second length that is longer than a first length, the first length associated with receiving wake-up signaling in a same channel occupancy time as associated data, the method further comprising:

entering the wake state for the second length of the on-duration to monitor for the physical downlink control channel scheduling the data from the base station.

17. The method of claim 15, further comprising:

receiving, in the wake-up signaling, an indication that the base station has to gain access to the shared radio frequency spectrum band for the second channel occupancy time before transmitting the data; and monitoring the physical downlink control channel scheduling the data during the on-duration.

18. The method of claim 15, further comprising:

receiving, in the wake-up signaling, an indication of an offset between the wake-up signaling and the data.

19. The method of claim 15, further comprising:

receiving a grant in the on-duration scheduling the UE to receive the data from the base station;

receiving a first go-to-sleep signal in the on-duration after receiving the grant; and ignoring the first go-to-sleep signal based at least in part on receiving the grant.

20. The method of claim 19, further comprising:

receiving a second go-to-sleep signal in the on-duration after receiving the grant; and entering a sleep state based at least in part on receiving the second go-to-sleep signal.

21. A method for wireless communication at a user equipment (UE), comprising:

monitoring a shared radio frequency spectrum band for wake-up signaling from a base station, the wake-up signaling for a discontinuous reception cycle at the UE;

receiving the wake-up signaling prior to an on-duration of the discontinuous reception cycle, the wake-up signaling comprising an indication of a length of the on-duration; and entering, based at least in part on receiving the wake-up signaling, a wake state for the indicated length of the on-duration to monitor for physical downlink control channel scheduling data from the base station;

receiving a go-to-sleep signal in the on-duration;

identifying that the UE failed to receive a grant scheduling the UE to receive the data from the base station; and entering a sleep state based at least in part on the identifying and on receiving the go-to-sleep signal.

22. An apparatus for wireless communication at a user equipment (UE), comprising:

means for monitoring a shared radio frequency spectrum band for wake-up signaling from a base station, the wake-up signaling for a discontinuous reception cycle at the UE;

means for receiving the wake-up signaling prior to an on-duration of the discontinuous reception cycle, the wake-up signaling comprising an indication of a length of the on-duration; and means for entering, based at least in part on receiving the wake-up signaling, a wake state for the indicated length of the on-duration to monitor for physical downlink control channel scheduling data from the base station; and means for receiving the physical downlink control channel scheduling data in the on-duration in a same channel occupancy time in which the wake-up signaling is received.

23. The apparatus of claim 22, wherein the length of the on-duration comprises a first length that is shorter than a second length of the on-duration, the apparatus further comprising:
means for entering the wake state for the first length of the on-duration to monitor for the physical downlink control channel scheduling data from the base station.

24. The apparatus of claim 22, further comprising:
means for receiving the wake-up signaling in another physical downlink control channel scheduling the data on scheduled resources with an indication that the data is guaranteed to be received on the scheduled resources during the on-duration; and
means for receiving the data on the scheduled resource during the on-duration without monitoring for the physical downlink control channel, if the indication is set.

25. The apparatus of claim 22, further comprising an antenna, or a display, or a user interface, or a combination thereof.

26. An apparatus for wireless communication at a user equipment (UE), comprising:
means for monitoring a shared radio frequency spectrum band for wake-up signaling from a base station, the wake-up signaling for a discontinuous reception cycle at the UE;
means for receiving the wake-up signaling prior to an on-duration of the discontinuous reception cycle, the wake-up signaling comprising an indication of a length of the on-duration, wherein the wake-up signaling is received in a first channel occupancy time;
means for entering, based at least in part on receiving the wake-up signaling, a wake state for the indicated length of the on-duration to monitor for physical downlink control channel scheduling data from the base station; and
receiving the physical downlink control channel scheduling data in the on-duration in a second channel occupancy time.

27. The apparatus of claim 26, wherein the length of the on-duration comprises a second length that is longer than a first length, the apparatus further comprising:
means for entering the wake state for the second length of the on-duration to monitor for the physical downlink control channel scheduling the data from the base station.

28. The apparatus of claim 26, further comprising:
means for receiving, in the wake-up signaling, an indication that the base station has to gain access to the shared radio frequency spectrum band for the second channel occupancy time before transmitting the data; and
means for monitoring the physical downlink control channel scheduling the data during the on-duration.

29. The apparatus of claim 26, further comprising:
means for receiving, in the wake-up signaling, an indication of an offset between the wake-up signaling and the data.

30. The apparatus of claim 26, further comprising:
means for receiving a grant in the on-duration scheduling the UE to receive the data from the base station;
means for receiving a first go-to-sleep signal in the on-duration after receiving the grant; and
means for ignoring the first go-to-sleep signal based at least in part on receiving the grant.

31. The apparatus of claim 30, further comprising:
means for receiving a second go-to-sleep signal in the on-duration after receiving the grant; and
means for entering a sleep state based at least in part on receiving the second go-to-sleep signal.

32. A method for wireless communication at a user equipment (UE), comprising:
monitoring a shared radio frequency spectrum band for wake-up signaling from a base station, the wake-up signaling for a discontinuous reception cycle at the UE;
receiving the wake-up signaling prior to an on-duration of the discontinuous reception cycle, the wake-up signaling comprising an indication of a length of the on-duration; and
entering, based at least in part on receiving the wake-up signaling, a wake state for the indicated length of the on-duration to monitor for physical downlink control channel scheduling data from the base station;
means for receiving a go-to-sleep signal in the on-duration;
means for identifying that the UE failed to receive a grant scheduling the UE to receive the data from the base station; and
means for entering a sleep state based at least in part on the identifying and on receiving the go-to-sleep signal.

* * * * *